United States Patent
Takakura et al.

(10) Patent No.: US 6,414,685 B1
(45) Date of Patent: *Jul. 2, 2002

(54) METHOD OF PROCESSING ANIMATION BY INTERPOLATION BETWEEN KEY FRAMES WITH SMALL DATA QUANTITY

(75) Inventors: Masaki Takakura, Osaka; Minoru Nishihata, Nara, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,950

(22) Filed: Aug. 8, 1997

(30) Foreign Application Priority Data

| Jan. 29, 1997 | (JP) | 9-015413 |
| Jan. 29, 1997 | (JP) | 9-015701 |

(51) Int. Cl.[7] ............................... G06T 15/70
(52) U.S. Cl. ...................... 345/473; 345/475
(58) Field of Search ............... 345/473, 474, 345/475

(56) References Cited

FOREIGN PATENT DOCUMENTS

| JP | 60191366 | 9/1985 |
| JP | 61198877 | 9/1986 |
| JP | 4287176 A | 10/1992 |
| JP | 5101160 | 4/1993 |
| JP | 5101160 A | 4/1993 |

OTHER PUBLICATIONS

Autodesk, Inc. 3D Studio Max User's Guide, vol. 1 Concepts and Modeling. Kinetix, Inc. Ch 1, p. 1–1 to 1–19, Ch 5 , p. 5–1 to 5–23, Ch 6 , p. 6–1 to 6–12, Mar. 1996.*
Autodesk, Inc. 3D Studio Max User's Guide, vol. 2 Rendering and Animation. Kinetix, Inc. Ch. 26, p. 26–1 to 26–16. Ch 31, p. 31–1 to 31–31, Mar. 1996.*
Pepke, E. 1995. "Chapter 7. Animation and the Examination of Behavior Over Time". in Computer Visualization, Richard S. Gallagher, ed. CRC Press. Ann Arbor.*
Jamsa, K. A. 1992. "Part IV. Paintbrush." Microsoft Windows Operating System 3.1 Users Guide. Microsoft Press. Redmond, Washington. pp. 116–125.*
Graftool User's Guide. 1987. 3–D Visions Corporation. Torrence, CA.*
In re Iwahashi. 12 USPQ2d 1980 (CAFC Nov. 7, 1989).*

* cited by examiner

Primary Examiner—Mark Zimmerman
Assistant Examiner—Philip H Stevenson

(57) ABSTRACT

A key frame animation processing method includes steps of outputting information indicating a time for presenting a key frame for every key frame, and outputting state information of each object in correspondence to the time information of the key frame for every key frame, thereby reducing the quantity of outputted data. The data may be outputted to either a storage medium or a communication medium. This method may include a step of outputting link information as to each object and another object in another key frame in correspondence to the state information of the object. The state information may include only the quantity of a state change. Also disclosed is a method of displaying a key frame animation in real time.

14 Claims, 38 Drawing Sheets

|          | t0 | t1 | t2 | t3 |
|----------|----|----|----|----|
| OBJECT A | A0 | A1 | A2 |    |
| OBJECT B | B0 | B1 | B2 | B3 |
| OBJECT C |    | C1 | C2 |    |
| OBJECT D |    | D1 | D2 | D3 |
| OBJECT E |    |    | E2 | E3 |

FIG. 6    PRIOR ART

|         | t0 | t1 | t2 | t3 |
|---------|----|----|----|----|
| OBJECT F | F0 | F1 | F2 | F3 |
| OBJECT G |    | G1 | G2 | G3 |
| OBJECT H |    |    | H2 | H3 |
| OBJECT I |    |    |    | I3 |

FIG. 9    PRIOR ART

|         | t0 | t1 | t2 | t3 |
|---------|----|----|----|----|
| OBJECT J | J0 | J1 | J2 | J3 |
| OBJECT K | K0 | K1 | K2 | K3 |

| t0 | t1 | t2 | t3 |
|----|----|----|----|
| A0 | A1 | A2 | x  |
| B0 | B1 | B2 | B3 |
| x  | C1 | C2 | x  |
| x  | D1 | D2 | D3 |
| x  | x  | E2 | E3 |

| t0, | t1, | t2, | t3, |
|---|---|---|---|
| A0, | A1, | A2, | , |
| B0, | B1, | B2, | B3, |
| , | C1, | C2, | , |
| , | D1, | D2, | D3, |
| , | , | E2, | E3, |

FIG.23

| TIME / OBJECT | t0 | t1 | t2 | t3 |
|---|---|---|---|---|
| OBJECT A | A0 | A1 | A2 |  |
| OBJECT B | B0 | B1 | B2 | B3 |
| OBJECT C |  | C1 | C2 |  |
| OBJECT X |  | X1 | X2 | X3 |
| OBJECT D |  | D1 | D2 | D3 |
| OBJECT E |  |  | E2 | E3 |

FIG.24

350:ANIMATION DATA

| K  | t0 | — 352 |
| A0 | 0  | — 354 |
| B0 | 0  | — 356 |
| K  | t1 | — 358 |
| A1 | 1  | — 360 |
| B1 | 2  | — 362 |
| C1 | 0  | — 364 |
| X1 | 0  | — 366 |
| D1 | 0  | — 368 |
| K  | t2 | — 370 |
| A2 | 1  | — 372 |
| B2 | 2  | — 374 |
| C2 | 1  | — 376 |
| X2 | 1  | — 378 |
| D2 | 2  | — 380 |
| E2 | 0  | — 382 |
| K  | t3 | — 384 |
| B3 | 2  | — 386 |
| X3 | 1  | — 388 |
| D3 | 2  | — 390 |
| E3 | 3  | — 392 |

FIG.27A
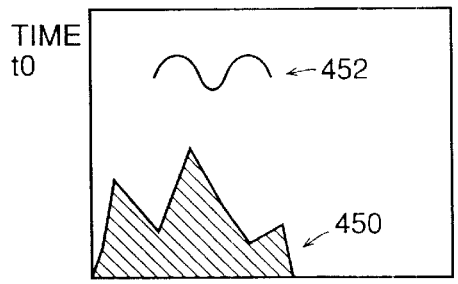
FIG.27B
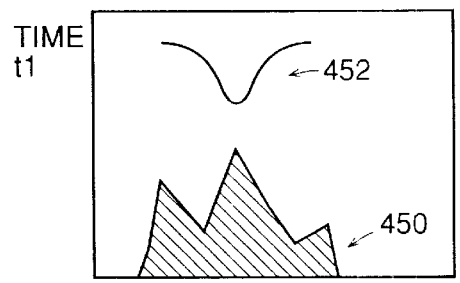
FIG.27C
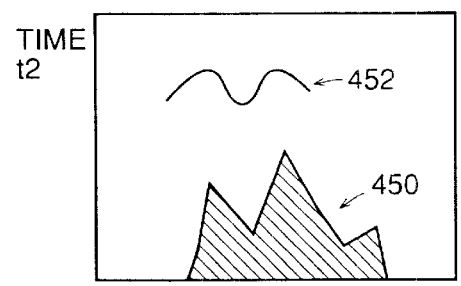
FIG.27D
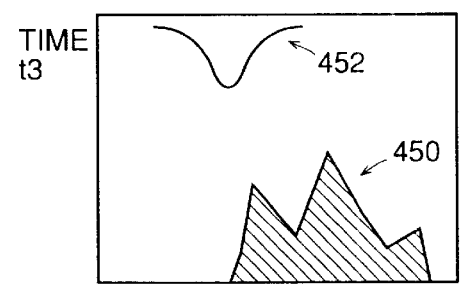
FIG.27E
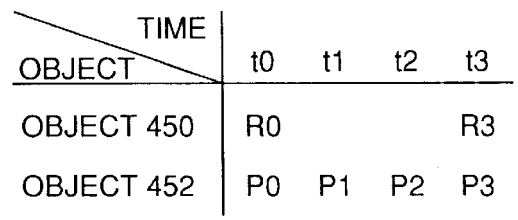
FIG.27F
460:ANIMATION DATA
| K | t0 | — 402 |
| --- | --- | --- |
| P0 | 0 | — 464 |
| R0 | 0 | — 466 |
| K | t1 | — 468 |
| P1 | 1 | — 470 |
| K | t2 | — 472 |
| P2 | 1 | — 474 |
| K | t3 | — 476 |
| P3 | 1 | — 478 |
| R3 | 1 | — 480 |
L

FIG. 32

| X1 | → | R 1, x1, y1 |
| X2 | → | R 1, x2, y2 |
| X3 | → | R 1, x3, y3 |
| Y2 | → | R 2, x4, y4 |
| Y3 | → | R 2, x5, y5 |

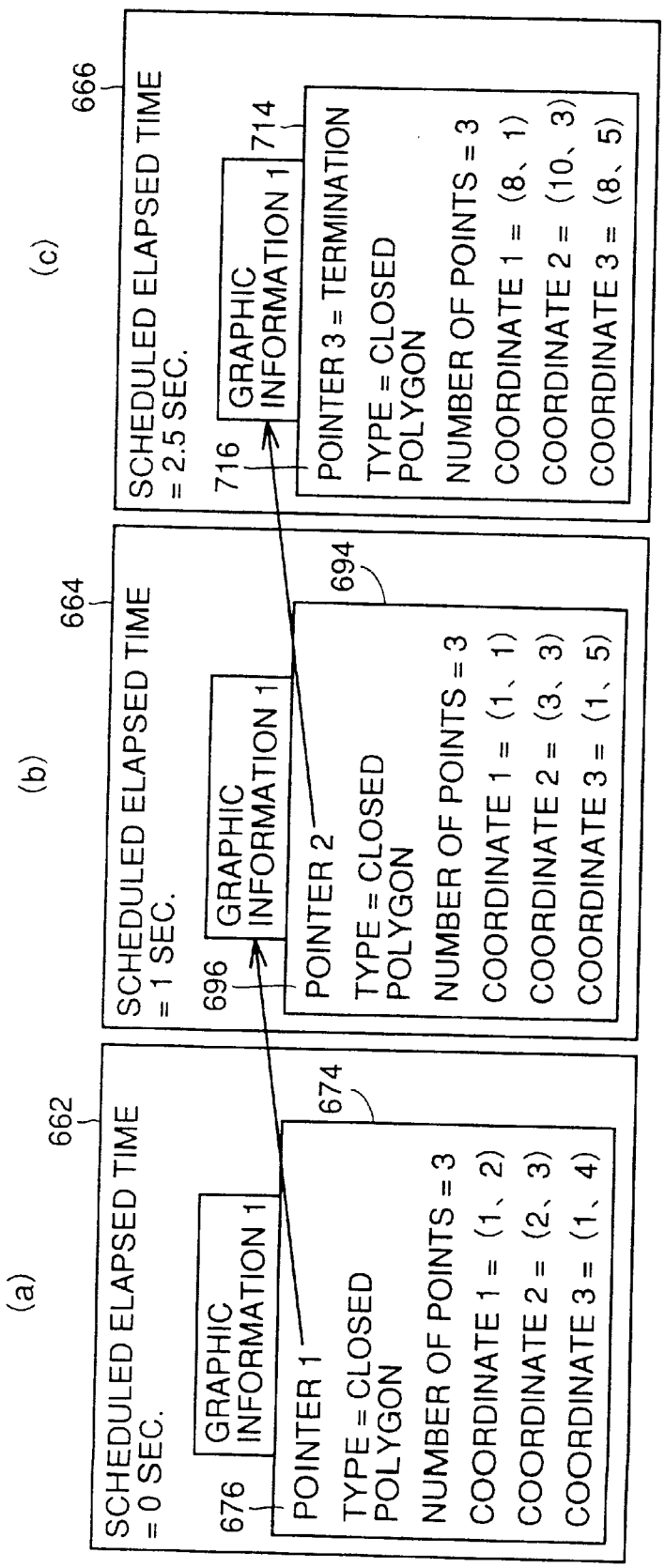

FIG.48A — 722

POINTER
TYPE=POLYGON
NUMBER OF POINTS
COORDINATE 1
COORDINATE 2
COORDINATE 3
COLOR= (R,G,B)
TRANSPARENCY
THICKNESS OF LINES
LINE TYPE
RATIO SOLID LINE PART/BLANK PART
...

FIG.48B — 724

POINTER
TYPE=TEXT
COORDINATES
TEXT CONTENT
FONT TYPE
NUMBER OF FONT POINT
COLOR= (R,G,B)
STYLE
CHARACTER SPACING
LINE SPACING
JUSTIFICATION
...

FIG.48C — 726

POINTER
TYPE=GRAPHIC GROUP
NUMBER OF GRAPHICS
POINTER 1
POINTER 2
...
POINTER n
COORDINATES OF REFERENCE POINT
SCALE PERCENTAGE ON DISPLAY
...

| h | 0 | 0.1 | 0.2 | 0.3 | 0.4 | 0.5 | 0.6 | 0.7 | 0.8 | 0.9 | 1.0 |
|---|---|-----|-----|-----|-----|-----|-----|-----|-----|-----|-----|
| k | 0 | 0.01 | 0.04 | 0.09 | 0.16 | 0.25 | 0.36 | 0.49 | 0.64 | 0.81 | 1.0 |

METHOD OF PROCESSING ANIMATION BY INTERPOLATION BETWEEN KEY FRAMES WITH SMALL DATA QUANTITY

BACKGROUND OF THE INVENTION

1. Field of the Invention

The present invention relates to an animation processing method for recording or transmitting data of an animation previously created by the technique of computer graphics or the like, and more particularly, it relates to a method of compressing key frame information for displaying an animation by generating intermediate frames between pieces of key frame information by interpolation on the basis of images on frames (key frames) serving as keys in a time series, reducing the quantity of data for recording or transmission, and regenerating the animation in real time.

2. Description of the Background Art

Moving image data such as those forming an animation consist of an extremely large number of images called frames. In order to record information of the respective frames as such, an enormous data capacity is necessary. Thus, there has been proposed the so-called video compression for compressing the data of such video information with minimum reduction of the information quantity and recording or transmitting the same.

In case of inputting dynamic images from a camera or outputting the same onto a display, the so-called raster scan technique is generally employed. The raster scan technique is adapted to decompose each frame into a plurality of horizontal scan lines, for successively scanning the respective scan lines downward from above and rightward from the left. Therefore, the technique of video compression is generally directed to raster scan images.

An animation created by the technique of computer graphics is also converted to scan line information by the raster scan technique when displayed. In case of recording data of such an animation, a method of compressing a plurality of raster scan images is employed for recording the same in general. For example, Japanese Patent Laying-Open No. 61-198877 (1986) discloses a data compression technique of improving compressibility through conditions specific to a computer animation, for compressing scan line information by the raster scan technique.

On the other hand, techniques of creating animations by computer graphics include that called key frame animation. In this key frame animation, an animation is grasped as a set of a plurality of temporally changing "objects". In case of creating an animation, not all frames but only frames (called "key frames") forming key points of the motion are created. Then, objects of frames (called "intermediate frames") other than the key frames are automatically created by interpolative calculation of objects contained in the key frames. This interpolation method is disclosed in Japanese Patent Laying-Open No. 60-191366 (1985).

The animation created by this key frame technique can be regenerated from information related not to all frames but to only partial key frames. Therefore, the data quantity is advantageously remarkably reduced as compared with the case of creating information of all frames and recording the animation. Thus, the capacity of a necessary storage medium can be reduced and the transmission time can also be reduced, for example.

In order to automatically create intermediate frames from information of key frames by interpolation, required is information as to which object changes to what object. Therefore, the aforementioned Japanese Patent Laying-Open No. 60-191366 discloses a technique of mapping of objects. Data related to such mapping must also be recorded/transmitted along with the information of key frames.

FIGS. 1A to 1D show four key frames of a certain animation along a time series. Description is now made on how to record information on objects contained in the key frames of the animation shown in FIGS. 1A to 1D in the prior art.

Referring to FIGS. 1A to 1D, objects A0 to A2 B0 to B3, E2 and E3 are painted polygons. On the other hand, objects C1, C2 and D1 to D3 are curves. It is assumed that the key frames shown in FIGS. 1A to 1D are presented at times t0, t1, t2 and t3 in the animation respectively.

As understood from FIGS. 1A to 1D, the objects A0, A1 and A2 show changes of a single object. This object is referred to as an object A. Similarly, the objects B0 to B3 show changes of a single object D. The objects E2 and E3 show changes of a single object E. The objects C1 and C2 show changes of a single object C, and the objects D1 to D3 show changes of another single object D respectively.

In order to record information on objects contained in key frames, it is necessary to previously prepare data (state information) indicating in what states respective objects are in respective frames, as disclosed in Japanese Patent Laying-Open No. 5-101160 (1993), for example, as shown in FIG. 2 in the form of a table, for example. The full text of Japanese Patent Laying-Open Gazette No. 5-101160 is invoked here by reference.

Referring to FIG. 2, the respective columns indicate the key frames correponding to the respective times, and the respective rows correspond to the objects appearing in the animation. The respective elements in the table shown in FIG. 2 indicate state information of the respective objects in the key frames. For convenience of illustration, it is assumed that symbols A0 to A2, D0 to B3, C1, C2, D1 to D3, E2 and E3 denoting the respective objects also indicate the state information of the objects A to E at the respective times. In the table shown in FIG. 2, further, blank spaces show that the objects do not appear on the screen at the times.

Graphics appearing in the animation are assumed as the objects A to E in this case. However, the objects may be in various formats other than graphics. In addition to graphics such as lines, polygons, circles and stereoscopic figures, the objects may be characters, volumes of sounds or music, parameters of picture quality, positions and sizes of display windows, thicknesses of lines, colors, positions of light sources, positions of viewpoints and the like.

In order to provide sound effects in a certain key frame, for example, the sound effects are introduced into this key frame as objects. In order to change the position or size of a window for displaying the animation in a certain key frame, window parameters therefor are introduced into the key frame. Thus, all various numeric parameters employed in the animation can be treated as "objects" in this specification, particularly as state values indicating the states of the objects.

When the data shown in FIG. 2 in the form of a table are previously prepared, images of an intermediate frame at an arbitrary time can be calculated by interpolating state information of objects described in key frame information on key frames around the time such as a pair of or a plurality of preceding and succeeding frames. This interpolation method is disclosed in Japanese Patent Laying-Open No. 61-191366. Well-known techniques of interpolative calculation include an interpolation method employing linear interpolation or curve approximation of spline curves or the like.

FIGS. 5A to 5D show another exemplary animation related to the so-called business presentation. These figures show key frames respectively. Referring to FIGS. 5A to 5D, objects F0 to F3, forming an object F which is the background image, remain in the same state in all key frames. Objects G1 to G3, forming an object G consisting of characters "presentation", remain in the same state in the three key frames shown in FIGS. 5B to 5D. Objects H2 and H3, forming an object H consisting of characters "item 1", are with colored and white background images respectively. An object I3, forming an object I consisting of characters "items 2", is displayed only in the keyframe shown in FIG. 5D, with a colored background image. the animation shown in FIGS. 5A to 5D in the form of a table similarly to FIG. 2. The relation between FIG. 6 and FIGS. 5A to 5D is similar to that between FIG. 2 and FIGS. 1A to 1D. Therefore, redundant description is omitted.

With reference to FIG. 11, the conventional interpolation method proposed in Japanese Patent Laying-Open No. 60-191366 is now described. It is assumed that graphics 162 and 164 shown in FIG. 11 belong to key frames which are adjacent to each other on the time base. The method disclosed in Japanese Patent Laying-Open No. 60-191366 is adapted to equally divide the time between the graphics 162 and 164 of the adjacent key frames into n, and obtain respective corresponding points in images of intermediate frames 166, 168 and 170 (it is assumed that n=3) by linear interpolation between the corresponding image graphics 162 and 164 in the key frames. Assuming that the time base progresses along arrow in FIG. 11, the key frame containing the graphic 162, the three intermediate frames containing the intermediate graphics 166, 168 and 170, and the key frame containing the graphic 164 are displayed in this order for regenerating the animation. After the display of the key frame containing the graphic 164, similar interpolative calculation is performed between this key frame and the next key frame, for regenerating the animation.

This animation regenerating method has such an advantage that the data quantity necessary for animation regeneration can be by far reduced as compared with the case of having information of all frames. In general, therefore, all items of the data. shown in FIG. 2 are simply recorded/transmitted for recording/transmitting the animation by the key frame method.

FIGS. 12A and 12B illustrate a conventional recording format. For example, the data shown in FIG. 2 are recorded/transmitted as animation data shown in FIG. 12A. Referring to FIG. 12A, each time ti and state information of each object in the key frame corresponding thereto are recorded/transmitted. Arbitrary symbol x indicating absence of objects is recorded/transmitted to a portion containing no corresponding object in each key frame. The time of each key frame and symbol indicating absence of objects can be recorded/transmitted in various expressing methods. For example, the time may be expressed in a numerical value in the unit of 1/1000 sec., while a specific code may be employed for symbol x.

On the other hand, state information of objects can be expressed through commands, for example. Exemplary state information of a painted polygon and that of a curve expressed in code trains respectively are as follows:
(Example of Painted Polygon)
 P c, p, n, x1, y1, x2, y2, . . . , xn, yn
where P represents a command indicating that this is a painted polygon, c represents the color number of the polygon, p represents the number of the paint pattern, n represents the number of points of the polygon, and x1, y1, x2, y2, . . . , xn, yn represent the coordinates of apices of the polygon. It is assumed here that various paint patterns are previously registered on a device side.
(Example of Curve)
 W c, w, n, x1, y1, x2, y2, . . . , xn, yn
where W represents a command indicating that this is a curve, c represents the color number of the curve, w represents the thickness of the curve, n represents the number of points of the curve, and x1, y1, x2, y2, . . . , xn, yn represent the coordinates of the points expressing the curve.

As hereinabove described, various numerical parameters for objects conceivable in addition to graphics can be coded in the format with heads of commands identifying the parameters respectively.

In another method, the information shown in FIG. 2 is recorded/transmitted with delimiters (e.g., ",") between the respective data items, as shown in FIG. 12B. In this case, no symbol "x" is necessary for indicating absence of objects, while the delimiters must be recorded/transmitted in addition.

In the animation for the so-called business presentation shown in FIGS. 5A to 5D among animations, the screen itself generally remains rather unchanged but new items are successively added to the screen. In order to record such an animation in the aforementioned key frame animation method, objects once appearing on the screen must be recorded in all subsequent key frames as object information, even if these objects remain absolutely unchanged. This is a matter of course since all states of objects at times forming key points must be recorded due to the interpolation between adjacent key frames. When this recording system is employed, however, the data quantity is extremely increased. Particularly when the state information of each object is large data, the necessary data quantity is acceleratingly increased since the storage capacity necessary for recording the animation information is conceivably proportionate to the product of the number of the key frames and the data quantity per object.

In the animation shown in FIGS. 8A to 8D, on the other hand, data must be recorded for every key frame even for an object having the same shape as a previously appearing object. Also in this case, the storage capacity necessary for recording the animation information is extremely increased, similarly to the animation for the so-called business presentation.

Such a problem applies not only to the case of recording animation information, but to the case of transmitting the information to another computer through a network.

Also as to objects appearing only in partial key frames, some information must be recorded/transmitted for indicating that these objects are absent in the remaining key frames, leading to wasteful recording/transmission. Every time a new key frame is added, for example, state information of objects not appearing at this point of time must be newly recorded/transmitted as blanks. The quantity of such data is accumulatively increased as the number of recorded/transmitted data is increased.

It has formerly been difficult to implement such an animation regenerating method itself. Due to the recent enhancement of the throughput of CPUs (central processing units), however, this animation regenerating method is now being implemented. In this method, however, a CPU generates intermediate frames by operations, and hence the following problems arise in addition to the problem of the data quantity:

With reference to FIG. 13, it is assumed that three frames 182, 184 and 186 correspond to the intermediate frames in the aforementioned conventional method. It is also assumed that the time required for plotting is 0.1 sec. as to each frame. Namely, a time of 0.3 sec. in total is necessary for regenerating these three frames 182, 184 and 186. When this animation is regenerated concurrently with sounds in real time, the following problems arise:

The first problem arises when this animation is regenerated in a CPU whose processing speed is lower than that assumed in creation of the animation. In this case, a time of 0.12 sec., for example, longer than 0.1 sec. is necessary for plotting one frame, as shown in FIG. 14. If frames 192, 194 and 196 are successively regenerated, therefore, the regeneration takes a time longer than that assumed therefor, and the delay from the regeneration time assumed at the start is gradually increased. On the other hand, the sounds are regenerated in the time assumed at the start. Consequently, the displacement between the motions of the displayed graphics and the sounds is gradually increased. For example, the shapes of the mouth of the person regenerated on the screen are displaced from the sounds along the frames 192, 194 and 196 as shown in FIG. 14.

The second problem arises when this animation is regenerated by a CPU having higher throughput than that assumed in creation of the animation, contrarily to the first problem. In this case, a time necessary for plotting each of frames 202, 204 and 206 may be only 0.06 sec., for example, i.e., shorter than 0.1 sec., as shown in FIG. 15. Therefore, the regeneration time for the animation is shorter than that assumed in creation of the animation. If the sounds are regenerated at a constant speed, the motions are displaced from the sounds also in FIG. 15. In this case, the motions of the animation are faster than the sounds.

The aforementioned problems are caused due to the difference in throughput of the CPUs. However, such problems are also caused by fluctuations of the plotting quantity required per frame. Referring to FIG. 16, for example, consider that the size of plotted graphics is increased on the time base along frames 212, 214 and 216. In this case, the time required for plotting is increased as the graphic size is increased. For example, it is assumed that times of 0.1 sec., 0.11 sec. and 0.12 sec. are necessary for plotting the frames 212, 214 and 216 respectively. Also in this case, a delay of 0.01 sec. results in the frame 214, and a delay of 0.01+0.02= 0.03 sec. results in the frame 216. Therefore, the timing for generating each frame is displaced from that for regenerating the sound also in this case.

In order to solve such problems related to synchronization of the sounds and the screen, starting times for plotting the respective frames may be decided with reference to the head frame. In this system, however, the following problem arises in the example shown in FIG. 13:

Referring to FIG. 17, consider that the throughput of the CPU is lower than the assumed one. In this case, the plotting time allocated to each of three frames 222, 224 and 226 is decided as 0.1 sec., for example. If the processing speed of the CPU is slow, it may be impossible to completely plot each graphic in the supplied plotting time. In this case, plotting of the next frame is disadvantageously started despite incomplete plotting of each frame, as shown in the frame 222, 224 or 226 in FIG. 17.

If the throughput of the CPU is higher than the assumed one, on the other hand, the following problem arises: If respective frames 232, 234 and 236 shown in FIG. 18 are regenerated by such a CPU having high throughput, only a time of 0.06 sec. is necessary for plotting each frame, for example. The time allocated for plotting of each frame is 0.1 sec. Therefore, a pause of 0.04 sec. results after completion of plotting of each frame, and the CPU is in idle during this pause. In case of making the best use of the throughput of the CPU, it must be possible to regenerate not only the three frames 232, 234 and 236 shown in FIG. 18 but five frames 242, 244, 246, 248 and 250, for example, as shown in FIG. 19. The motions of the animation are smoothed as the number of frames regenerated in a unit time is increased, and hence the pauses shown in FIG. 18 are preferably minimized so that the frames are regenerated as shown in FIG. 19.

Further, such animation regeneration is preferably applicable not only to the positions and sizes of the graphics but to colors and degrees of transparency of the graphics, thicknesses of lines forming the graphics, ratios of plotted parts to unplotted parts in broken lines, for example, forming graphics, font sizes in case of displaying characters, and the like. Similar processing can preferably be performed on movement of not only a single graphic but a graphic group consisting of a group of basic graphics. This also applies to scale percentage for displaying the group. Further, it is more preferable if an animation can be regenerated not only with simple motions but with specific changes with respect to progress of time in creation of intermediate frames from key frames.

SUMMARY OF THE INVENTION

Accordingly, an object of the present invention is to provide an animation processing method which can reduce the quantity of treated data in data processing of an animation in a key frame system, while keeping the quantity of information related to the animation.

Another object of the present invention is to provide an animation processor which can reduce the quantity of treated data in data processing of an animation in a key frame system, while keeping the quantity of information related to the animation.

Still another object of the present invention is to provide a compression method for animation information which can more efficiently compress animation information employing a key frame animation system.

An additional object of the present invention is to provide an animation regenerating method which can regenerate an animation by generating as many intermediate frames as possible between key frames while keeping a constant regeneration speed for the animation.

A further object of the present invention is to provide an animation regenerating method which can change motions of an animation in a key frame system.

The animation processing method according to the present invention is adapted to process an animation consisting of at least one object having a changeable state, and comprises a time information output step of outputting a time for presenting a key frame on the animation to a predetermined medium for every key frame, and a state information recording/transmission step of outputting state information of each object appearing in the key frame to the predetermined medium in correspondence to the time information of the key frame outputted by the time information output step for every key frame. The predetermined medium may be either a storage medium or a communication medium.

In this animation processing method, the information on the time for presenting the key frame on the animation and the state information of only each object appearing in the key frame are recorded or transmitted for every key frame by the time information and state information output steps, whereby no information is recorded or transmitted in relation to objects not appearing in the key frame. In other words, no unnecessary data are recorded or transmitted in relation to objects not appearing in the key frame. In relation to recording or transmission of the animation, the quantity of recorded or transmitted data can be reduced while preserving the information quantity of the animation. Consequently, the memory capacity for recording the animation data can be saved while high-speed data transmission is enabled.

Preferably, the animation processing method according to the present invention includes a link information output step of recording or transmitting link information as to each object appearing in the key frame and that in another key frame in correspondence to the state information of the object recorded or transmitted through the state information output step for every key frame.

The link information is further recorded or transmitted in correspondence to the state information of each object, whereby presence/absence of a certain object in a certain frame can be determined by whether or not an object linked with this object is present in a related key frame. No object information on an absent object may be included in the key frame information, whereby the data quantity can be further reduced.

According to another aspect of the present invention, an animation display method, which is adapted to display an animation of graphics on a display unit through a computer program, includes steps of preparing a plurality of pieces of key frame information each including information for specifying a display time and graphic information for specifying the features of a graphic to be displayed in a display frame at the display time, obtaining a current time for display, selecting at least two pieces of key frame information having display times before and after the obtained current time for display in the aforementioned plurality of pieces of key frame information, performing prescribed interpolative calculation between corresponding pieces of graphic information included in at least two pieces of key frame information respectively thereby creating graphic information to be displayed at the obtained current time for display, plotting a frame at the obtained current time for display on the basis of the created graphic information, and repeating the aforementioned step of obtaining the current time for display, the selecting step, the creating step and the displaying step up to a lapse of a prescribed time.

After a plurality of pieces of key frame information are previously prepared in a memory, the following operations are repeated: First, a current time for display is obtained. Two pieces of key frame information having times before and after the current time are selected. Prescribed interpolative operation is performed between corresponding pieces of graphic information included in the two pieces of key frame information, for creating graphic information to be displayed at the current time for display and plotting the graphic. No graphic information for the next frame is created until one frame is entirely plotted, whereby each frame can be completely plotted. Further, no display time is previously decided, whereby the animation can be displayed in response to the ability of a CPU, so that a CPU having high throughput creates a number of intermediate frames while that having low throughput creates a small number of intermediate frames.

Preferably, the plurality of pieces of key frame information include head key frame information related to a frame to be displayed at the head in this animation display method. This animation display method further includes a step of displaying the head frame in starting of the animation display, on the basis of the head frame information. Further, the step of obtaining the current time for display includes a step of referring to a timer in response to completion of plotting of one frame and obtaining the current value of the timer as the current time for display.

When the head frame is completely plotted, a current time for display of the next frame is obtained in response to this completion. When the frame is completely plotted at this time, a current time for next display is further obtained in response to this completion. Thus, when certain frames are successively completely plotted, frames are repeatedly created and plotted for display at the times of the completion. Thus, it is possible to make the best use of the ability of the CPU with no idle time.

The graphic information includes coordinate information on feature points of each graphic, color information of each graphic, information on the degree of transparency of each graphic, information on the thickness of lines forming each graphic, information on the ratio of plotted parts to unplotted parts of the lines forming each graphic, the size of each character font, coordinates of reference points of a graphic group, and scale percentage of the graphic group on display respectively. The graphic information may include deformation or movement of each graphic, a change in the color of each graphic, a change of the degree of transparency of each graphic, the thickness of lines forming each graphic, the mode of broken lines forming each graphic, the size of each character font, movement of a graphic group, or scale percentage of the graphic group on display, by creating and plotting graphic information in intermediate frames by interpolative operation between such pieces of graphic information.

More preferably, the creating step of the animation display method includes steps of performing interpolative calculation by prescribed linear calculation between corresponding pieces of graphic information included in two pieces of key frame information respectively, and converting graphic information obtained by this interpolative calculation by a predetermined conversion method.

A motion which is nonlinear with respect to time such as a motion accompanied by acceleration, for example, can be expressed by further converting graphic information once created by such interpolative calculation by linear calculation. Namely, changes can be obtained on the time base in the animation.

The converting step may include a step of looking up converted graphic information corresponding to the graphic information created in the creating step in a table. Graphic information once created by interpolative calculation is converted through the table for displaying the animation by the converted graphic information. An arbitrary change on the time base can be implemented on the animation.

Alternatively, the converting step may include a step of substituting the graphic information created in the creating step for a variable of a prescribed function and regarding the value of this function as the converted graphic information.

The graphic information obtained by the interpolative calculation by linear calculation is further substituted for the variable of the prescribed function to be converted, whereby a nonlinear motion can also be implemented on the animation. Further, the quantity of data necessary therefor can be reduced.

According to still another aspect of the present invention, the compression method for animation information is adapted to compress key frame information for an animation whose intermediate frames are generated and displayed by interpolation between a plurality of key frames through a computer. Each key frame information includes object information related to an object to be displayed in the corresponding key frame. The object information includes state information of the object, and link information to corresponding object information in key frame information having a predetermined relation with this key frame information. This method comprises a first output step of loading reference key frame information and outputting the same to a medium, a second output step of loading next key frame information in response to completion of outputting of just preceding key frame information, comparing each object information in the loaded key frame information with corresponding object information in key frame information having a predetermined relation with the loaded key frame information, and outputting compressed key frame information including object information including link information and state information having discrepancy with respect to the medium, and a step of repeating the second output step up to compression of all key frame information to be compressed.

The object information of the compressed key frame information includes link information and state information having discrepancy. The compressed key frame information includes no state information having no discrepancy with respect to that of the key frame compared therewith. However, the same can be restored from the compared key frame information in regeneration of the animation. Therefore, the animation can be regenerated from animation information of a smaller data quantity as compared with the conventional case of recording all state information as to each object information of each key frame.

Preferably, the key frame information having a predetermined relation in the compression method for animation information is key frame information outputted just in advance of the key frame information. The key frame information outputted just in advance is successively compared with the key frame information to be processed, for outputting key frame information including object information including only state information having discrepancy. The key frame information may simply be compared with the just preceding key frame information, whereby the storage capacity required for the processing can be reduced. The feature of the animation resides in that the number of objects changing states is generally small between adjacent key frames. Therefore, it is expected that the quantity of state information to be outputted is relatively reduced by comparing the just preceding key frame with the key frame to be processed, whereby the data quantity of the animation information can be reduced.

Preferably, the object information may further include a quantity of discrepancy as to the state information having discrepancy. State information having no discrepancy is not necessarily included. According to this method, therefore, the data quantity of the animation information can be by far reduced as compared with the prior art.

Preferably, the second output step includes steps of loading next key frame information in response to completion of outputting of just preceding key frame information and retrieving key frame information including object information which is in a relation of translation with each object information the loaded key frame information, and outputting compressed key frame information including object information including information specifying the key frame information including the object information having the relation of translation, link information and a translation quantity to the medium.

According to this method, the object information of the compressed key frame information includes the link information, the information specifying the key frame information including the object information of an object having the relation of translation with an object corresponding to the object information, and the translation quantity. Coordinate information of the object in the key frame to be processed can be restored from the object information of the object having the relation of translation and the translation quantity. The quantity of necessary data is reduced as compared with the case of recording all coordinate information of the object in the object information. The animation has such a feature that the translation quantity between the objects having the relation of translation is generally smaller than the values of the coordinates of the objects themselves. According to this method, therefore, the data quantity of the animation information can be by far reduced as compared with the conventional method.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows key frame information for the key frames shown in FIGS. 5A to 5D in the form of a table;

FIG. 9 shows key frame information for the key frames shown in FIGS. 8A to 8D in the form of a table;

FIG. 23 shows data of a key frame animation in case of adding a new object X to the animation in the first embodiment of the present invention;

FIG. 24 shows animation data recorded/transmitted in case of adding the new object X to the animation in the first embodiment of the present invention;

FIGS. 27A to 27F illustrate exemplary application of the animation data recording/transmission processing according to the second embodiment of the present invention;

FIG. 32 typically shows exemplary relative movement in the fifth embodiment;

FIG. 44 shows key frame information of the animation shown in FIGS. 43A to 43C;

FIGS. 48A to 48C show exemplary structures of graphic information storing data such as colors of graphics other than coordinate information;

DESCRIPTION OF THE PREFERRED EMBODIMENTS

FIRST EMBODIMENT

A first embodiment of the present invention is characterized in that, in case of recording/transmitting data of an animation with key frames, information (hereinafter referred to as link information) indicating which object in a key frame, in/to which each object in each key frame is just precedently recorded/transmitted, and changes are also recorded/transmitted along with state information of the object.

Figure 20:
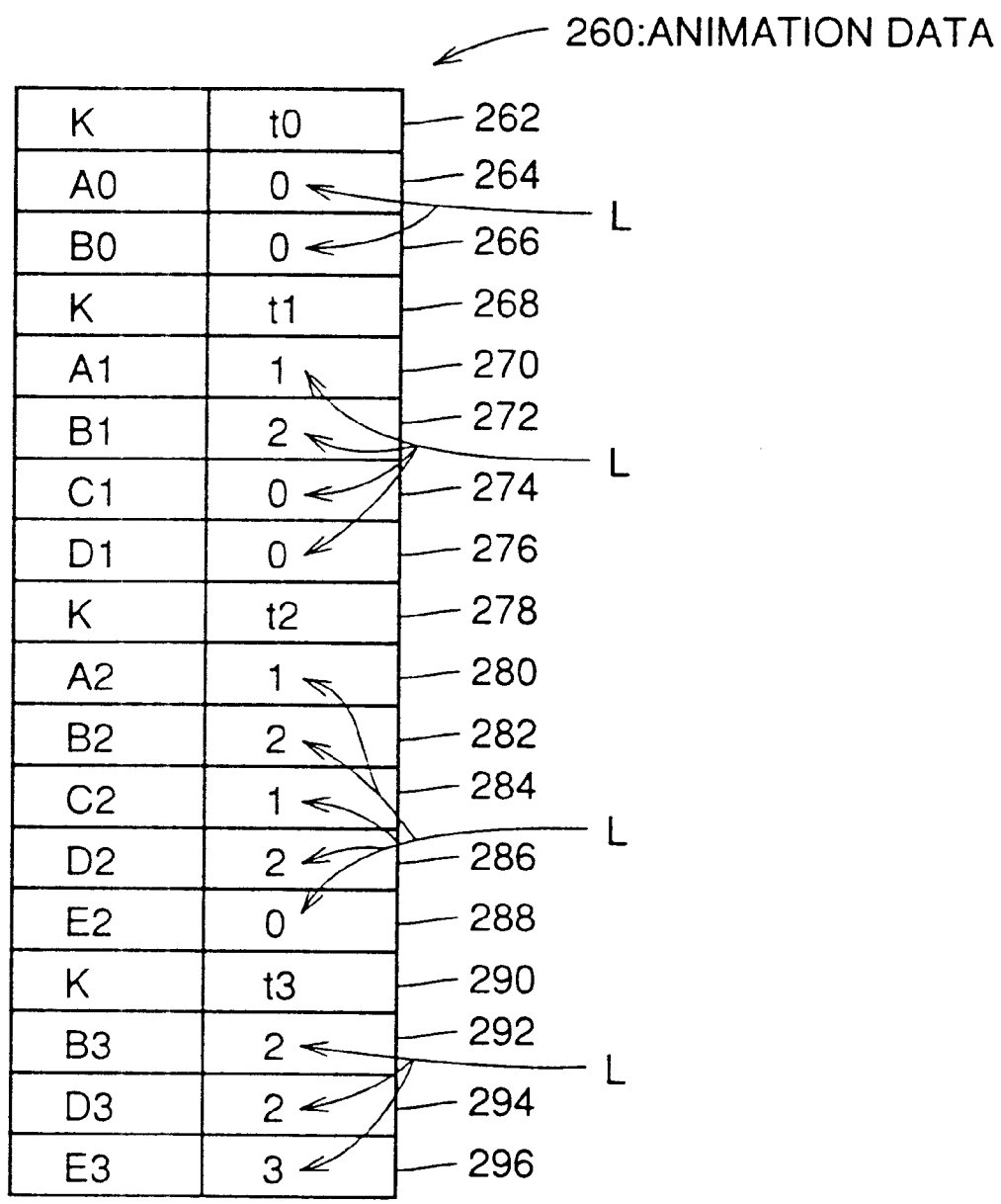
FIG. 20 shows animation data in case of recording/transmitting an animation of key frames in a first embodiment of the present invention.
Figure 21:
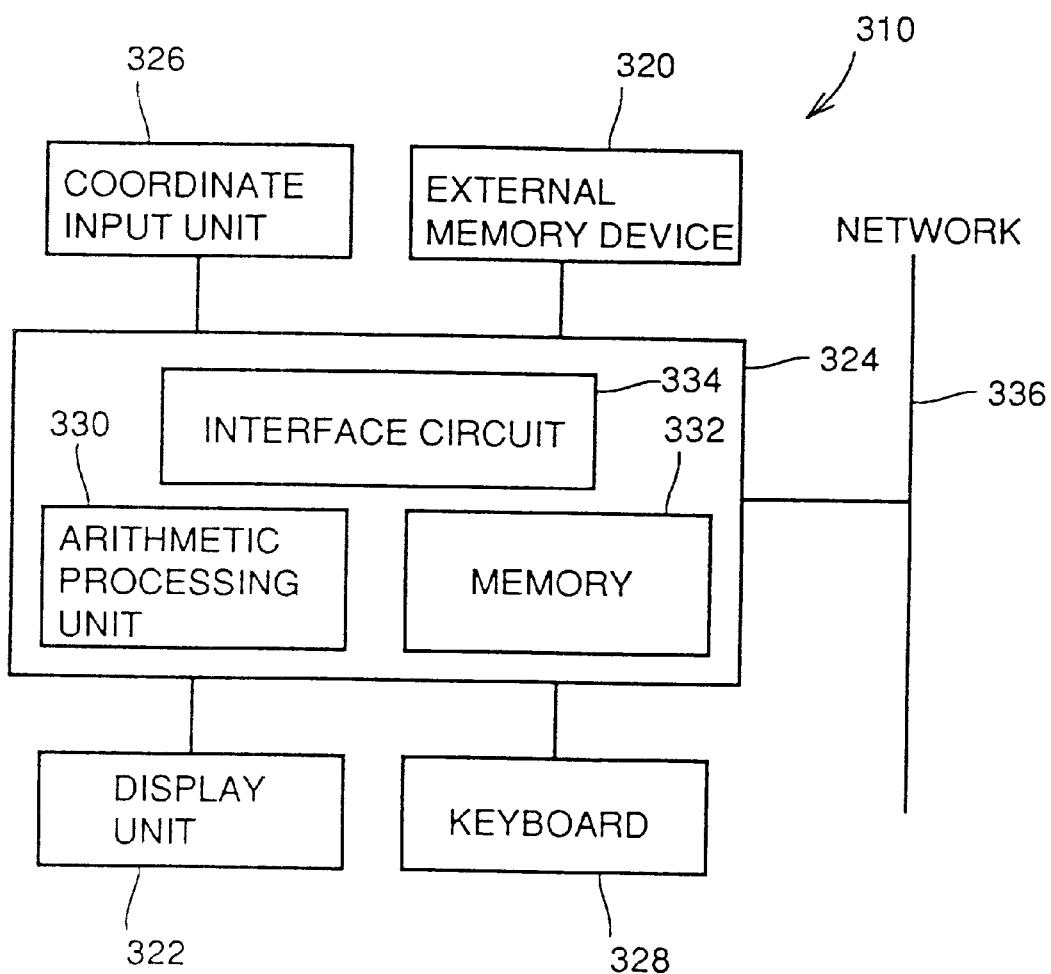
FIG. 21 is a schematic block diagram showing a device for implementing a compression method for animation information according to the present invention.

FIG. 20 illustrates animation data in case of recording/transmitting an animation with key frames in the first embodiment of the present invention. FIG. 21 is a block diagram showing an animation data recording/transmission processor which is applied to the first embodiment of the present invention. This processor is provided with an external memory device 320 such as a hard disk or a floppy disk for recording or reading animation data and a display unit 322 for displaying the animation, which are connected to a CPU (central processing unit) 324 for centralizedly controlling the same. The processor is further provided with a coordinate input unit 326 such as a tablet, a digitizer or a mouse, and a keyboard 328. The CPU 324 includes an arithmetic processing unit 330 such as a microprocessor, a memory 332 for storing programs and data necessary for processing, and an interface circuit 334 connecting the processor with an external device or a network 336 for making the animation data communicate with the exterior.

Figure 1A:
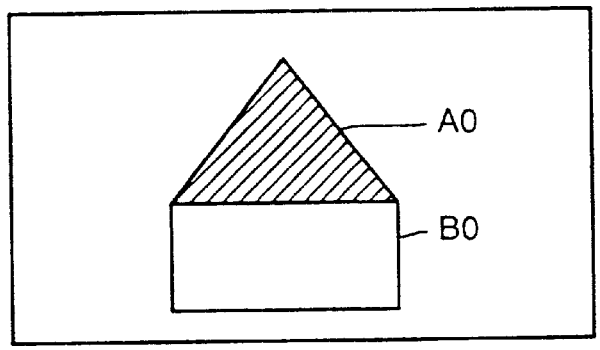
FIGS. 1A to 1D typically show key frames of an animation in a key frame system.
Figure 1B:
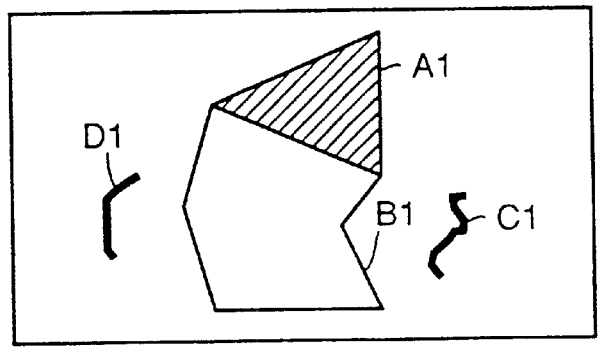
Figure 1C:
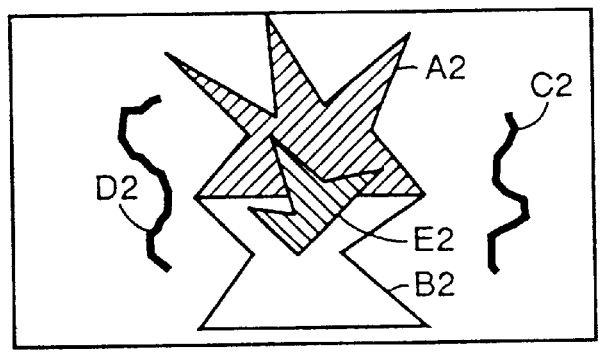
Figure 1D:
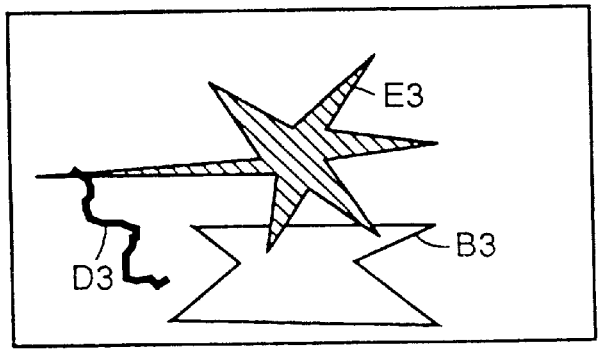
Figures 2, 3:
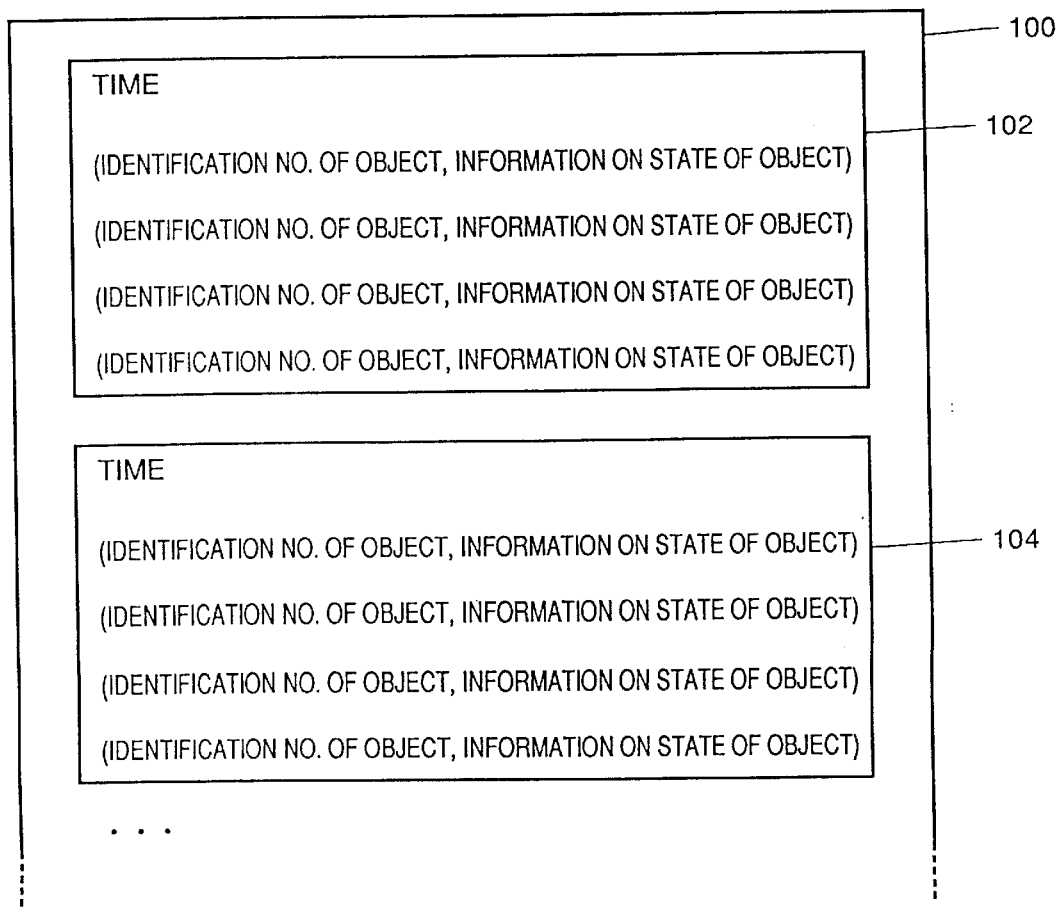
FIG. 2 is adapted to illustrate a conventional recording format for data of the key frames shown in FIGS. 1A to 1D.
FIG. 3 typically shows a data format for recording the data shown in FIG. 2 in accordance with the first embodiment of the present invention.

When recorded/transmitted, the key frames shown in FIG. 2 are converted to animation data 260 shown in FIG. 20. The animation data 260 further include data 262 to 296. The data 262, 268, 278 and 290 include times ti of the key frames in correspondence to commands K indicating delimiters between the key frames. The remaining data include pieces of link information L described later, in correspondence to pieces of state information Ai, Bi, Ci, Di and Ei of the objects respectively.

The types of the objects are described with reference to the animation shown in FIGS. 1A to 1D. Referring to FIGS. 1A to 1D, the objects A, B, C, D and E appear in the animation. The objects A, B and B are painted polygons, and the objects C and D are curves. In this embodiment, the group consisting of the objects A, B and E and that consisting of the objects C and D are treated as different types of objects.

What objects are regarded as the same type of objects depends on in what format the state information of the objects is expressed. Objects whose state information is expressed in the same format can be treated as the same type of objects.

The link information L is now described with reference to FIGS. 2 and 20. If link information L of a certain object is zero, this link information L indicates that the corresponding object has not appeared in preceding key frames but appears in this key frame first (refer to the data 264, 266, 274, 276 and 288 in FIG. 20).

If link information L of a certain object is nonzero, on the other hand, this link information L indicates with what numbered object the corresponding object is linked when counting the same type of objects as this object recorded/transmitted in the just preceding key frame.

In the data 270 in the key frame at the time t1 shown in FIG. 20, for example, the object corresponding to the state information A1 is a painted polygon and linked with the object corresponding to the first state information A0 of the same type of objects in the just preceding key frame (time t0) in FIG. 2, and hence the link information L of the data 270 is 1. Similarly, the object corresponding to the state information B1 in the data 272 is a painted polygon and linked with the object corresponding to the second state information B0 of the same type of objects in the just preceding key frame (time t0) in FIG. 2, and hence the link information L of the data 272 is 2.

Similarly, the pieces of link information L of the data 280 and 282 in the key frame at the time t2 are 1 and 2 respectively. On the other hand, the objects corresponding to the pieces of state information C2 and D2 in the key frame at the time t2 are curves and linked with the objects corresponding to the first and second pieces of state information C1 and D1 of the same type of objects in the just preceding key frame (time t1) in FIG. 2 respectively, and hence the pieces of link information L of the data 280 and 282 are 1 and 2 respectively.

Similarly, the objects corresponding to the pieces of state information B3 and E3 of the data 292 and 296 in the key frame at the time t3 are painted polygons and linked with the objects corresponding to the second and third pieces of state information B2 and E2 of the same type of objects in the just preceding key frame (time t2) in FIG. 2 respectively, and hence the pieces of link information L of the data 292 and 296 are 2 and 3 respectively. On the other hand, the object corresponding to the state information D3 of the data 294 in the key frame at the time t3 is a curve and linked with the object corresponding to the second state information D2 of the same type of objects in the just preceding key frame (time t2) in FIG. 2, and hence the link information L of the data 294 is 2.

Figure 22:
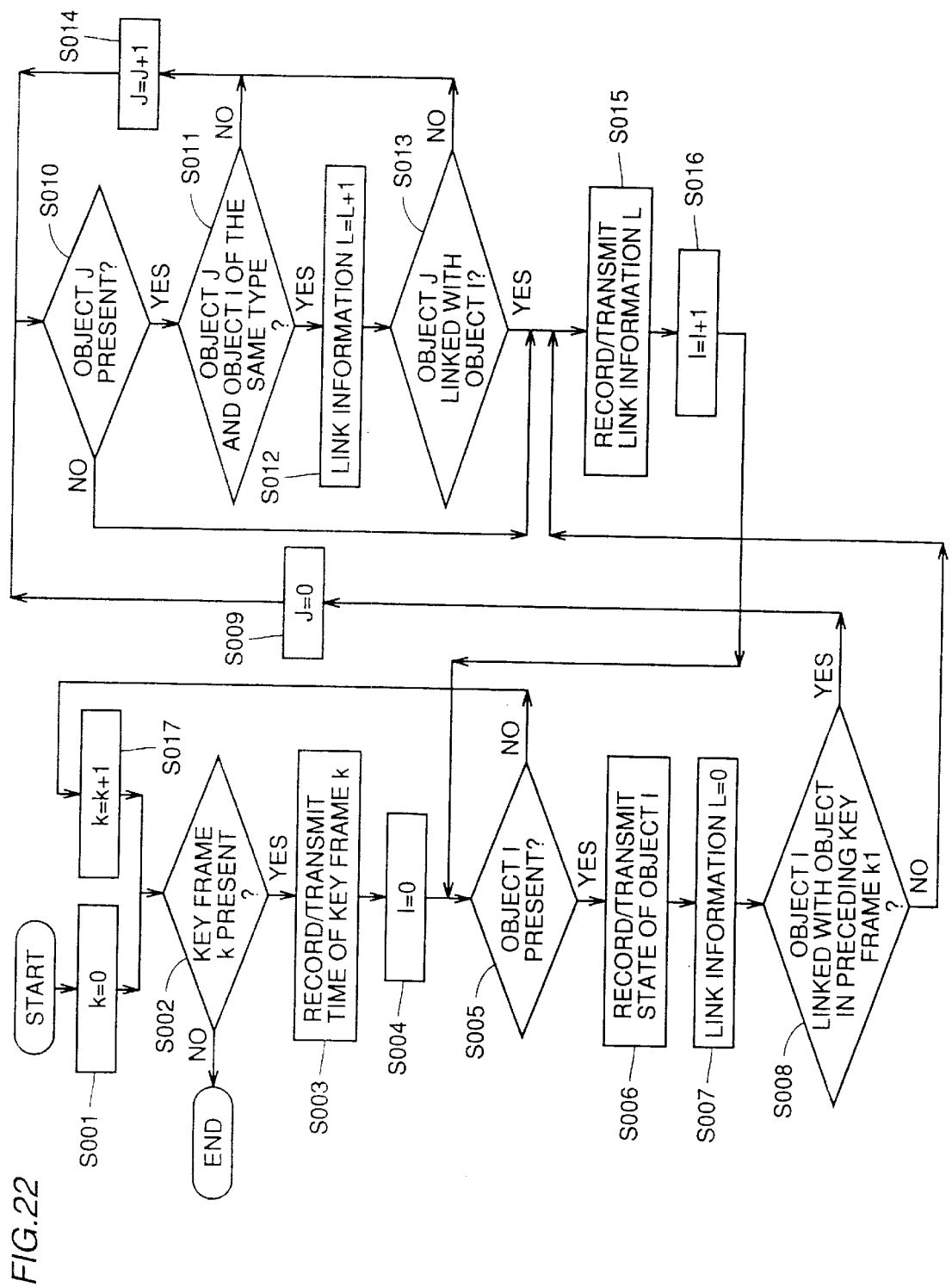
FIG. 22 is a flow chart of recording/transmission processing for animation data according to the first embodiment of the present invention.

With reference to a flow chart of the recording/transmission processing for animation data according to the first embodiment shown in FIG. 22, the recording/transmission of animation data is now described.

It is assumed that the memory 332 previously stores the data shown in FIG. 2 in accordance with the key frames of the animation shown in FIGS. 1A to 1D while also previously storing the flow chart of FIG. 22 as a program, for executing the program under control by the CPU 324.

In the flow chart shown in FIG. 22 and that shown in FIG. 25 described later, a variable k indicates the key frames at the times t0 to t3 shown in FIG. 2 by turns. A variable I indicates the objects contained in the key frames k from the object A to the object E in FIG. 2 by turns. A variable k1 indicates the key frame just preceding each key frame k. A variable J indicates the objects contained in the key frame k1 from the object A to the object E in FIG. 2 by turns. The variables k, k1, I and J have ranges of 0, 1, 2, 3, . . .

First, zero is set in the variable k (S001), and a determination is made as to whether or not any content of the key frame k is present (S002).

If no content of the key frame k is present, the series of processing is ended. If any content is present, on the other hand, a command K expressing the key frame and the time ti corresponding to the key frame k are recorded/transmitted (S003). Thus, the data 262, 268, 278 or 290 in the animation data 260 shown in FIG. 20 is recorded/transmitted.

Then, zero is set in the variable I (S004), and a determination is made as to whether or not the I-th object is present in the key frame k shown in FIG. 2 (S005). If no I-th object is present, i.e., if the processing is ended for all objects in the key frame k, the variable k is incremented by 1 for performing similar processing on the next key frame (S017).

If the I-th object is present in the key frame k, on the other hand, the state information of the object I in FIG. 2 is recorded/transmitted (S006). Thus, the state information Ai, Bi, Ci, Di or Ei of the object in the animation data 260 shown in FIG. 20 is recorded/transmitted.

Then, zero is set in the link information L for deciding the link information L corresponding to this object I (S007), and a determination is made as to whether or not the object I is linked with any object in the just preceding key frame k1 (S008). This determination is made by checking up whether or not an object corresponding to this object I is present in the just preceding key frame k1 in FIG. 2 (whether or not data is present on the same row as the object I in the key frame k1).

If the object I is linked with no object in the just preceding key frame k1, this object I appears first in the animation, and hence the link information L (=0) is recorded/transmitted (S015). Thus, the link information L of the data 264, 266, 274, 276 or 288 in FIG. 20 is recorded/transmitted. Then, the variable I is incremented by 1 for processing the next object I in this frame k (S106), and the processing following the step S005 is similarly repeated for the next object I.

If the object I is linked with an object in the just preceding key frame k1, on the other hand, zero is set in the variable J (S009). A determination is made as to whether or not the object J is present in the key frame k1 similarly to the aforementioned processing at the step S005 (S010), and the processing following the step S015 is similarly repeated if no object J is present.

If the object J is present, on the other hand, a determination is made as to whether or not the objects J and I are of the same type on the basis of the pieces of state information thereof (S011). If the pieces of state information of these objects J and I indicate information as to painted polygons or curves, for example, these objects J and I are determined to be of the same type, otherwise determined to be of different types.

If the objects J and I are determined to be of different types, the variable J is incremented by 1 (S014), and the processing following the step S010 is repeated on the next object in the key frame k1.

If the objects J and I are determined to be of the same type, on the other hand, the link information L is incremented by 1 (S012), and a determination is made as to whether or not the object J is linked with the object I, i.e., whether or not the rows of the objects J and I in the key frames k1 and k coincide with each other.

If the object J is determined as not linked with the object I, the variable J is incremented by 1 (S014), and the processing following the step S010 is similarly performed on the next object J of the key frame k1. If the object J is determined as linked with the object I, on the other hand, the link information L is recorded/transmitted (S015). Thus, the link information L of the data 270, 272, 280, 282, 284, 286, 292, 294 or 296 in FIG. 20 is recorded/transmitted. Thereafter the variable I is incremented by 1 (S016), and the processing following the step S005 is similarly performed on the next object of the key frame k.

Thus, the data shown in FIG. 2 are processed in accordance with the flow chart shown in FIG. 22, and recorded in the memory 332 or transmitted to the network/external device 336 as the animation data 260 shown in FIG. 20.

It is assumed here that a newly defined type of object X is added to the animation shown in FIG. 2.

FIGS. 23 and 24 illustrate data of the key frame animation and recorded/transmitted animation data in case of adding the new type of object X to the animation shown in FIGS. 1A to 1D.

FIG. 23 shows the data of the key frame animation shown in FIG. 2 with addition and definition of the new object X, and FIG. 24 shows animation data 350 obtained in case of recording/transmitting the data of FIG. 23 in the method according to the first embodiment.

The animation data 350 further include data 366, 378 and 388 as compared with the animation data 260, due to the addition of the new object X. The data 366 indicates that the object X appears in the key frame at the time t1 first, and hence its link information L is zero. Each of the data 378 and 388 indicates linkage with the first object X in the same type of objects in the just preceding key frame, and hence its link information L is 1.

Except the data 366, 378 and 388, the animation data 350 shown in FIG. 24 are identical to the animation data 260 shown in FIG. 20.

FIG. 3 shows an exemplary format for recording the data shown in FIG. 2 in a storage medium or the like in practice in accordance with the first embodiment of the present invention. Referring to FIG. 3, animation information 100 includes a plurality of pieces of key frame information 102, 104, . . . For example, the key frame information 102 includes a time for presenting this key frame and object information related to objects to be presented in the key frame. Each object information includes an identification number and state information of the object. This also applies to the remaining pieces of key frame information 104, . . .

Figure 4:
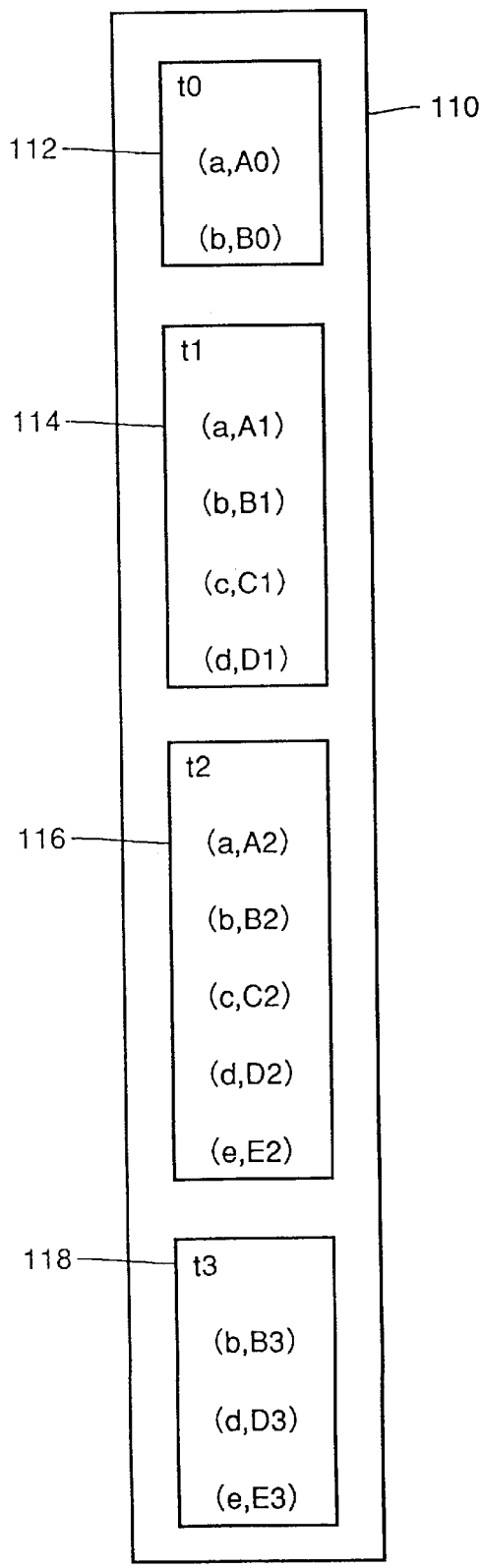
FIG. 4 typically shows data contents of the data shown in FIG. 2 recorded in accordance with the data format in accordance with the first embodiment.

FIG. 4 shows exemplary animation information created by recording the data shown in FIG. 2 in the format shown in FIG. 3, for example. Referring to FIG. 4, animation information 110 includes pieces of key frame information 112, 114, 116 and 118. The key frames corresponding to the pieces of key frame information 112, 114, 116 and 118 are to be presented at the times t0, t1, t2 and t3 respectively.

For example, the key frame information 112 includes object information of the objects to be presented at the time t0.

In first object information (a, A0), "a" and "A0" denote an identification number indicating that this object information is related to the object A and state information of the object A at the time t0 respectively. In second object information (b, B0), "b" denotes an identification number indicating that this object information is related to the object B, and "B0" indicates that this object information is state information of the object B at the time t0. From the above description and FIGS. 1A to 3, the meanings of respective symbols shown in FIG. 4 are obvious for those skilled in the art. Hence, redundant description is omitted.

The times (t0 to t3) for the respective frames and the identification numbers can be recorded in various expression methods. For example, the times can be expressed in numerical values in the unit of 1/1000 sec. The identification numbers may be expressed in numerals exceeding zero, not overlapping with each other for different objects.

State information of objects can also be expressed in various methods. For example, state information of objects can be expressed through commands. Exemplary state information of a painted polygon expressed through a command is as follows:

P p1, p2, p3, x1, y1, x2, y2, . . . , xn, yn where P represents a command indicating that this object is a painted polygon. The parameters p1 to p3 express the color number of this polygon, the number of the paint pattern, and the number of the apices of the polygon respectively. Symbols x1, y1, x2, y2, . . . , xn, yn (n=p3) represent x- and y-coordinates of the apices of the polygon respectively. In the following description, it is assumed that various types of patterns are previously registered as paint patterns for polygons and the parameter p2 specifies any of the patterns with a number.

Similarly, exemplary state information of a curve expressed through a command in a code system is as follows:

L p1, p2, p3, x1, y1, x2, y2, . . . , xn, yn where L represents a command indicating that this object is a curve, and the parameters p1 to p3 indicate the color number, the thickness, and the number of feature points of the curve respectively. Symbols x1, y1, x2, y2, . . . , xn, yn (n=p3) represent coordinates of the feature points of the curve respectively.

While the "objects" may be formed by various things in addition to graphics as hereinabove described, each object can be coded in a format consisting of a head of a command for identifying the type of the object and a parameter train decided by the command.

According to the first embodiment, each link information L of the recorded/transmitted animation data indicates the value counted for every object of the same type in the just preceding key frame, whereby no influence is exerted on the link information related to existing types of objects by addition of a new type of object, as described with reference to FIG. 23. Also when a new type of object is added to the recorded/transmitted animation, therefore, the information on the types of objects defined from the beginning can be regularly correctly recorded/transmitted.

SECOND EMBODIMENT

A second embodiment of the present invention is now described. The first embodiment employs the relative value in the preceding frame as to what number the link information L of the object in each key frame has when counting the objects linked with this object in the just preceding key frame for the same type of objects. On the other hand, the second embodiment employs a relative value as to what number the first object linked with a certain object has when counting the same type of objects from this object itself toward preceding frames for link information L of this object. The second embodiment can express linkage with an object in a key frame separated by at least one as to each object through this link information L, thereby attaining an effect in reduction of the animation data quantity. The second embodiment is implemented by the same device as that implementing the first embodiment.

Figure 25:
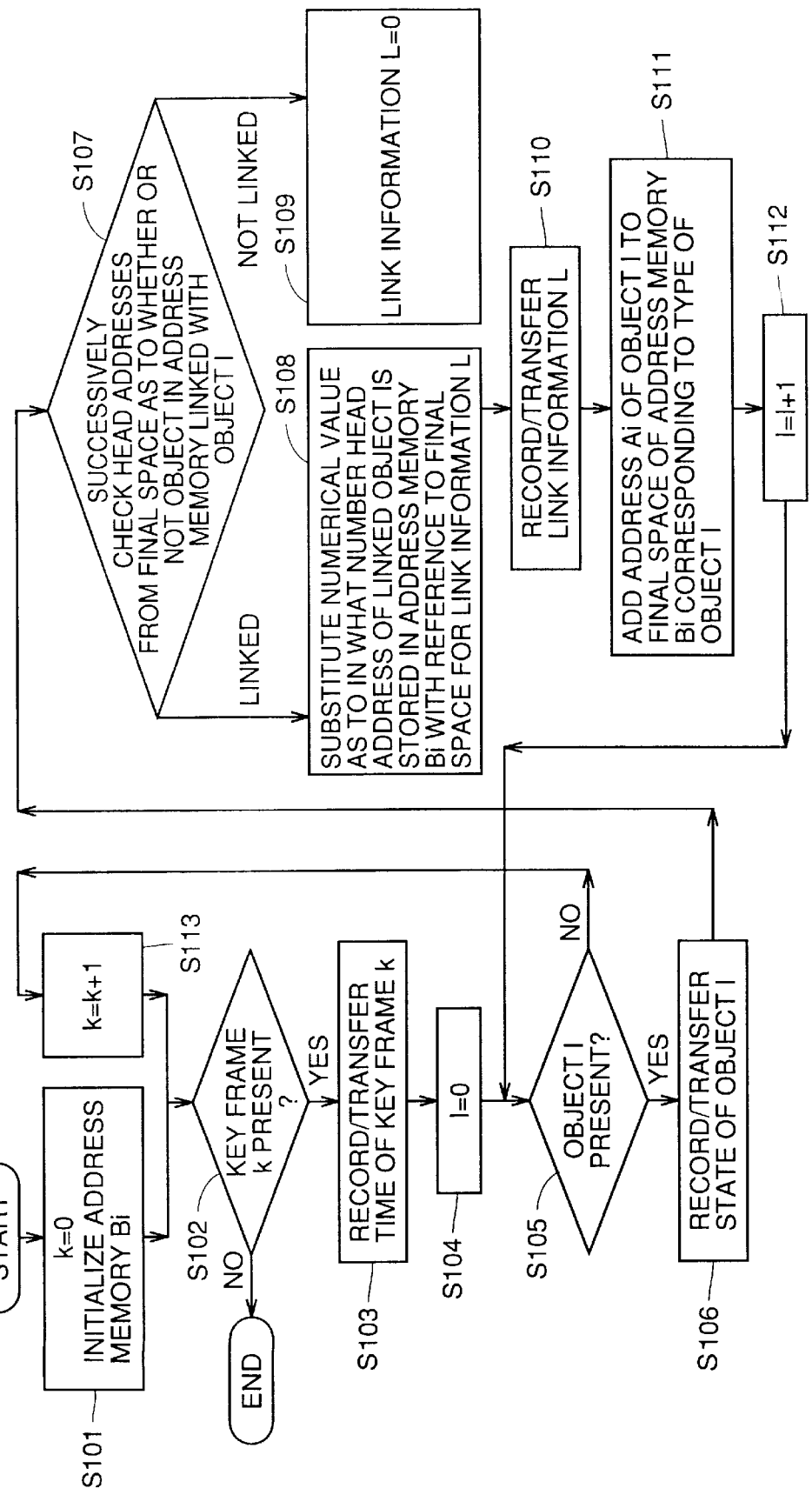
FIG. 25 is a flow chart of recording/transmisison processing for animation data according to a second embodiment of the present invention.

With reference to a flow chart shown in FIG. 25, recording/transmission processing for a key frame animation according to the second embodiment is now described. It is assumed that this embodiment is adapted to record/ transmit the key frame animation shown in FIG. 2. The memory 332 previously stores the key frame animation shown in FIG. 2, while previously storing the flow chart shown in FIG. 25 as a program to be executed by the CPU 324. Obtained animation data 400 shown in FIG. 26 are stored in the memory 332, or transmitted to the network/external device 336.

Figure 26:
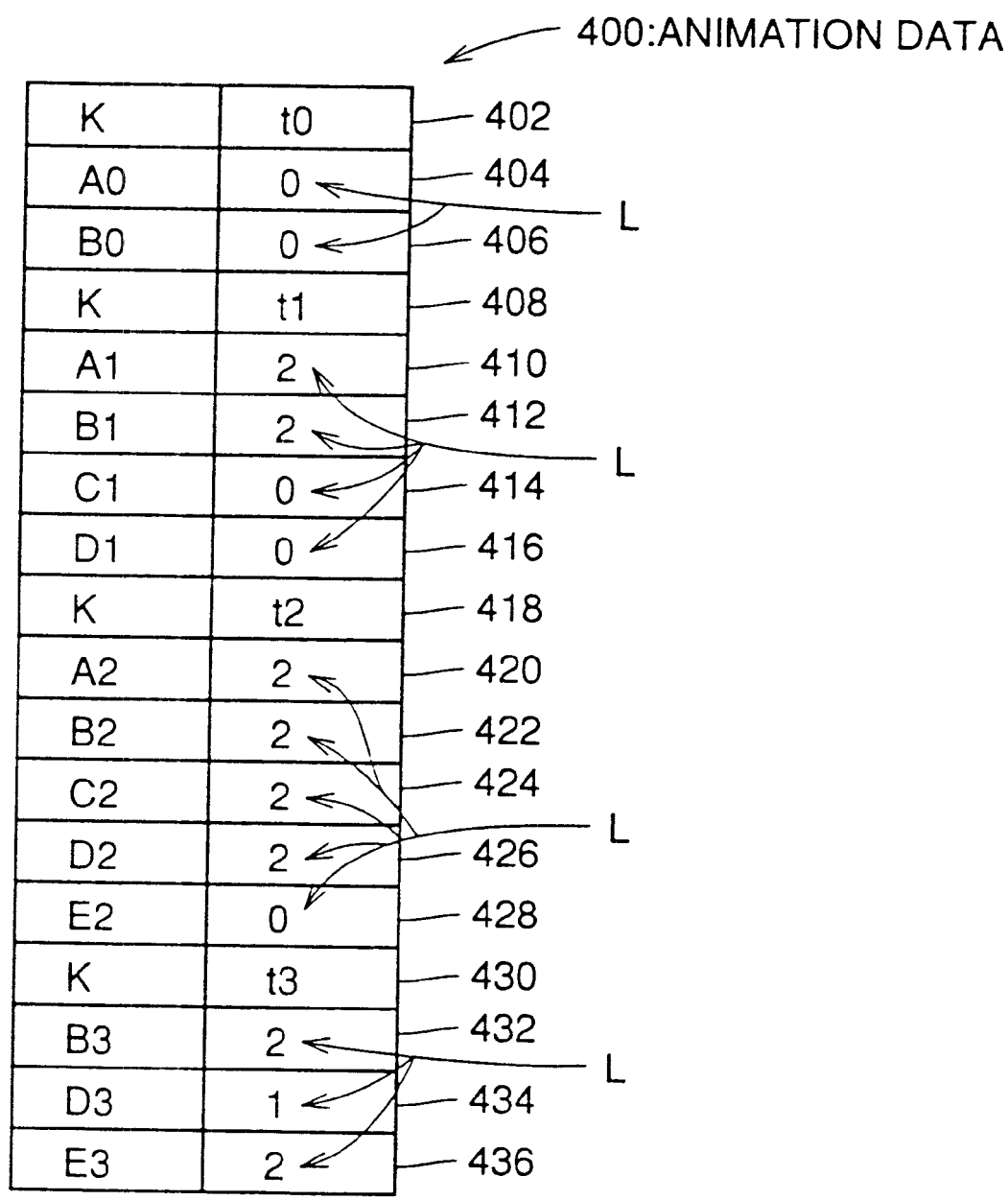
FIG. 26 shows exemplary animation data obtained in accordance with the flow chart shown in FIG. 25.

The animation data 400 shown in FIG. 26 include data 402 to 436. The data 402, 408, 418 and 430 include commands K indicating delimiters of key frames and times Ti in correspondence to the commands K. The data 402 to 436 in the animation data 400 include pieces of state information Ai, Bi, Ci, Di and Ei of objects and pieces of link information L corresponding thereto respectively.

Also in the second embodiment, it is assumed that objects A, B and E are of the same type (e.g., painted polygons), and objects C and D are of another type (e.g., curves) different from that of the objects A, B and E, similarly to the first embodiment.

The value indicated by the link information L according to the second embodiment is now described. When the link information L of a certain object is zero (corresponding to the link information L for the data 404, 406, 414, 416 or 428 shown in FIG. 26), this indicates that the object corresponding to this link information L appears not in preceding key frames but in this key frame first.

If the link information L of another object is nonzero, this value indicates what number an object first linked with this object has when backwardly counting the same type of objects toward preceding key frames with reference to the object itself.

For example, an object (object in the key frame at a time t1) corresponding to object state information k1 of the data 410 shown in FIG. 26 is linked with an object of state information A0 of the data 404, i.e., the object of the information A0 of the key frame at a time t0. Painted polygon data A0, B0 and A1 successively appear in the key frame animation between the pieces of information A0 and A1, and hence the difference 2 of order (relative difference) between the pieces of information A0 and A1 is assumed to be the link information L of the data 410.

Further, an object (object in the key frame at the time t1) corresponding to object state information B1 of the data 412 shown in FIG. 26 is a painted polygon and linked with an object of the data 406, i.e., the state information B0 in the key frame at the time t0. Painted polygon data B0, A1 and A2 successively appear in the key frame animation between the pieces of information B0 and B1, and hence the difference 2 of order (relative difference) between the pieces of information B0 and B1 is assumed to be the link information L of the data 412.

Similarly, state information A2 (data 420) of a painted polygon in the key frame at a time t2 corresponds to the state information A1 for the painted polygon of the key frame at the time t1, and the painted polygon data A1, B1 and A2 appear in this order. Thus, link information L corresponding to the information A2 is 2. Similarly, link information L for the information B2 of the data 422 is also 2.

On the other hand, state information C2 (data 424) of a curve in the key frame at the time t2 corresponds to state information C1 of a curve of the key frame 2 at the time t1. In this case, the pieces of state information C1, D1 and C2 of the curves appear in this order, and hence the link information L is 2. A curve corresponding to state information D2 of the data 426 is linked with that of the state information D1 of the just preceding key frame (at the time t1), and the pieces of state information D1, C2 and D2 appear in this order. Thus, link information L of the data 426 is 2.

Similarly, a painted polygon (data 432) of state information B3 in the key frame at a time t3 appears along the order of B2, E2 and B3 from the painted polygon of the state information B2 of the just preceding key frame (time t2), and hence the link information L of the data 432 is 2. A painted polygon (data 436) of state information E3 appears along the order of E2, B3 and E3 from the painted polygon of the information E2 of the just preceding key frame, and hence the link information L of the data 436 is 2. On the other hand, a curve (data 434) of the information D3 of the key frame at the time t3 is linked with that of the information D2 in the just preceding key frame (time t2). When only the curves are checked up, the pieces of information D2 and D3 appear in this order, and hence the link information L of the data 434 is 1.

The recording/transmission processing for the animation data according to the second embodiment is now described with reference to the flow chart shown in FIG. 25.

First, zero is set in a variable k, for setting the first key frame (time t0). An address memory Bi for counting the link information L is initialized (S101). The address memory Bi is provided in the memory 332 for every type of objects, for successively storing head addresses of the respective pieces of state information of the objects shown in FIG. 2 in the memory 332.

Then, a determination is made as to whether or not a key frame k is present, similarly to the processing at the the series of processing is ended. If the key frame k is present, on the other hand, a command (K) expressing this key frame k and the time thereof are recorded/transmitted (S103). Thus, the data 402, 408, 418 or 430 in the animation data 400 is recorded/transmitted.

Then, zero is set in a variable I for processing an object (S104), and a determination is made as to whether or not an object I is present in the key frame k, similarly to the processing at the step S005 in FIG. 22 (S105).

If no object I is present, the variable k is incremented by I for performing the processing following the step S102 as to the next key frame (S113). If the object I is present in the key frame k, on the other hand, the corresponding state information in FIG. 2 is recorded/transmitted (S106). Thus, the state information Ai, Bi, Ci, Di or Ei in the animation data 400 is recorded/transmitted.

Then, the head addresses stored in the address memory Bi corresponding to the type of the object I are successively checked from the final space corresponding to the most recently stored head address, for determining whether or not the object corresponding to any head is address stored therein is linked with the object I (S107).

Namely, the head addresses stored in the memory Bi are successively checked from the final space, for determining that an object corresponding to information whose row position in FIG. 2 first coincides with that of the state information of the object I in FIG. 2 is linked with the object I among the pieces of state information in FIG. 2 shown by the head addresses respectively. If no coincidence of the row positions is recognized, therefore, the link information L of the object I is zero (S109).

If an object linked with the object I is present, on the other hand, a value indicating in what number the head address of the linked object is stored in the address memory Bi with reference to the final space is set in the link information L for the object I (S108).

Then, the link information L of the object I obtained by checking the address memory Bi is recorded/transmitted (S110). The head address Ai in the memory 332 storing the state information L of the object I is additionally stored in the final space of the corresponding address memory Bi (S111). The variable I is incremented by 1, for repeating the processing following the step S105 for the next object I similarly to the above.

In the flow chart shown in FIG. 25, the same type of objects appearing in the key frame is counted with no regard to the boundaries between the key frames (the data 402, 408, 418 and 430 in FIG. 26), whereby link information L for objects between key frames separated from each other by at least two can be recorded/transmitted.

Due to this feature, data of an animation containing slowly and quickly moving objects, for example, can be efficiently recorded/transmitted. This is now described.

FIGS. 27A to 27F are adapted to illustrate exemplary application of the animation data recording/transmission processing according to the second embodiment of the present invention.

When an object (painted polygon) 450 expressing a background mountain is slowly moved while an object (curve) 452 expressing a flying bird quickly moves its wings as shown in four key frames at times t0 to t3 in FIGS. 27A to 27D, the key frames for recording/transmitting the object 450 can be defaulted.

Namely, if the object 450 is uniformly moved at the times t0 to t3 as shown in FIGS. 27A to 27D, only state information Ri of this object 450 in the key frames at the times t0 and t3 may be recorded/transmitted. In this case, the object 450 in the key frame at the time t3 is recorded/transmitted to be directly linked with the object 450 in the key frame at the time to, so that the object 450 in the intermediate frames can be automatically generated from the pieces of state information of the object 450 in these frames.

In operation, the CPU 324 previously prepares data shown in FIG. 27E along the key frames shown in FIGS. 27A to 27D, and stores the same in the memory 332. Thereafter animation data 460 shown in FIG. 27F are recorded in the memory 332 or transmitted to the network/external device 336 from the data shown in FIG. 27E in accordance with the flow chart of FIG. 25.

The animation data 460 shown in FIG. 27F include no data corresponding to the object 450 in the key frames at the times t1 and t2, while link information L of data 480 is 1 and the object 450 at the time t3 is directly linked with the object 450 at the time t0. Therefore, the object 450 in the intermediate frames between the times t0 and t3 can be interpolatively generated through the objects 450 linked with each other between the times t0 and t3.

The second embodiment also obtains the value of the link information L for every object of the same type, similarly to the first embodiment. Even if an undefined new type of objects are added to the animation, therefore, at least data related to existing types of objects can be regularly correctly recorded/transmitted, and compatibility of the animation data can be held with respect to such addition of the undefined type of objects.

According to each of the first and second embodiments, further, only data related to key frames in the animation are recorded/transmitted, whereby the quantity of data to be recorded/transmitted can be reduced as compared with the case of recording/transmitting data of all frames. When data related to each key frame are recorded/transmitted, further, no data of objects not appearing in this key frame are recorded/transmitted, whereby the data quantity can be further reduced.

In the animation data of the recorded/transmitted key frames, the objects are not individually identified through identification information but identified through linkage between the key frames by the link information L. Thus, the information quantity of the link information L, which is the relative value between the linked objects as hereinabove described, can be reduced as compared with an information quantity for identifying the respective objects, and the quantity of the recorded/transmitted animation data can be further reduced.

Due to the aforementioned feature capable of reducing the animation data quantity, the animation data can be recorded in a recording medium of a small capacity such as a floppy disk, an IC card or the like, which has generally been incapable of recording animation data.

Due to the aforementioned feature, further, a larger quantity of animation data can be recorded in a recording medium of a constant capacity as compared with the prior art, whereby a large quantity of animation information can be recorded in dictionary data or manual data.

Due to the aforementioned feature, in addition, a larger quantity of animation data can be transmitted in a shorter time as compared with the prior art.

THIRD EMBODIMENT

FIG. 21 is a schematic block diagram showing an animation information compression unit 310 for executing a method according to a third embodiment of the present invention. Referring to FIG. 21, this unit 310 includes a computer 324 which is connected to a network 336, an external memory device 320 consisting of a hard disk, a floppy disk or the like for recording animation information and recording or outputting the same in response to an input/output request from the computer 324, a display unit 322 which is connected to the computer 324 for displaying an animation, a keyboard 328 for inputting necessary commands and data, and a coordinate input unit 326 consisting of a tablet, a digitizer or a mouse.

The computer 324 includes an arithmetic processing unit 330 consisting of a microprocessor or the like for implementing the method according to the present invention by executing a program having a control structure along a flow chart described later, an interface circuit 334 between the arithmetic processing unit 330 and the network 336 and other peripheral devices, and a memory 332 for storing the program executed by the arithmetic processing unit 330 and data necessary for the processing.

Operations of the unit 310 are similar to those of a general computer. Namely, the arithmetic processing unit 330 sequentially reads and executes instructions stored in the memory 332, and changes the executed instructions, data processed by the instructions, and positions storing and reading the data etc. in accordance with the control structure of the program, thereby implementing functions described later. The operations of a general computer are well-known to those skilled in the art, and hence redundant description is omitted.

In the following example, a case of compressing animation information for the animation of the presentation shown in FIGS. 5A to 5D is described. The basic outline of the data required in this case is as shown in FIG. 6, and it is assumed that the data shown in FIG. 7 are previously prepared.

Figure 7:
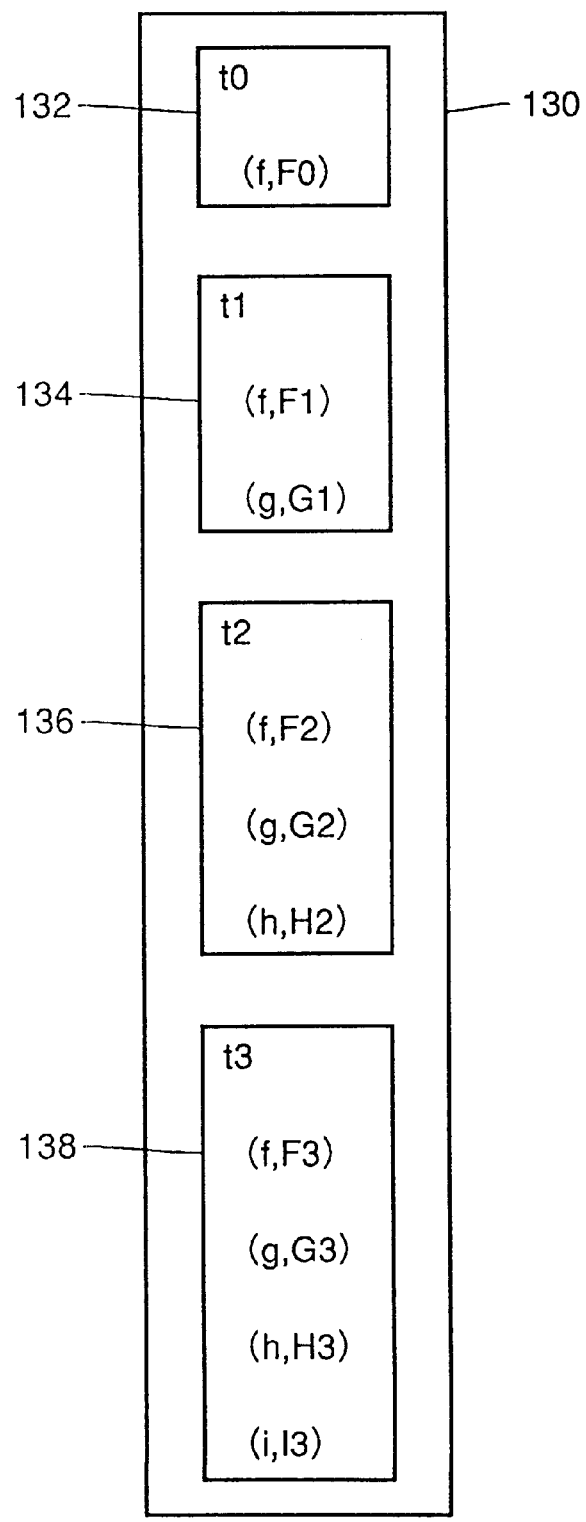
FIG. 7 shows a data structure in case of recording the key frame information shown in FIG. 6 in accordance with the first embodiment.

FIG. 7 expresses an example of the data shown in FIG. 6 in accordance with the first embodiment of the present invention. Referring to FIG. 7, animation information 130 includes four pieces of key frame information 132, 134, 136 and 138 corresponding to the key frames shown in FIGS. 5A to 5D respectively. For example, the key frame information 132 expresses the key frame shown in FIG. 5A, and includes a display time t0 and graphic information (f, F0) related to the object F0 forming the background image. In the graphic information (f, F0), "f" indicates the identification number of the object F expressed by the graphics F0 to F3, and "F0" indicates state information of the object F at the time of this key frame.

The remaining pieces of key frame information 134, 136 and 138 are similar in structure to the key frame information 132.

Figure 28:
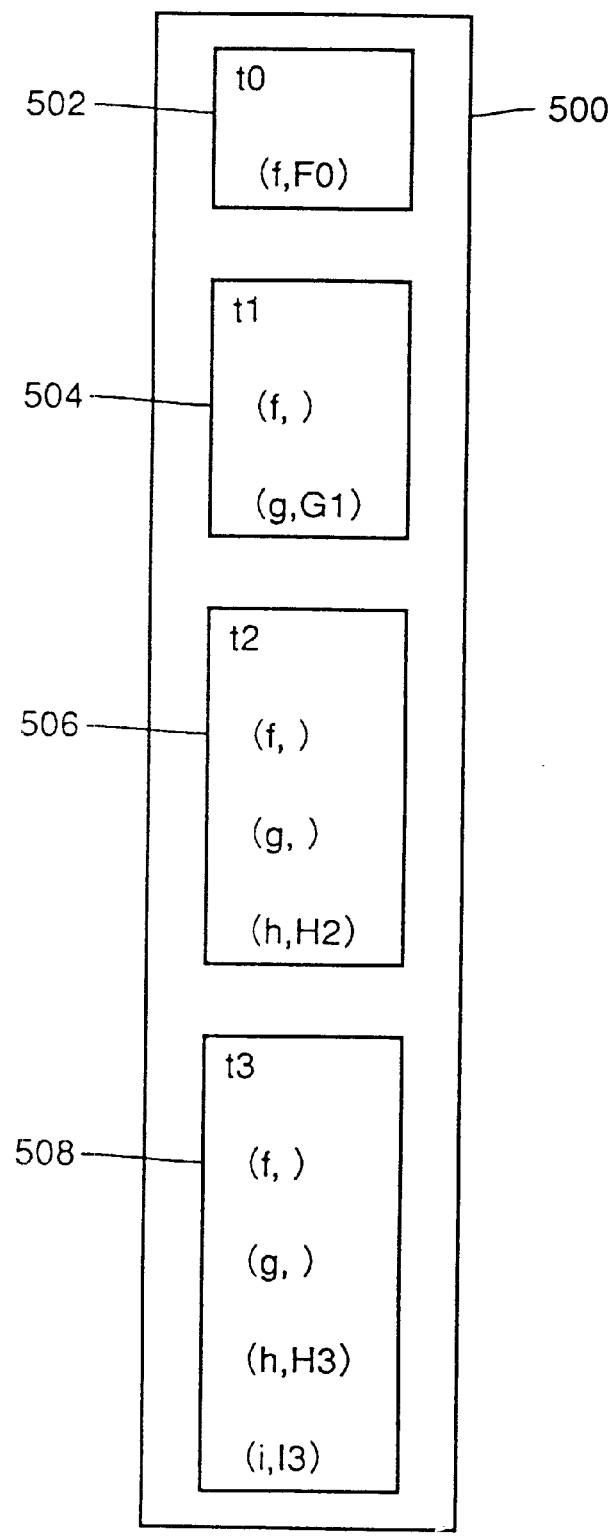
FIG. 28 typically shows a data format of animation information according to a third embodiment of the present invention.

This embodiment is adapted to compress the animation information by converting the data shown in FIG. 7 to a format shown in FIG. 28. While the following description is made with reference to the case of temporarily preparing the animation information shown in FIG. 7 and thereafter compressing the same, the animation information of the data format shown in FIG. 28 may be directly created without creating the data shown in FIG. 7.

Referring to FIG. 28, animation information 500 outputted by the method of this embodiment includes four pieces of key frame information 502, 504, 506 and 508, for example. These pieces of key frame information 502, 504, 506 and 508 correspond to the key frames shown in FIGS. 5A to 5D respectively.

The key frame information 502 corresponds to the head key frame of the animation. According to this embodiment, this key frame information 502 is identical to the key frame information 132 shown in FIG. 7. This key frame information 502 serves as the reference for compressing the following key frames.

Figure 5A:
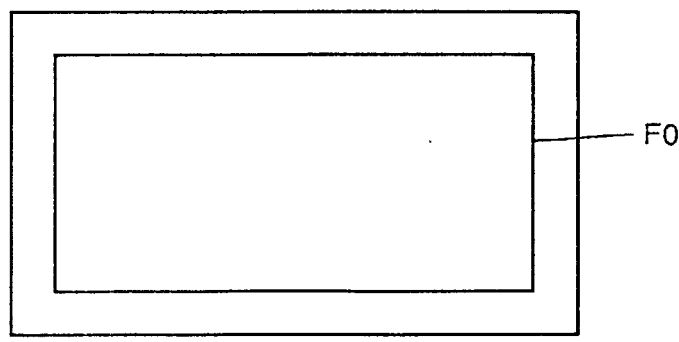
FIGS. 5A to 5D typically show key frames of a presentation animation.
Figure 5B:
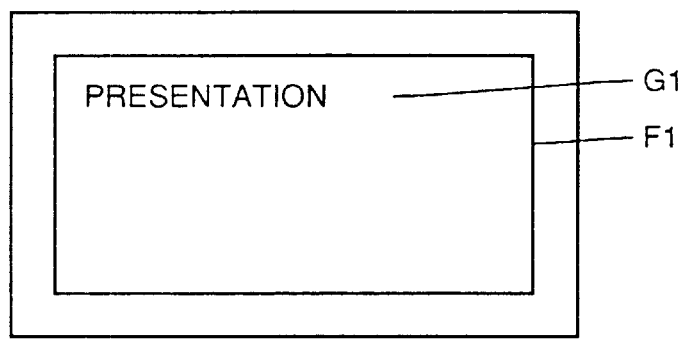

The key frame information 504 corresponds to the key frame shown in FIG. 5B. This key frame information 504 includes a time t1 for displaying this key frame, graphic information (f,) related to the object F1 forming the background, and graphic information (g, G1) related to the graphic G1 consisting of the characters "presentation".

In the graphic information (f,), "f" is an identification number indicating that this object information relates to the object F formed by the objects F0 to F3 shown in FIGS. 5A to 5D, similarly to that shown in FIG. 7. The feature of this graphic information resides in that the same includes no state information of the object F1 forming the background in FIG. 5B, which has been shown as "F1" in the example shown in FIG. 7, but a mere blank (state with no data). This indicates that the state of the object F is identical to the state information F0 related to the object F in the key frame information 502 in this key frame information 504. Thus, only the identification number indicating the correspondence (linkage) between the objects is recorded in relation to object information having the same state information as the preceding frame. Thus, the quantity of data necessary for expressing object information can be absolutely defaulted in relation to an object having the same state information as the preceding frame. In an animation having the same state information as the preceding frame, therefore, the quantity of data for recording or transmitting the same can be remarkably reduced. In restoration of the animation, corresponding state information of the preceding key frame may be used for that having no state information.

The graphic information (g, G1) in the animation information 504 corresponds to the object G1 consisting of the characters "presentation" shown in FIG. 5B. The object G1, corresponding to the objects G2 and G3 appearing in FIGS. 5C and 5D respectively and indicating the object G. appears in the key frame shown in FIG. 5B first. Therefore, the key frame information 504 stores the state information G1 of the object G as such along with its identification number g.

Figure 5C:
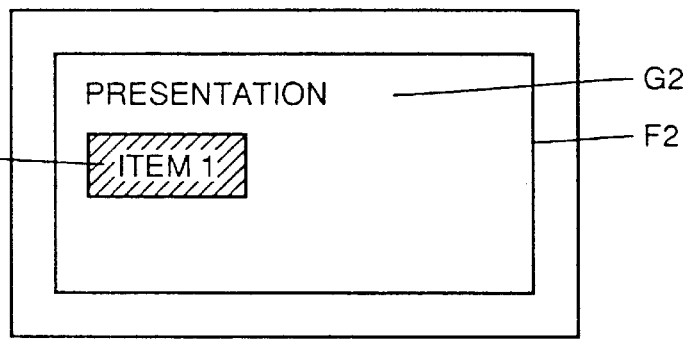

The key frame information 506 has the following feature: As shown in FIG. 5C, the background object F (F2) and the object G consisting of the characters "presentation" are absolutely identical to those of the preceding key frame. Therefore, the pieces of object information therefor are (f,) and (g,) respectively, and no pieces of state information identical to those in the preceding frame are recorded. On the other hand, the object H2 (object H) consisting of the characters "item 1" appears in this key frame first, and hence its object information (h, H2) is recorded.

Figure 5D:
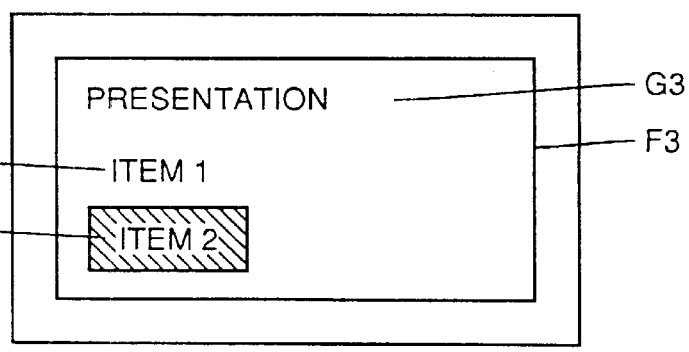

The feature of the object information 508 resides in that only background information of the characters changes from the object H2 shown in FIG. 5C to the object H3 shown in FIG. 5D as to the state of the object H and hence object information H3 including only the background information of the characters is recorded, while only the pieces of object information (f,) and (g,) are recorded for the objects F and G whose states are absolutely identical to those in the preceding frame. As to the object I appearing in this key frame first, object information therefor is entirely recorded.

Thus, no state information is recorded at all in relation to an object which is in the same state as that in the preceding frame. In relation to an object whose state information is only partially different from that of the corresponding object in the preceding frame, on the other hand, only the different object information is recorded. Thus, state information identical to that in the preceding frame may not be recorded in the state information of each object, whereby the storage capacity or the transmission quantity for recording/transmitting the animation information can be advantageously reduced.

Figure 29:
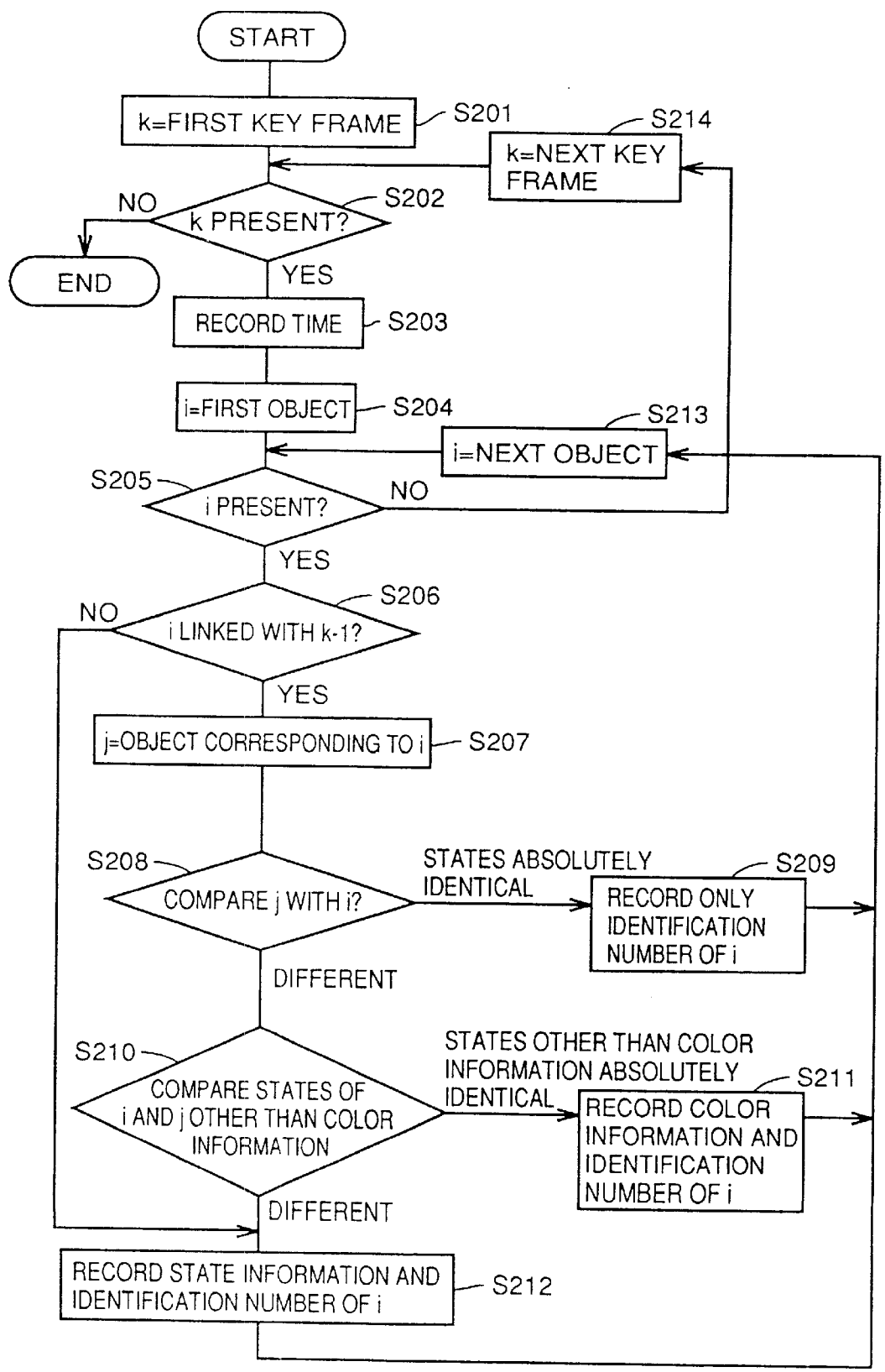
FIG. 29 is a flow chart of a program for implementing the third embodiment.

With reference to FIG. 29, description is now made on a program for creating the compressed animation information 500 shown in FIG. 28 from the animation information 130 shown in FIG. 7 in the unit shown in FIG. 21. First, a variable k expressing the order of the processed key frame is set at a value indicating the first key frame at a step S201 (hereinafter the term "step" may be omitted). The key frame denoted by this variable k is hereinafter referred to as a "key frame k".

Then, a determination is made as to whether or not any content of the key frame k is present. If no key frame k is present, the processing is ended. If the key frame k is present, on the other hand, the processing advances to a step S203.

At S203, information of "display time" included in the key frame information corresponding to the key frame k is recorded or transmitted. In this specification, recording or transmission is referred to as "outputting". In this case, the discrepancy merely resides in whether the information is outputted to a storage medium or a transmission medium, and the outline of the control structure of the program shown in FIG. 29 remains absolutely unchanged. The data transmitted here is the display time "t0" in the key frame information 502 shown in FIG. 28, for example.

Then, a variable i for specifying an object in the key frame k is set at a value indicating the first object in the key frame k at S204. The object indicated by the variable i is hereinafter referred to as "object i".

At S205, a determination is made as to whether or not the object i is present in the key frame k. If no object i is present in this key frame k, the control advances to S214. Processing following S214 is described later. If the object i is present, on the other hand, the control advances to S206.

At S206, a determination is made as to whether or not the object i is linked with an object in a just preceding key frame k−1. In more concrete terms, a determination is made as to whether or not object information having the same identification number as the object i is present in key frame information corresponding to the key frame k−1. If the object i is linked with the object in the preceding key frame k−1, the control advances to S207. Otherwise the control advances to S212.

At S207, the object corresponding to the object i, i.e., the object linked with the object i is retrieved in the key frame information corresponding to the key frame k−1, and this object is assumed to be an object j. At S208, the states of the objects i and j are compared with each other. If these states are absolutely identical to each other, the control advances to S209. If the states are at least partially different from each other, on the other hand, the control advances to S210.

At S209, only the identification number of the object i is outputted and the control advances to S213. Due to the processing at S208 and S209, the object information (f,) in the key frame information 504 shown in FIG. 28 is created, for example.

At S210, pieces of information of the objects i and j other than pieces of color information are compared with each other. The control advances to S211 if the states other than the pieces of color information are entirely identical to each other, otherwise the control advances to S212. At S211, the color information and the identification number of the object i are outputted. Due to this processing, object information (h, H3) in the key frame information 508 shown in FIG. 28 is created, for example. After S211, the control advances to S213.

At S212, on the other hand, all pieces of state information and the identification number of the object i are outputted. Data thereby created are pieces of object information (f, F0), (g, G1), (h, H2) and (i, I3) in the pieces of key frame information 502, 504, 506 and 508 shown in FIG. 28, for example. At S213, the object i is set as the next object in the key frame k, and the control returns to S205. If a determination is made at S205 that no object i is present, on the other hand, the control advances to S214 so that the key frame k is set as the next key frame, and the control returns to S202.

In the program having the control structure shown in FIG. 29, no preceding key frame is present for the head key frame, and hence the result of the determination at S206 is necessarily of NO and the pieces of state information of all pieces of object information are outputted at S212. The processing at S202 to S214 is repeatedly executed on the second and following pieces of key frame information, and the processing is ended when no key frame information to be processed is present. Due to this processing, only the identification number is recorded for the object information having a state absolutely identical to that of the corresponding object information in the just preceding key frame, as hereinabove described. As to object information having state information partially different from that in the preceding key frame, on the other hand, only the different state information is recorded. Thus, the data quantity of the animation information is extremely reduced as compared with the prior art, and the storage capacity for storing the information or the transmission quantity for transmitting the same can be reduced.

FOURTH EMBODIMENT

The aforementioned third embodiment is adapted to output only the color information and the identification number of the object when its information is entirely identical to that in the preceding key frame except the color information. As already described, however, the inventive method can be similarly applied to the information other than the color information. A fourth embodiment of the present invention is related to such processing.

Figure 30:
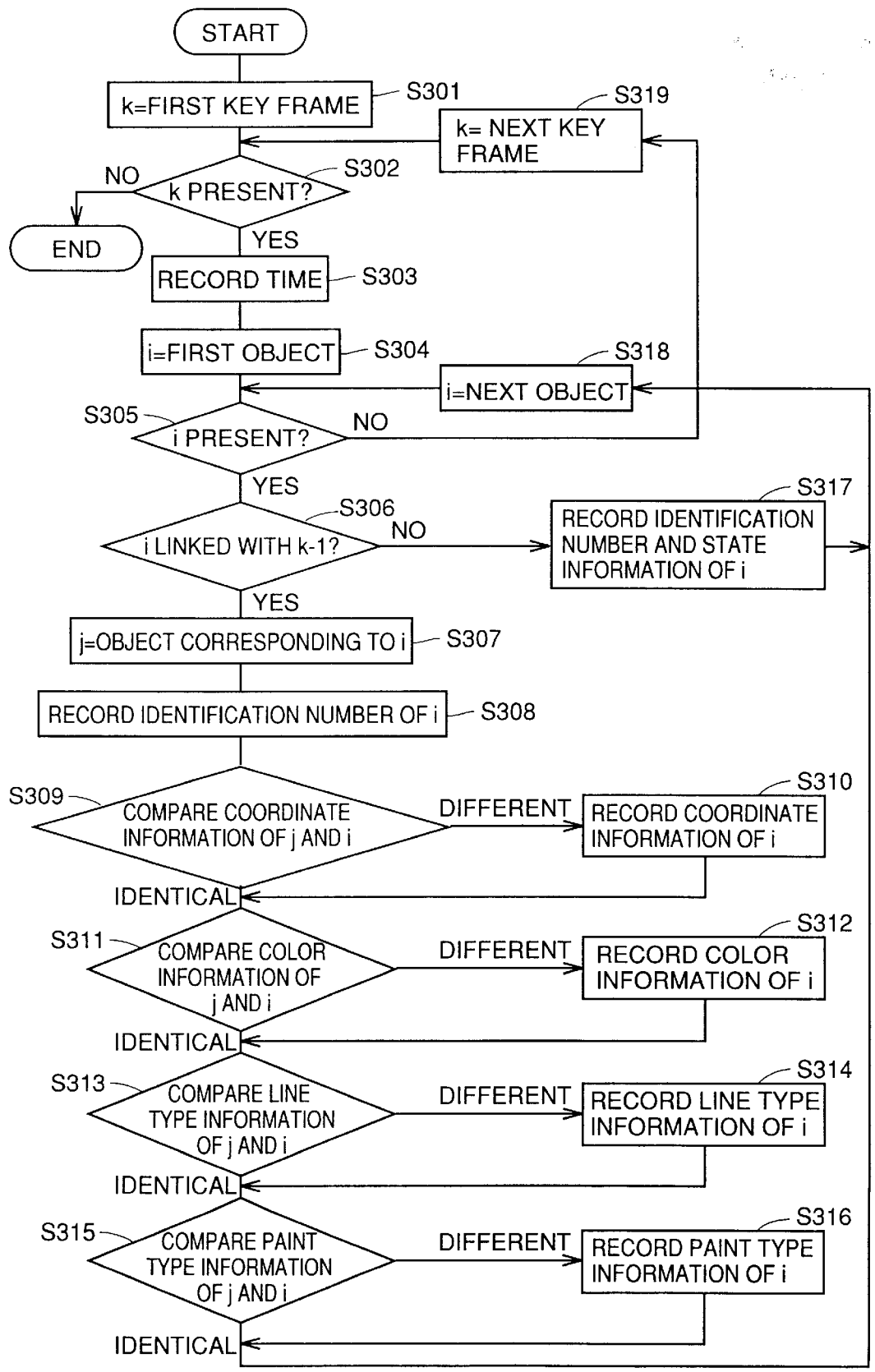
FIG. 30 is a flow chart of a program for implementing a method according to a fourth embodiment of the present invention.

The information subjected to this processing conceivably includes color information of an object, information on the type (line type) of lines forming the object, information on the paint pattern (paint type) of the object, coordinate information of the object and the like. FIG. 30 is a flow chart corresponding to a control structure of a program processing such information.

The unit for the third embodiment shown in FIG. 21 can be utilized for execution of this program as such. In other words, this processing can be implemented through a general computer.

Referring to FIG. 30, a key frame k is set as the first key frame at S301.

At S302, a determination is made as to whether or not any content of key frame information corresponding to the key frame k is present. If no corresponding key frame information is present, the processing is ended. If the corresponding key frame information is present, on the other hand, the control advances to S303. At S303, a display time for the key frame k is outputted. Namely, data indicated by "display time" in the key frame information corresponding to the key frame k is outputted.

At S304, an object i is set as the first object in the key frame k. At S305, a determination is made as to whether or not the object i is present in the key frame k. If no object i is present, the control advances to S319. If the object i is present, on the other hand, the control advances to S306.

At S306, a determination is made as to whether or not the object i is linked with any object in a preceding key frame k−1. If the object i is linked with any object in the preceding key frame k−1, the control advances to S307. Otherwise the control advances to S317. At S307, the object corresponding to the object i, i.e., that linked with the object i is retrieved in key frame information corresponding to the key frame k−1, and this object is regarded as an object j.

At S308, only information of the identification number of the object i is outputted. At S309, pieces of coordinate information of the objects i and j are compared with each other. If the pieces of coordinate information are identical to each other, the control advances to S311. Otherwise the control advances to S310.

At S310, the coordinate information of the object i is outputted. Thereafter the control advances to S311. Due to the processing at S309 and S310, the coordinate information of the object i is outputted only when the coordinate information of the object i is different from that of the object j linked with this object i. If the pieces of coordinate information are identical to each other, no coordinate information is outputted. A regenerating side decides that the coordinate information of an object having coordinate information is identical to that of the object linked with this object, and regenerates the animation.

At S311, pieces of color information of the objects i and j are compared with each other. If the pieces of color information are identical to each other, the control advances to S313. Otherwise the control advances to S312.

At S312, the color information of the object i is outputted. Thereafter the control advances to S313. Due to the processing at S311 and S312, the color information of the object i is outputted only when the color information of the object i is different from that of the object i linked with the same.

At S313, pieces of line type information of the objects i and j are compared with each other. If the pieces of line type information are identical to each other, the control advances to S315. Otherwise the control advances to S314.

At S314, the line type information of the object i is outputted. Thereafter the control advances to S315. Due to the processing at S313 and S314, the line type information of the object i is outputted only when the same is different from the line type information of the object j linked with this object i.

At S315, pieces of paint type information of the objects i and j are compared with each other. If the pieces of paint type information are identical to each other, the control advances to S318. Otherwise the control advances to S316.

At S316, the paint type information of the object i is outputted. Thereafter the control advances to S318. Due to the processing at S315 and S316, the paint type information of the object i is outputted only when the same is different from the paint type information of the object j linked with this object i.

At S317, the state information and the identification number of the object i are outputted. Thereafter the control advances to S318. At S318, the object i is set as the next object in the key frame k. The control thereafter returns to S305.

At S319, the key frame k is set as the next key frame, and the control returns to S302.

The processing at S302 to S319 is thereafter repeatedly performed. Also in this example, the determination at S306 is necessarily NO in the processing for the first key frame information, whereby identification numbers of all objects and all pieces of state information are recorded. In the second and following key frames, only the state information different from that of the linked object is recorded through the processing at S309 to S316. Due to this processing, the data quantity of the animation information is reduced, and the storage capacity or the data transmission capacity can be reduced.

The above description has been made with reference to attribute information of a polygon. However, the present invention is applicable not only to polygons, but to attribute information of other various objects. While the flow chart shown in FIG. 30 is adapted to treat processing of attributes of a polygon, information of various types of objects other than the polygon can be readily processed on the basis of the flow chart shown in FIG. 30. For example, branch processing for different types of objects may be provided between S308 and S309 shown in FIG. 30, so that the processing at S309 to S316 is prepared for every type of object.

Various attributes such as the color of characters, a decoration attribute of the characters, the direction of gradation, the strength of a sound, the intensity of light and the like are conceivable in response to the types of objects. The data quantity can be reduced by not outputting state information when pieces of state information of these attributes are identical between linked objects. On the regenerating side, key frame information can be regenerated through state information of the object linked with an object having untransmitted information.

FIFTH EMBODIMENT

Each of the third and fourth embodiments is adapted to compare object information of an object in a certain key frame with that of an object, linked with this object, in every key frame outputted just in advance of the certain key frame, for varying the contents of the outputted information with the result. However, data compression performed by comparing pieces of object information of key frames with each other is not restricted to this method.

FIGS. 8A to 8D show still another exemplary animation. The animation shown in FIGS. 8A to 8D includes repeats. This animation expresses wingbeats of a bird. Referring to FIGS. 8A to 8D, objects J0 to J3 and K0 to K3 express the body and a wing of the bird respectively. As understood from FIGS. 8A to 8D, the objects J0 to J3 remain in the same shapes in all key frames. Further, the shapes of the objects K0 and K2 and those of the objects K1 and K3 are identical to each other respectively. Thus, a number of repeats generally appear in an animation.

FIG. 9 shows the animation shown in FIGS. 8A to 8D in the form of a table. The relation between FIG. 9 and FIGS. 8A to 8D is similar to that between FIG. 2 and FIGS. 1A to 1D. Therefore, redundant description is omitted.

Figure 8A:
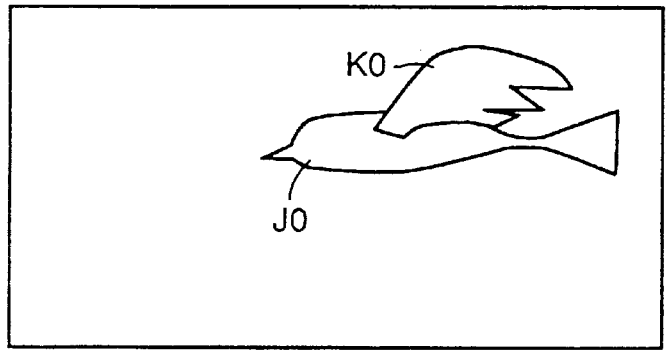
FIGS. 8A to 8D typically show exemplary key frames of an animation containing a number of repeats.
Figure 8B:
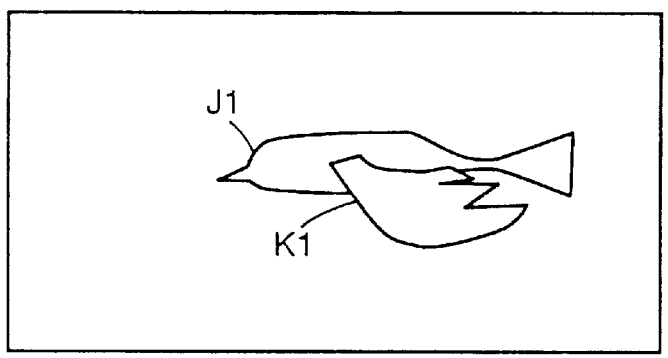
Figure 8C:
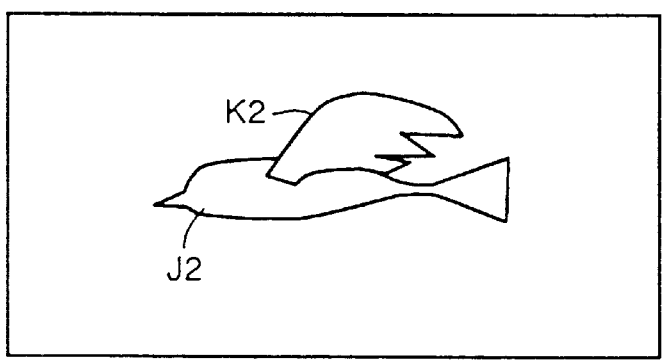
Figure 8D:
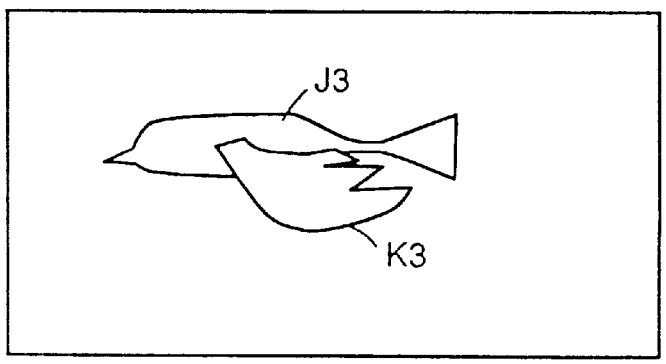

In case of the animation shown in FIGS. 8A to 8D, for example, the objects J0 and J2 as well as the objects K0 and K2 have the same shapes in FIGS. 8A and 8C. Comparing FIGS. 8B and 8C with each other, on the other hand, the objects J1 and J2 are of the same shape while the shape of the object K1 is not identical to that of the object K2. Considering only the shapes of the objects, further efficient compression can be made by comparing not the key frame shown in FIG. 8B but that shown in FIG. 8A with the key frame shown in FIG. 8C in the example shown in FIGS. 8A to 8D. According to a fifth embodiment of the present invention, object information in a certain key frame is compared with that in another key frame which is different from this key frame, and if there is a key frame having only slight or no difference, the number of this key frame is recorded in the object information of the key frame to be processed. Thus, reduction of the quantity of state information to be recorded is expected, whereby animation information can be further efficiently compressed. The fifth embodiment employing such a technique is now described.

This technique is particularly effective for the animation including repeats shown in FIGS. 8A to 8D. Repeat processing frequently appears in an animation, and hence this technique is effective for wide-ranging animations.

Figure 10:
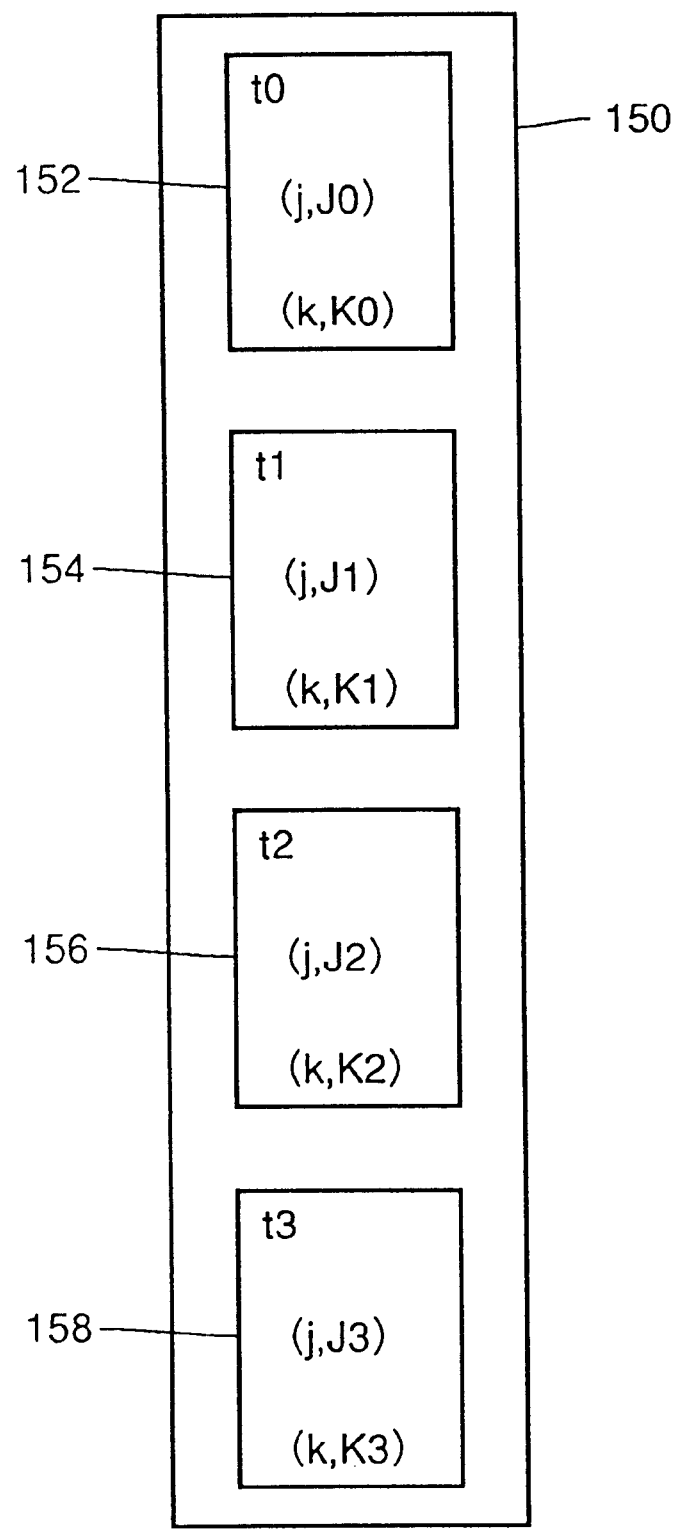
FIG. 10 typically shows a data format of animation information consisting of the key frame information shown in FIG. 9 in accordance with the first embodiment of the present invention.
Figures 11, 12A:
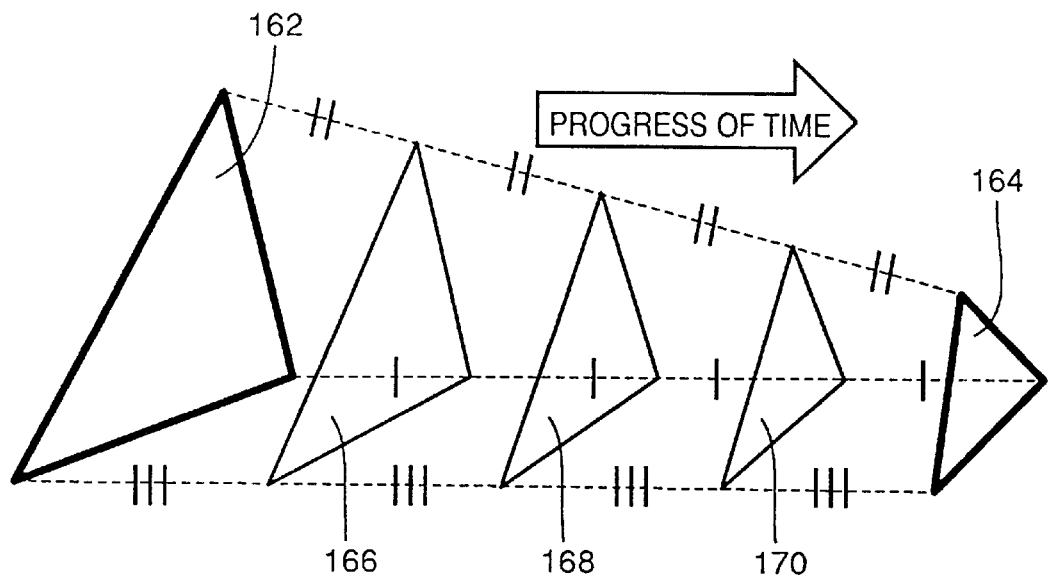
FIG. 11 typically shows the principle of an animation of a conventional key frame interpolation system.
FIGS. 12A and 12B illustrate a conventional recording formats for the data of the key frames shown in FIGS. 1A to 1D.
Figures 12B, 13:
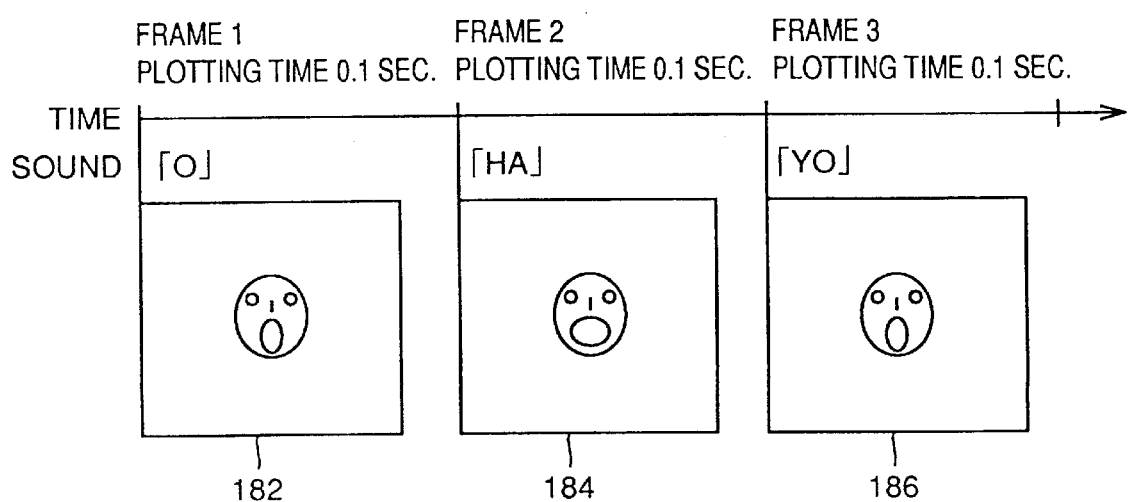
FIG. 13 shows exemplary animation display according to a conventional system.
Figure 14:
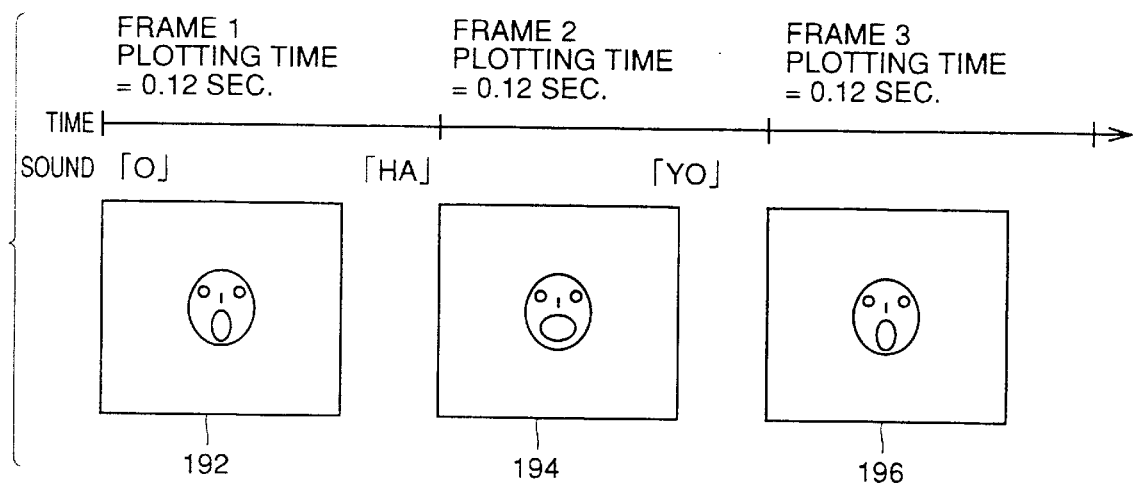
FIGS. 14 to 19 are adapted to indicate problems in an animation of a conventional key frame interpolation system.
Figure 15:
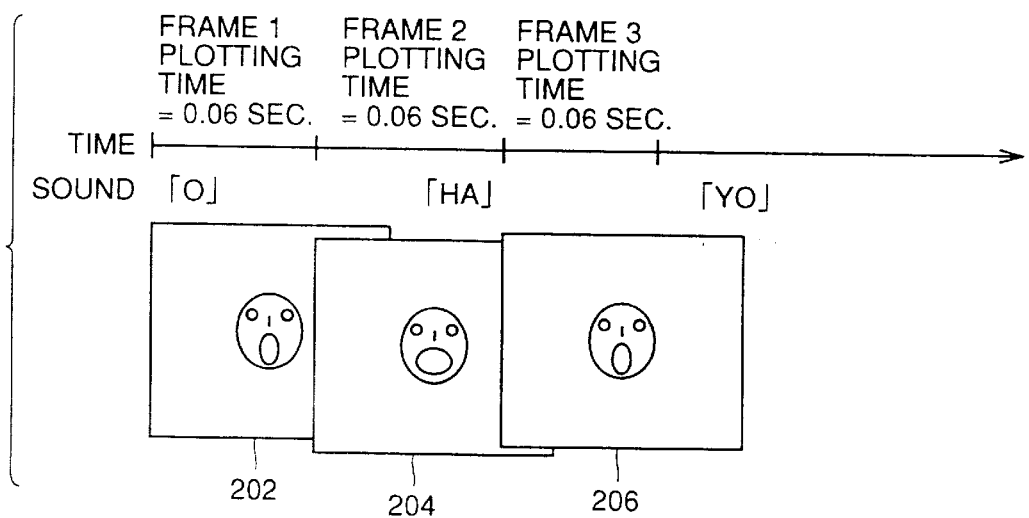
Figure 16:
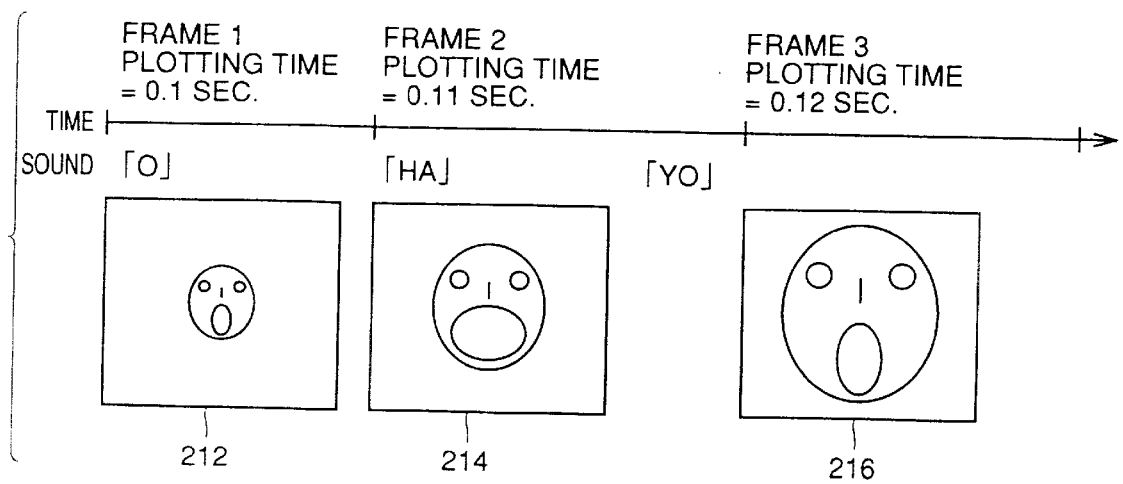
Figure 17:
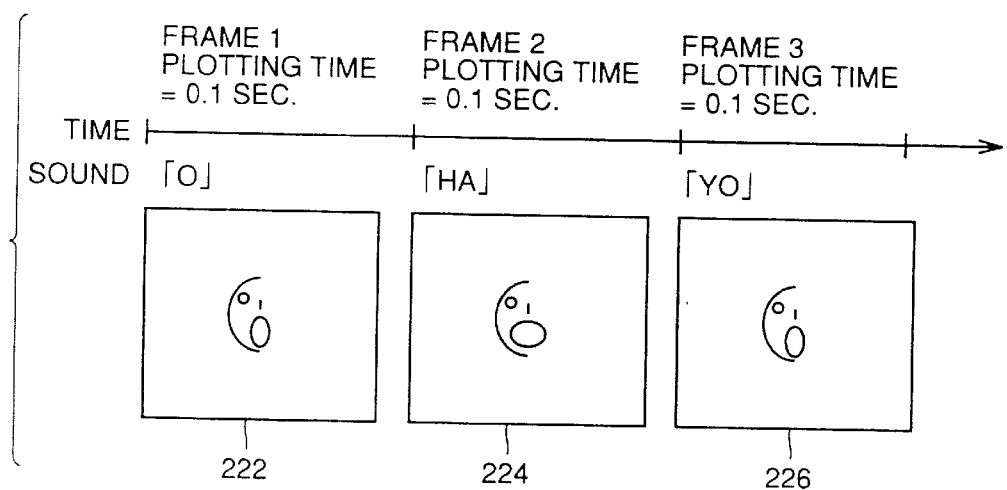
Figure 18:
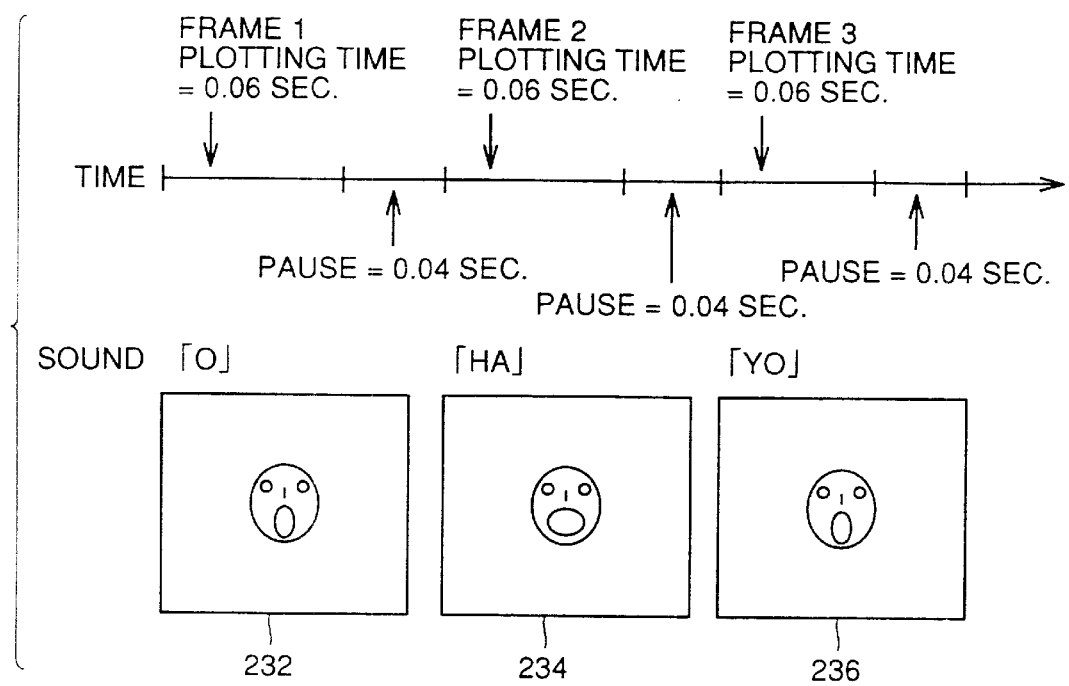
Figure 19:
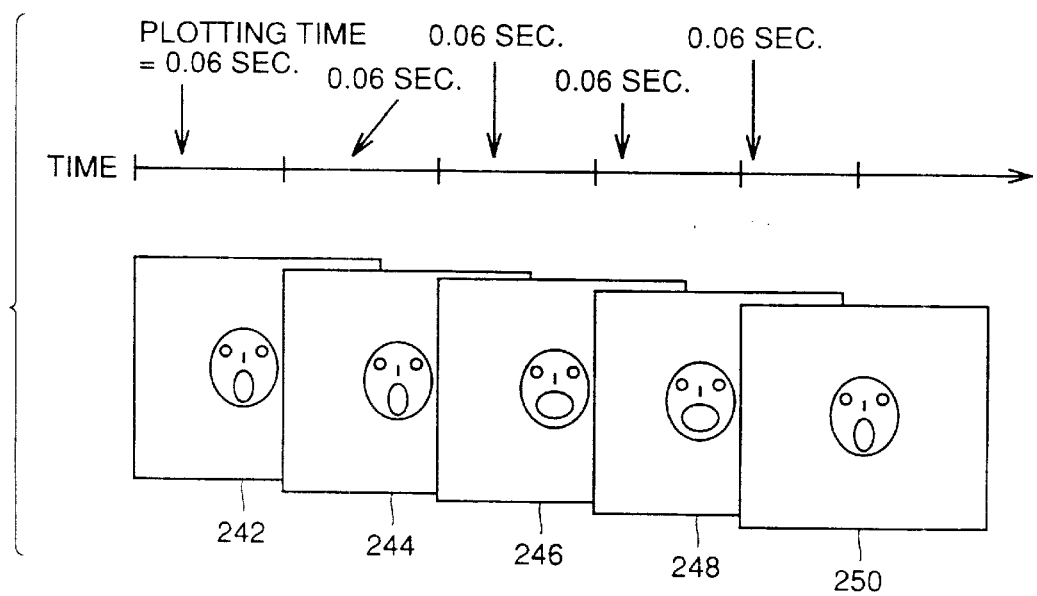

FIG. 10 shows a mode of recording the data shown in FIG. 9 in accordance with the first embodiment of the present invention. Referring to FIG. 10, this animation information 150 includes four pieces of key frame information 152, 154, 156 and 158 indicating the key frames shown in FIGS. 8A to 8D respectively. For example, the key frame information 152 corresponds to the key frame shown in FIG. 8A, and includes a display time to for this key frame and object information as to the two objects J0 and K0 In object information (j, J0), "j" denotes an identification number indicating the object J, and "J" indicates that the state of the object J is J0. The remaining pieces of key frame information 154 to 158 also have similar meanings. According to the fifth embodiment of the present invention, the data may be further compressed.

Figure 31:
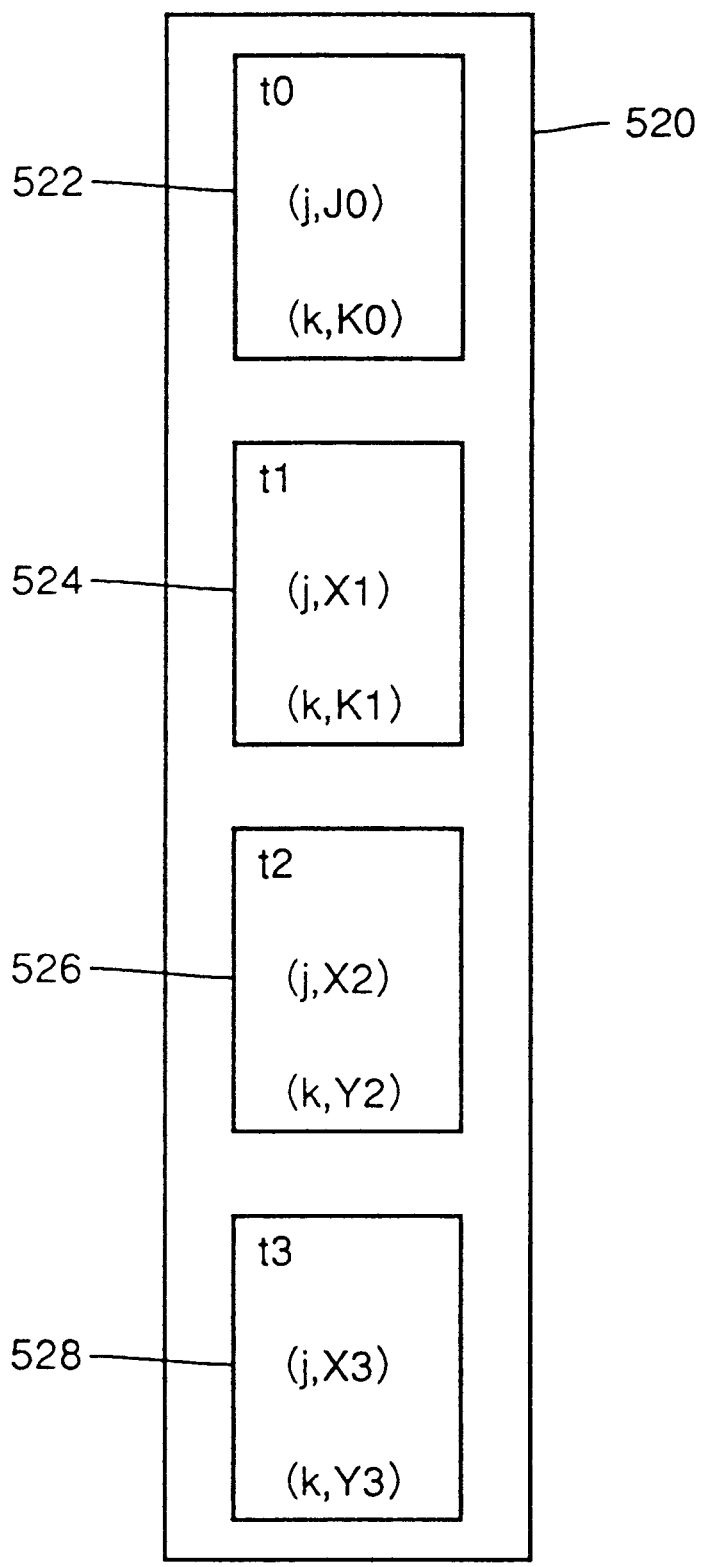
FIG. 31 typically shows a data format of animation information according to a fifth embodiment of the present invention.

FIG. 31 typically illustrates animation information 520 obtained by compressing the animation information 150 shown in FIG. 10 by the method according to the fifth embodiment. Referring to FIG. 31, this animation information 520 includes pieces of key frame information 522, 524, 526 and 528. These pieces of key frame information 522, 524, 526 and 528 correspond to FIGS. 8A to 8D respectively.

The key frame information 522 is identical to the key frame information 152 shown in FIG. 10. Hence, redundant description is omitted.

The key frame information 524 is substantially identical to the key frame information 154 shown in FIG. 10, except that object information (j, J1) of the first object is converted to (j, X1). Symbol X1 denotes data expressing the quantity of relative movement of the object J1 shown in FIG. 8B with respect to the object J0 shown in FIG. 8A. The data X1 can be recorded in the following format, for example:

R p1, p2, p3 where R represents a command indicating that this data expresses the relative movement of the object between the key frames, symbol pi represents a numerical value indicating which object in what key frame is relatively moved, and symbols p2 and p3 represent the distances of movement of the object related to prescribed x- and y-coordinates. The values p2 and p3 are generally extremely small as compared with the case of recording the coordinates of the object as such, in case of the animation having the objects moved on the screen as shown in FIGS. 8A to 8D. Thus, the animation information can be further efficiently compressed.

Object information (k, K1) as to the second object in the key frame information 524 is identical to that in the example shown in FIG. 10, since the object K1 appears in this key frame first.

The key frame information 526 indicates pieces of information related to the objects J2 and K2 as (j, X2) and (k, Y2) respectively. The key frame information 528 indicates pieces of object information for the objects J3 and K3 as (j, X3) and (k, Y3) respectively. Symbols X2, X3, Y2 and Y3 represent data expressing information on relative movement of the respective objects similarly to X1, in a format similar to that for X1. In the example shown in FIG. 30, for example, X1, X2, X3, Y2 and Y3 can be expressed by symbols shown in FIG. 32.

Referring to FIGS. 8A to 8D, the objects J1, J2 and J3 are obtained by movement of the objects J0, J1 and J2 in the just preceding key frames respectively. Therefore, all objects are compared with those in the just preceding key frames, and numerical values following the symbols "R" for X1, X2 and X3 are "1" in FIG. 32. (x1, y1), (x2, y2) and (x3, y3) represent displacements of the objects J1, J2 and J3 with respect to the objects J0, J1 and J2 respectively.

Figure 32:
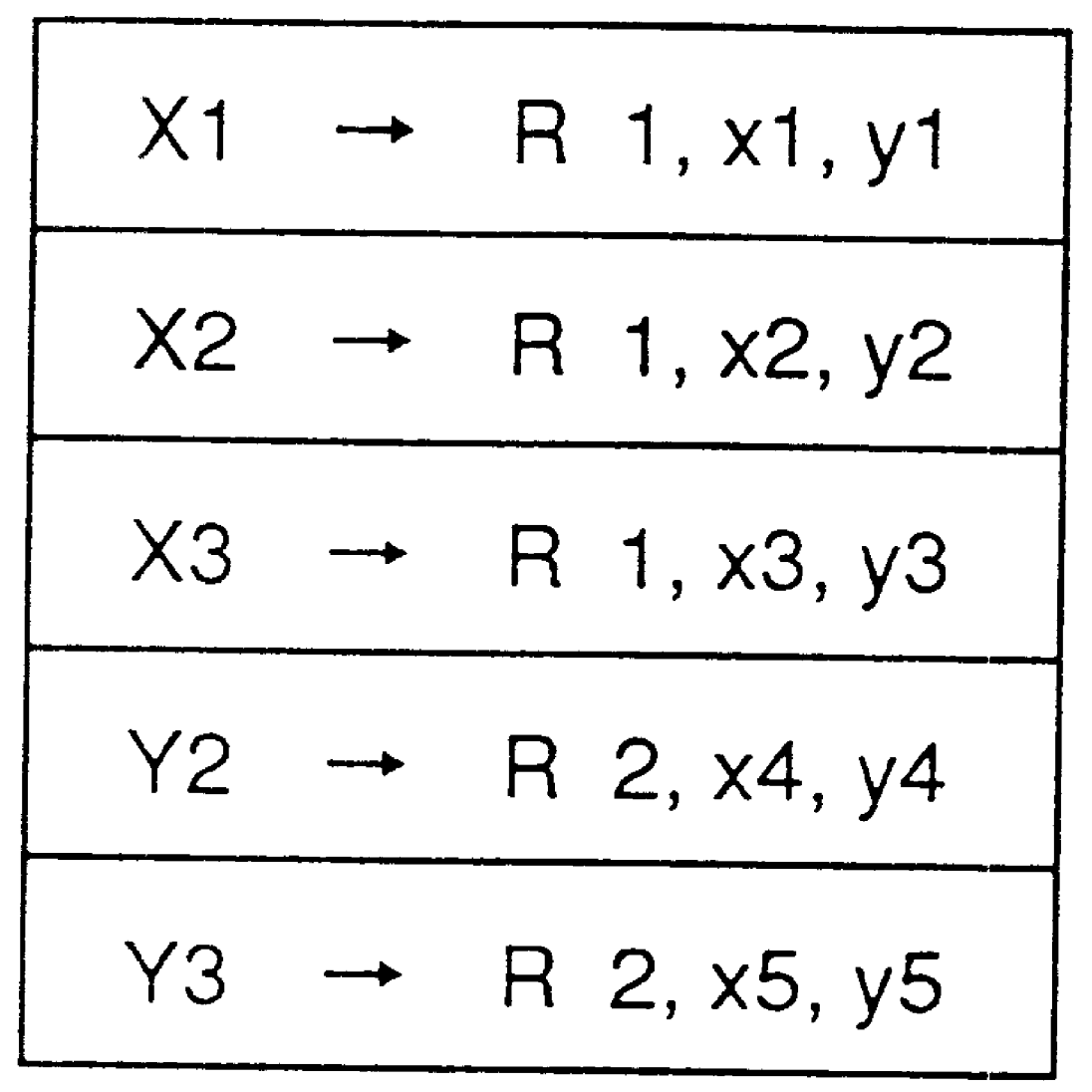
Figure 33:
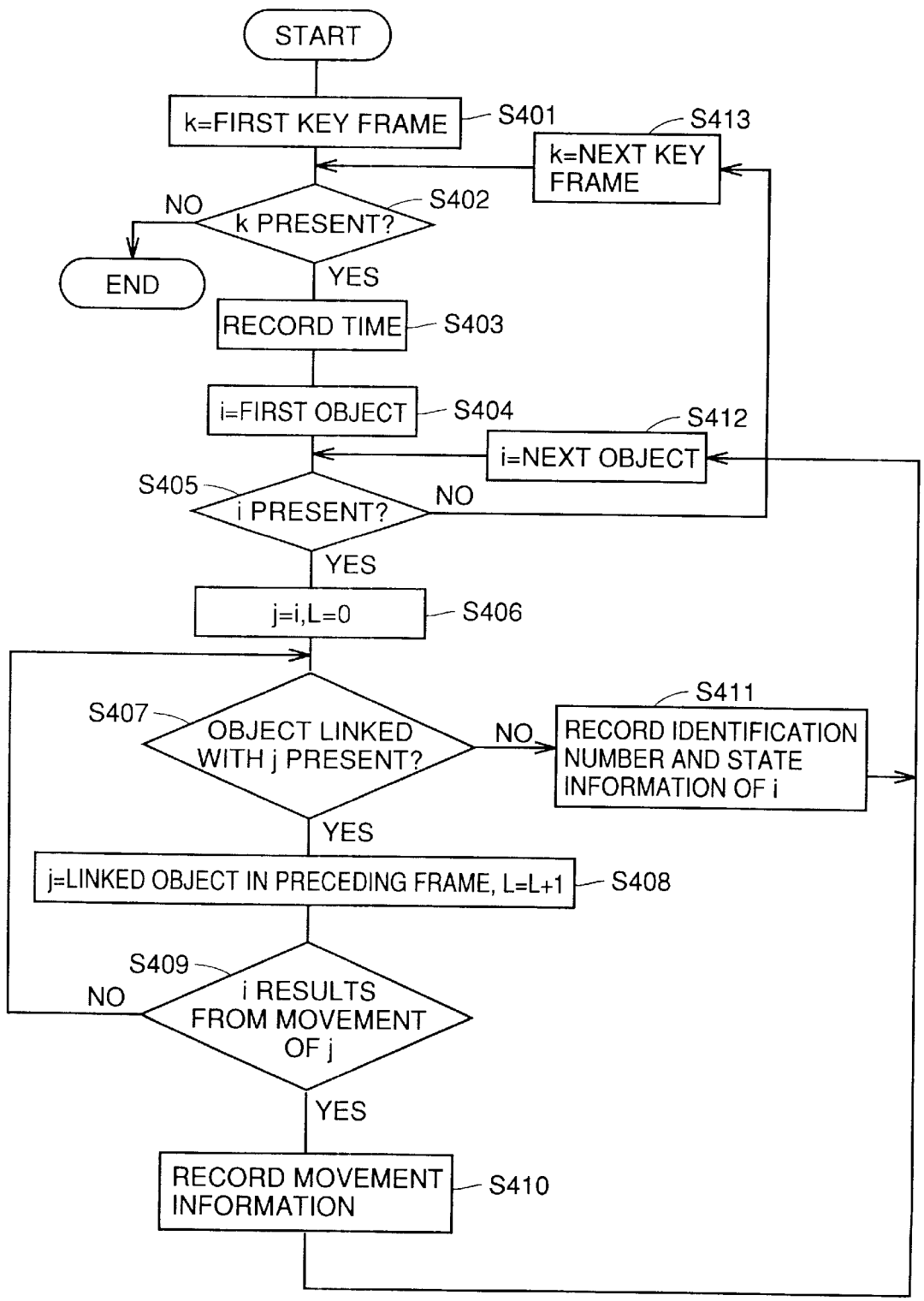
FIG. 33 is a flow chart of a program for implementing the method according to the fifth embodiment of the present invention.

On the other hand, the objects K2 and K3 result from movement of the objects K0 and K1 in the key frames in front of the just preceding frames respectively. In this case, therefore, the objects K2 and K3 are compared with those in these key frames. Numerical values following values following "R" for Y2 and Y3 are "2", as shown in FIG. 32. (x4, y4) and (x5, y5) represent displacements from the objects K0 and K1 to the objects K2 and K3 respectively. Thus, the data quantity of object information can be reduced by deciding key frames for comparison as to positions, for example, in state information of objects and recording only displacements of the objects with respect to the key frames. The regenerating side can regenerate the key frames by obtaining the coordinates of the objects in the key frames from the information specifying the key frames including object information of the compared objects and displacement information included in the object information. With reference to FIG. 33, a program for creating the data shown in FIG. 31, i.e., for implementing the method of compressing animation information according to the fifth embodiment is described. At S401, a key frame k is set as the first key frame.

At S402, a determination is made as to whether or not any content of key frame information corresponding to the key frame k is present. If no corresponding key frame information is present, the processing is ended. If the corresponding key frame information is present, on the other hand, the control advances to S403.

At S403, a display time for the key frame k included in the key frame information is outputted. The data outputted here is the time t0, t1, t2 or t3 shown in FIG. 31, for example.

At S404, an object i is set as the first object in the key frame k. At S405, a determination is made as to whether or not the object i is present. If no object i is present, the control advances to S413. If the object i is present, on the other hand, the control advances to S406.

At S406, an object j compared with the object i is assumed to be the object i for the time being. Further, a numerical value L for calculating a relative position of a reference key frame for the relative movement quantity of the object i with respect to the key frame is zeroed. Thereafter the control advances to S407.

At S407, a determination is made as to whether or not an object linked with the object j is present in a key frame preceding that containing the object j. If no object linked with the object j is present, the control advances to S411. Otherwise the control advances to S408. At S408, the object linked with the object j is newly assumed to be the object j. 1 is added to the value L.

At S409, a determination is made as to whether or not the object i results from movement of the object j in the following method: First, whether or not pieces of information of the objects i and j other than coordinates are absolutely identical to each other is checked up. If these pieces of information do not coincide with each other, a determination is made that the object i does not result from movement of the object j. If the pieces of information other than the coordinates are identical to each other, on the other hand, a comparison is made as to whether or not the numbers of the coordinates are identical to each other. If the numbers of the coordinates are identical to each other, differences between coordinate points of the object i and corresponding coordinate points of the object j are checked up. If the differences between the x- and y-coordinates calculated as to the respective corresponding coordinate points are identical with respect to all points, a determination is made that the object i results from movement of the object j. Otherwise a determination of NO is made. If the object i is determined as resulting from movement of the object j, the control advances to S410. Otherwise the control returns to S407.

At S410, information as to how much movement of the object j has brought the object i and the value of the information L as to how many frames the linked object precedes the object i are outputted. Thereafter the control advances to S412. Due to this processing, the object information (j, X1), (j, X2), (k, Y2), (j, X3) or (k, Y3) shown in FIG. 31 is outputted.

If the determination at S407 is of NO, on the other hand, the control advances to S411 so that the identification number and the state information of the object i are outputted, and the control advances to S412. Due to this processing, (j, J0), (k, K0) or (k, K1) is outputted in the example shown in FIG. 31.

At S412, the object i is set as the next object in the key frame k. The control returns to S405, for repeating the processing following S405.

If a determination is made that no object i is present in the key frame k at S405, on the other hand, the control advances to S413 so that the key frame k is set as the next key frame, and the control returns to S402. Thereafter the processing following S402 is repeated.

When the compression method for animation information according to the present invention is employed, as hereinabove described, it is not necessary to repeatedly record or transmit previously appearing objects in an animation such as that for business presentation successively presenting new items. Therefore, the quantity of data for recording or transmitting the animation information is extremely reduced as compared with the conventional system which must record or transmit all key frames.

In case of an animation having a number of repeats, further, objects once appearing therein may not be repeatedly recorded in key frame information. Therefore, the data quantity of the animation information is extremely reduced as compared with the conventional system of recording or transmitting all pieces of object information in all key frames. Thus, the animation can be recorded in a recording medium having a small capacity such as a floppy disk, an IC (integrated circuit) card or the like, which has generally been unusable. Further, a larger quantity of animation data can be recorded in a storage medium of a constant capacity as a turnover effect thereof, whereby a dictionary or a manual containing a larger quantity of animation information can be recorded in an electronic medium.

Similarly, the data quantity of the animation can be extremely reduced, whereby the transmission capacity for transmitting the animation information can be reduced. Even if the quantity of data transmittable at once is so limited that animation information cannot be transmitted by the conventional system, for example, compressed animation information can be transmitted by the inventive compression method. In case of transmitting animation information compressed by the inventive method for regeneration, in addition, the time required for such transmission is extremely shortened as compared with the case of transmitting animation information prepared by the conventional method.

SIXTH EMBODIMENT

Figure 34:
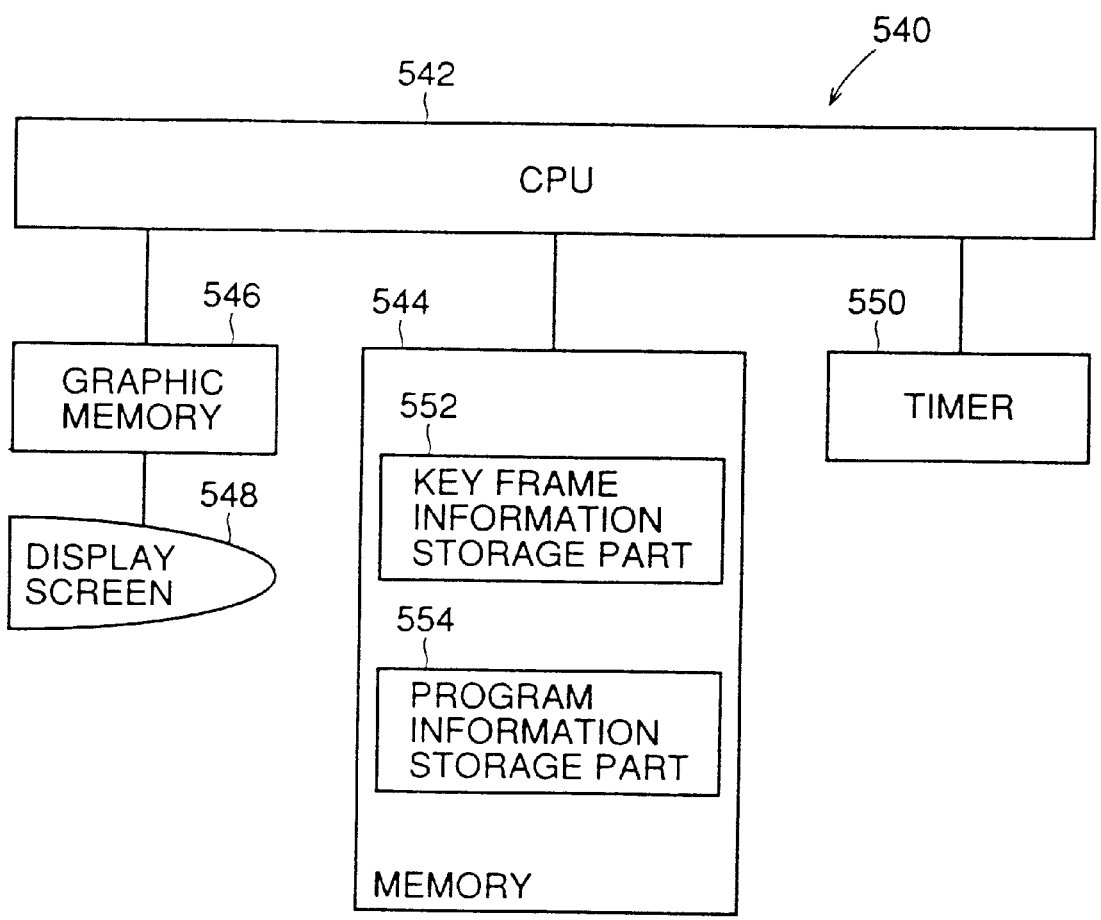
FIG. 34 is a block diagram of a computer for implementing the present invention.

Referring to FIG. 34, an animation display method according to the present invention is implemented by a computer 540. The computer 540 includes a CPU 542 for implementing processing in each step of the present invention by executing a prescribed program, a graphic memory 546 in which the CPU 542 writes animation images, a display screen 548 for displaying the images on the graphic memory 546, a memory 544 connected to the CPU 542, and a timer 550 from which the CPU 542 obtains information related to times. The memory 544 includes a key frame information storage part 552 storing a plurality of pieces of key frame information, and a program information storage part 554 storing the program information for implementing the inventive animation display method.

Figure 35:
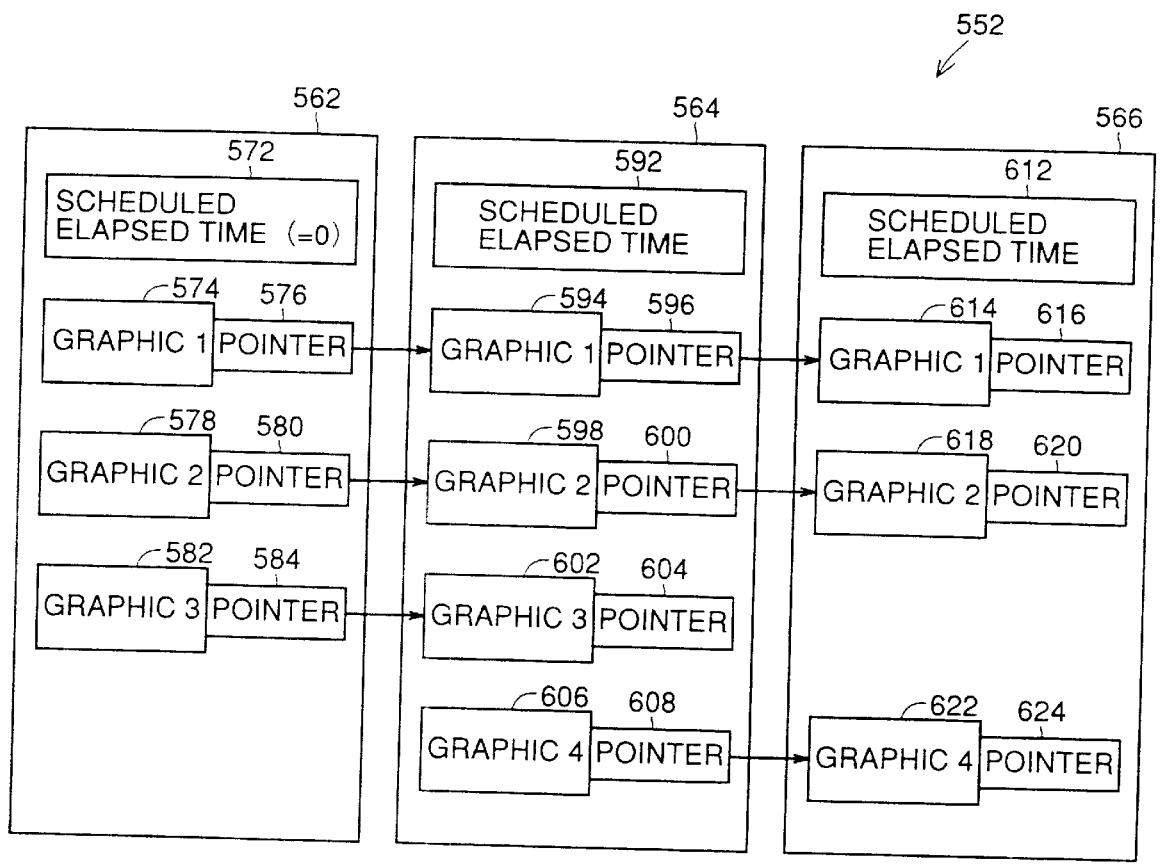
FIG. 35 typically shows key frame information.

Referring to FIG. 35, the key frame information storage part 552 includes a plurality of pieces of key frame information 562, 564 and 566. While the number of key frames is larger in general, the case of three key frames is considered in relation to this embodiment, for simplifying the illustration.

For example, the first key frame information 562 includes information for specifying the time for displaying the first key frame, i.e., a scheduled elapsed time 572 from starting of animation display to display of the first key frame, and pieces of graphic information 574, 578 and 582 for specifying the features of graphics to be displayed on the key frame after a lapse of the scheduled elapsed time 572. The first key frame is displayed in starting of the animation, and hence the scheduled elapsed time for the first key frame is equal to zero. The pieces of graphic information 574, 578 and 582 have pointers 576, 580 and 584 to areas storing corresponding graphics of a second key frame described later respectively. The contents of the graphic information are described later with reference to FIG. 38.

Similarly, the second key frame information 564 includes a scheduled elapsed time 592 and pieces of graphic information 594, 598, 602 and 606. The pointers 576, 580 and 584 of the pieces of graphic information 574, 578 and 582 of the first key frame information 562 point the heads of the areas of the pieces of graphic information 594, 598 and 602 of the second key frame information 564 respectively. Similarly, the pieces of graphic information 594, 598, 602 and 606 of the second key frame information 564 have pointers 596, 600, 604 and 608 respectively. Among these, the pointers 596, 600 and 608 point the heads of areas of corresponding pieces of graphic information of the third key frame information 566 described later respectively. The pointer 604 of the third graphic information 602 stores a value indicating that this key frame is the termination.

Similarly, the third key frame information 566 includes a scheduled elapsed time 612 and pieces of graphic information 614, 618 and 622. The pointers 596, 600 and 608 of the second key frame information 564 point to the heads of the areas of the pieces of graphic information 614, 618 and 622 of the third key frame information 566 respectively. The pieces of graphic information 614, 618 and 622 have pointers 616, 620 and 624 respectively. According to this embodiment, it is assumed that the third key frame is the final frame, and hence these pointers 616, 620 and 624 store values indicating that this frame is the termination respectively.

Figure 36:
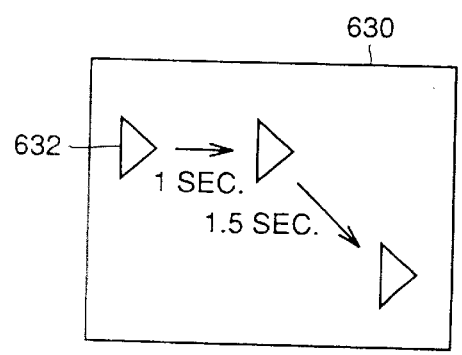
FIG. 36 typically shows an exemplary animation.

FIG. 36 illustrates first graphic information 574, 594 and 614 (see FIG. 35) out of the animation expressed by the pieces of key frame information 562, 564 and 566 shown in FIG. 35. Referring to FIG. 36, a triangle 632 is moved in a screen 630 in this animation. It is assumed that the triangle 632 is translated from a left upper portion to a central upper portion of the screen 630 in 1 sec., and further translated to a right lower position of the screen 630 in 1.5 sec. The triangular forms shown by solid lines in FIG. 36 show the shapes and positions of the graphics specified by the first, second and third pieces of key frame information 562, 564 and 566 shown in FIG. 35 respectively. As hereinabove described, the scheduled elapsed time 572 for the first key frame 562 is zero. The time necessary for moving the triangle 632 to the position displayed in the second key frame is 1 sec. and that to the position displayed in the third key frame is 1.5 sec., and hence the scheduled elapsed times 592 and 612 for the second and third key frames 564 and 566 shown in FIG. 35 are "1 sec." and "1+1.5=2.5 sec." respectively.

Figure 37:
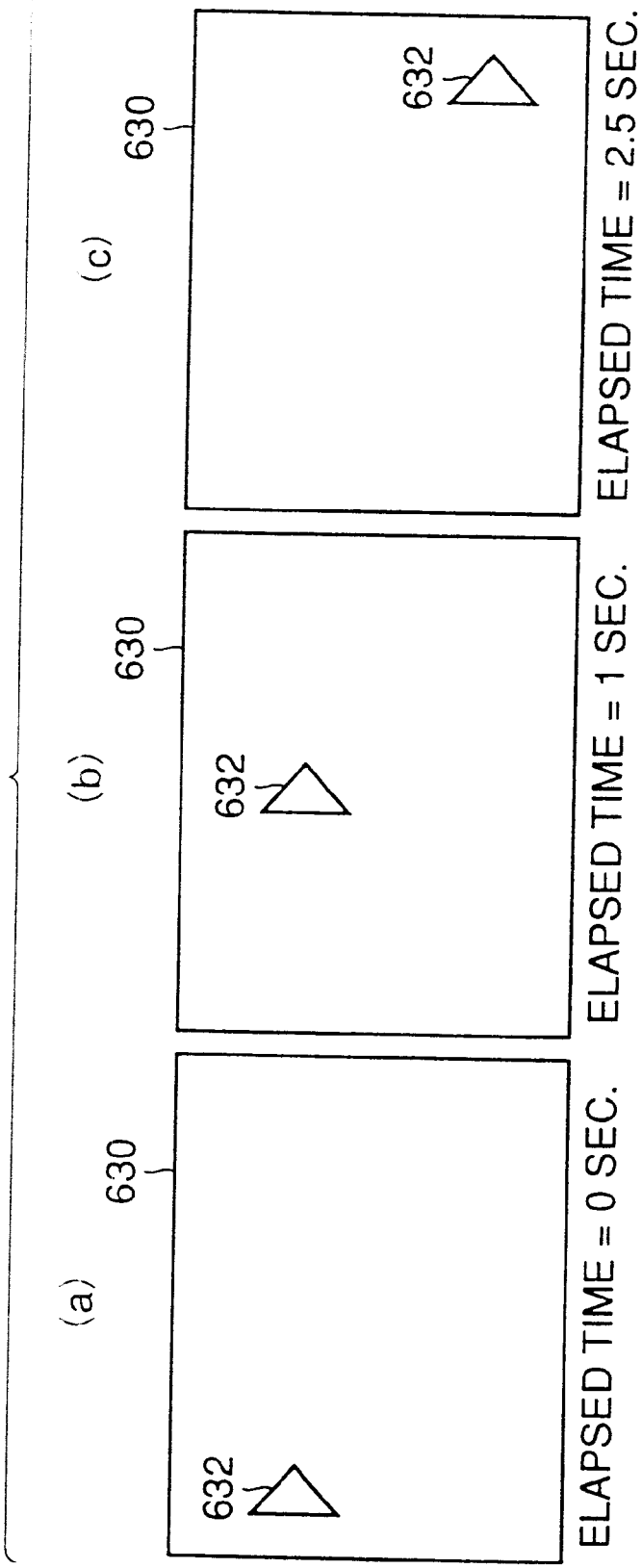
FIG. 37 shows images of key frames required for regenerating the animation shown in FIG. 36.

FIG. 37 shows the key frames specified by the pieces of key frame information 562, 564 and 566 shown in FIG. 35 at (a), (b) and (c) respectively. The positions of the triangle 632 in these key frames are described above.

Figure 38:
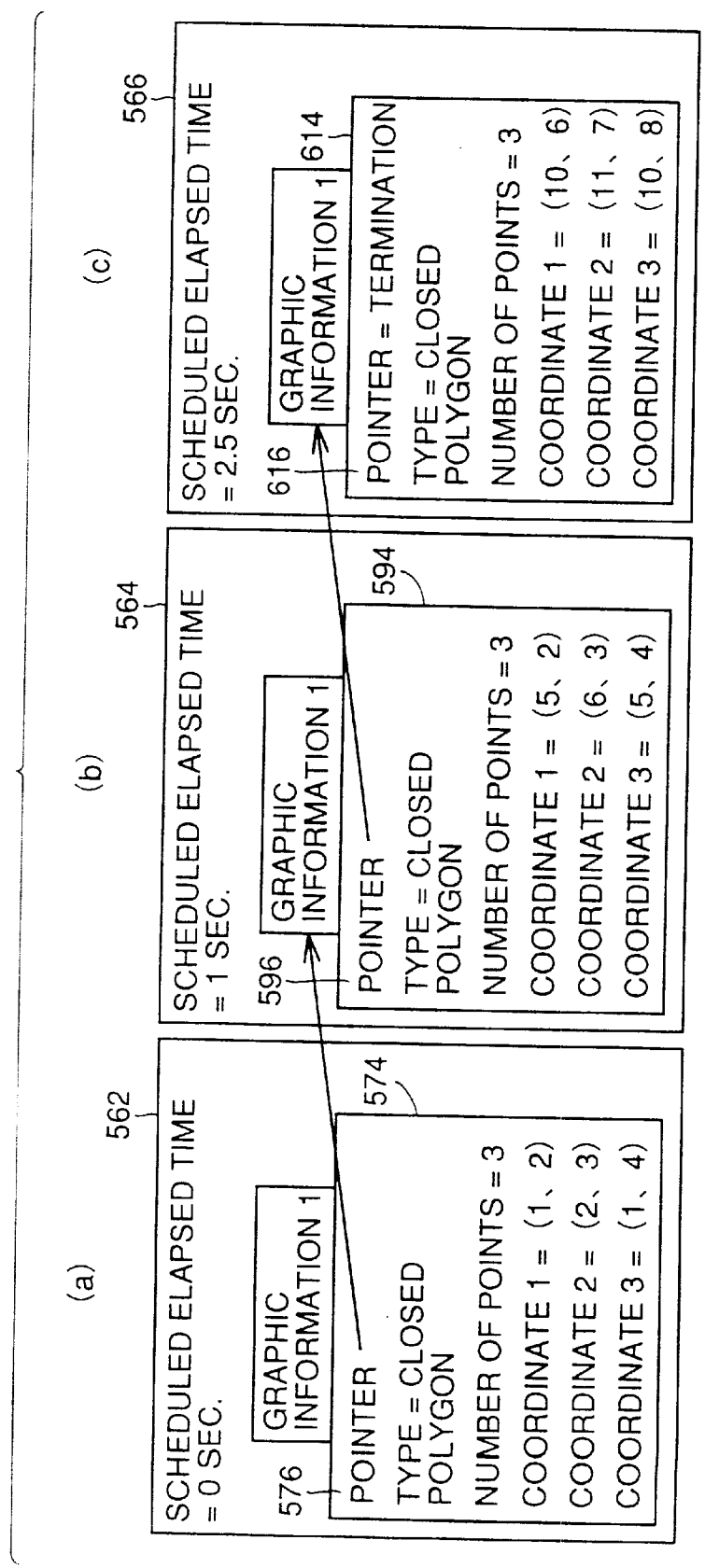
FIG. 38 shows key frame information for the key frames shown in FIG. 37.

With reference to FIG. 38, the contents of the pieces of key frame information 562, 564 and 566 shown in FIG. 35 are now described. Only a single graphic, i.e., the triangle 632 is displayed in this case, and hence only the pieces of first graphic information 574, 594 and 614 (see FIG. 35) are assumed as the graphic information. Referring to (a) in FIG. 38, the first key frame 562 has the following meaning:

"The scheduled elapsed time corresponding to the first key frame is 0 sec. The first graphic specified by the graphic information 574 is present in the first key frame".

In the example shown at (a) in FIG. 38, the first graphic information 574 has the following meaning:

"The first graphic is a closed polygon having three points. Namely, this graphic is a triangle. The coordinates of the three apices of this triangle are (1, 2), (2, 3) and (1, 4) respectively. A graphic corresponding to the first graphic is also present in the second key frame, and its graphic information is the first graphic information 594 in the second key frame information 564 shown at (b) in FIG. 38".

Similarly, the second key frame information 564 shown at (b) in FIG. 38 has the following meaning:

"The scheduled elapsed time corresponding to the second key frame is 1 sec. The first graphic is present in the second key frame, and its graphic information is the graphic information 594. The graphic specified by this graphic information 594 is continuous with that specified by the first graphic information 574 in the first key frame information 562. The graphic specified by the graphic information 594 is a triangle, and the coordinates of its three apices are (5, 2), (6, 3) and (5, 4) respectively. The graphic corresponding to the first graphic is also present in the third key frame, and its data is indicated by the pointer 596".

The third key frame information 566 has the following meaning:

"The scheduled elapsed time corresponding to the third key frame is 2.5 sec. The graphic specified by the graphic information 614 is present in the third key frame, and this graphic is a triangle. The coordinates of the three apices of this triangle are (10, 6), (11, 7) and (10, 8) respectively. This graphic is continuous with the first graphic in the second key frame, and interrupted in the third key frame".

Figure 39:
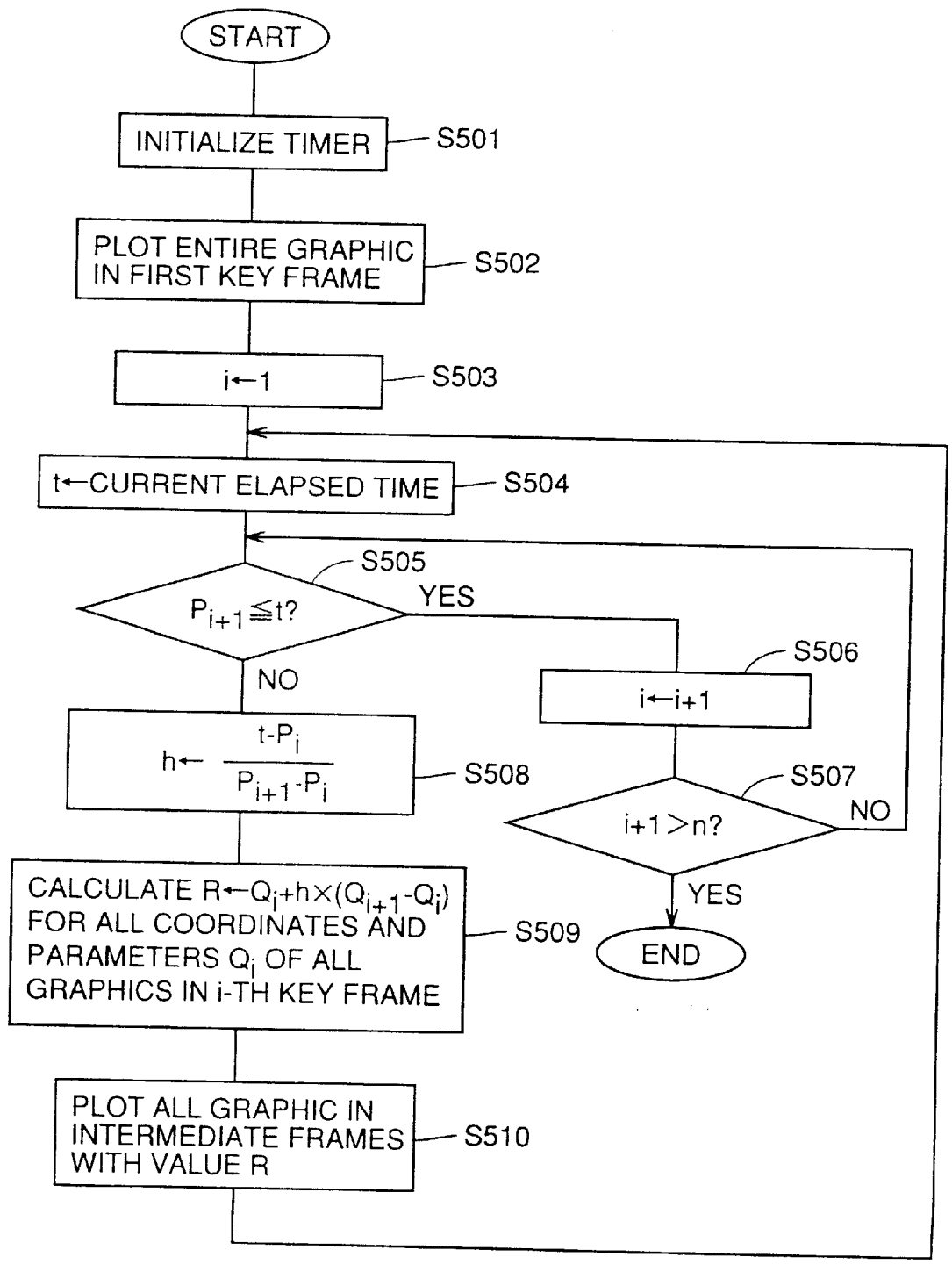
FIG. 39 is a flow chart of a program for implementing an animation display method according to a sixth embodiment of the present invention.

The flow of the control of the program stored in the program information storage part 554 shown in FIG. 34 and executed by the CPU 542 for implementing the functions of respective steps is now described with reference to FIG. 39. First, the timer 550 (see FIG. 34) is initialized at a step S501. According to this embodiment, the value of the timer 550 is reset to zero by this initialization. As another mode, the timer 550 may continuously operate so that its value in this initialization is copied on a prescribed area of the memory 544 to be utilized as a value indicating the reference value for subsequent processing.

In general, the key frame information is loaded in the key frame information storage part 552 of the memory 554 from the external memory device (not shown in FIG. 34) such as a hard disk.

Then, the first key frame ((a) in FIG. 37) is plotted on the graphic memory 546 (see FIG. 34) on the basis of the first key frame information 562 shown at (a) in FIG. 38 at a step S502. The display screen 548 (see FIG. 34) displays the first key frame written in the graphic memory 546.

It is known that, in case of plotting graphics on the graphic memory 546 and further plotting the same on the display screen 548, flicker on the screen can be reduced by separating a memory area for the plotting from that storing the data in display. In order implement this, two methods are carried out in general. One of the methods is adapted to regard an area on a general-purpose memory as a bit map area for plotting graphics thereon and thereafter transmitting the data of the plotted area to a graphic memory at a high speed. The other method is adapted to prepare a graphic memory for two screens for alternately plotting graphics on both screens while displaying only the screen of the area completing the plotting on a display screen. Either method is employable here. Specific processing must be performed whichever method is employed, while this processing is well-known to those skilled in the art. Hence, redundant description is omitted.

At a step S503, an initial value 1 is set in a work register i for storing key frame numbers. The value of each register x is hereinafter referred to as a "variable x".

At a step S504, the elapsed time from the step S501 is stored in a variable t. The processing at the steps S502 and S503 is performed after the timer 550 is initialized at the step S501 as shown in FIG. 39, and hence the elapsed time at the time of the step S504 is nonzero. In practice, the plotting performed at the step S502 is the most complete processing, and hence the processing time at the step S502 occupies the most part of the elapsed time.

The scheduled elapsed time for an i-th key frame is hereinafter denoted by Pi. At a step S505, a determination is made as to whether or not the elapsed time of an (i+1)-th key frame (the second key frame if i=1) is not more than the variable t. In case of i=1, the elapsed time is Pi+1=P2=1 sec. ((b) in FIG. 38). The control advances to a step S506 if this condition holds, otherwise the control advances to a step S508. It is assumed here that the value t is 0.3 sec. in case of performing the processing at the step S505 first. This value is compared with the information of the scheduled elapsed time (=1 sec.) in the second key frame information 564 shown at (b) in FIG. 38. In this case, the condition does not hold and hence the control advances to the step S508.

Figure 40:
FIG. 40 typically shows timings for forming intermediate frames.

At the step S508, a value h indicating the positioning of the frame to be plotted next is calculated as follows:

FIG. 40 illustrates the position indicated by the value h in this case. As shown in FIG. 40, the time t=0.3 corresponds to a position between the times for displaying the first and second key frames respectively on the time base, i.e., a position of 30% from the time for displaying the first key frame toward that for displaying the second key frame, as shown in FIG. 40. Thus, it is assumed that the value h indicates the positioning of the time t, i.e, "positioning of an intermediate frame to be plotted next on the time base".

Assuming that i=1 and t=0.3 as described above, the value h is equal to 0.3, since $P_i$=0 and $P_{i+1}$=1.

At a step S509, the coordinates of respective feature values of each graphic of the intermediate frame corresponding to the time specified by the variable h are calculated as follows: Assuming that Qi represents the parameters of all graphics in the i-th key frame including the respective coordinate values, $Q_{i+1}$ represents the corresponding parameter in the (i+1)-th key frame, $Q_{i+1}$ represents the corresponding parameter in the i-th key frame and R represents a parameter corresponding to the parameters i and $Q_{i+1}$, the parameter R is calculated as follows:

$$R = Q_i + h \times (Q_{i+1} Q_i)$$

In more concrete terms, the parameters in relation to the example shown in FIGS. 36 to 38 are as follows:

| | |
|---|---|
| X Value of Coordinate 1 | 1 + 0.3 × (5 − 1) = 2.2 |
| Y Value of Coordinate 1 | 2 + 0.3 × (2 − 2) = 2 |
| X Value of Coordinate 2 | 2 + 0.3 × (6 − 2) = 3.2 |
| Y Value of Coordinate 2 | 3 + 0.3 × (3 − 3) = 3 |
| X Value of Coordinate 3 | 1 + 0.3 × (5 − 1) = 2.2 |
| Y Value of Coordinate 3 | 4 + 0.3 × (4 − 4) = 4 |

Namely, the coordinates of the respective apices of the triangle to be plotted in the intermediate frame corresponding to the elapsed time t=0.3 (sec.), i.e., coordinates 1, 2 and 3 are (2.2, 2), (3.2, 3) and (2.2, 4) respectively.

Thus, the parameters R are obtained as to all parameters Qi, and all graphics of intermediate frames are plotted through the values R (step S510). When all graphics are completely plotted, the processing returns to the step S504. Namely, plotting of the next frame is started when all graphics in a certain intermediate frame are plotted, and the elapsed time up to this time is obtained at the step S504 and subsequent processing is repeatedly executed.

The graphic plotting performed at the step S510 also requires a constant processing time. In this example, the graphic to be plotted in the first and second key frames itself is the triangle 632, as shown at (a) and (b) in FIG. 37. The triangle to be plotted at the time t=0.3 is also of the same size as the triangle 632 in the initial state (t=0) shown at (a) in FIG. 37, for example. In this case, the graphic plotting quantity at the time t=0.3 itself is identical to that at the time t=0. The time required for plotting this intermediate frame would be 0.3 sec., substantially similarly to the value at the time t=0. Therefore, the elapsed time t in second execution of the step S504 is equal to 0.6.

If a determination of YES is made at the step S505 in the aforementioned repetitive processing, the processing advances to the step S506. At the step S506, "1" is added to the variable i. At a step S507, a determination is made as to whether or not the value "1" is greater than the number n of the key frames prepared at the start, through the variable i after the addition. If this condition does not hold, the control advances to the step S505 for repeatedly executing the following processing. If the condition at the step S507 holds, on the other hand, this means that the scheduled elapsed time for the final key frame is over and hence the processing is ended.

In the aforementioned example, the quantity of the graphics to be plotted in the intermediate frames remains unchanged. Hence, the time required for the plotting in each intermediate frame is 0.3 sec. Further, the number n is equal to three. Therefore, the frames are plotted at timings shown in FIG. 41, by executing the processing shown in FIG. 39 in this example. Namely, the first key frame is plotted at the time t=0. Then, intermediate frames obtained by interpolative calculation between the first and second key frames are plotted at times t=0.3, 0.6 and 0.9 respectively. Further, intermediate frames obtained by interpolative calculation between the second and third key frames are plotted at times t=1.2, 1.5, 1.8, 2.1 and 2.4 respectively. Namely, nine frames in total are plotted with reference to the respective times, and expressed as a continuous animation.

Figure 42:
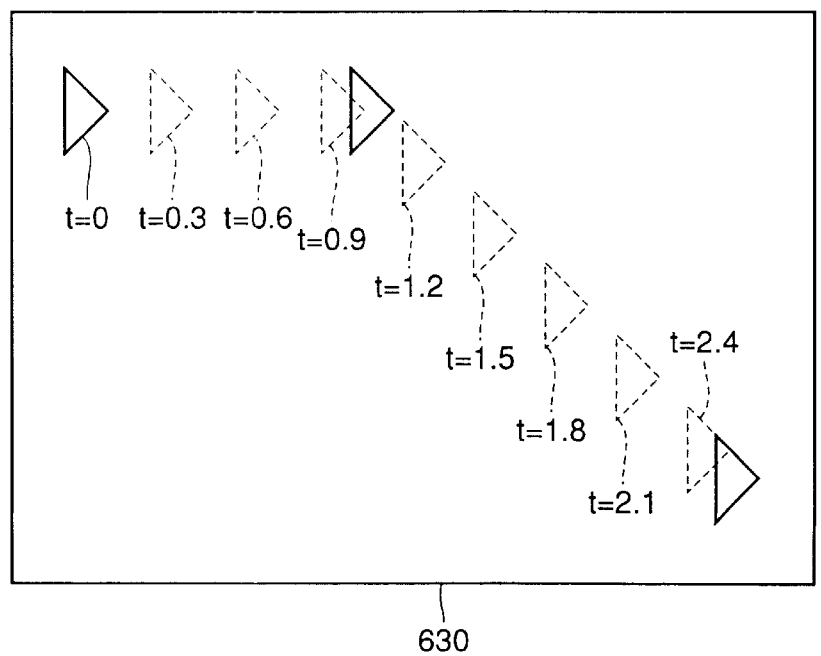
FIG. 42 typically shows respective graphics of the intermediate frames in case of regenerating the animation shown in FIG. 36.

FIG. 42 shows the locus of the triangle 632 plotted on the screen 630 along with the times for plotting the respective graphics. Referring to FIG. 42, solid lines show the graphics in the key frames, and broken lines show those plotted in the intermediate frames. The feature of the example shown in FIG. 42 resides in that the first key frame is plotted at the time t=0, while the remaining key frames (the second and third key frames) are not plotted.

Figure 41:
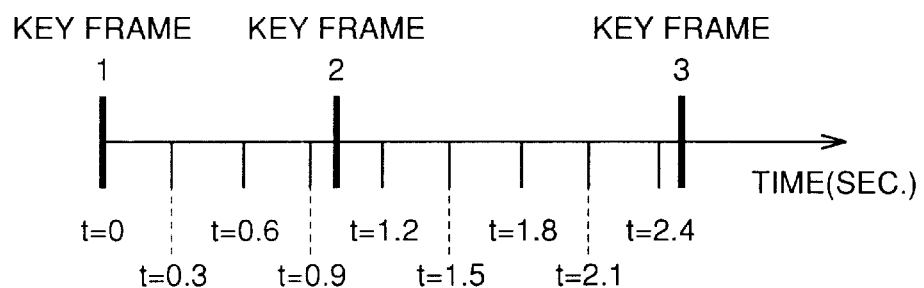
FIG. 41 typically shows timings for starting plotting of intermediate frames in case of a constant plotting quantity.

The times t=0 to 2.4 shown in FIGS. 41 and 42 every 0.3 sec. indicate the times for starting plotting. Times are required for plotting the respective frames to be actually displayed on the screen, leading delays by these times.

In the aforementioned example, the triangle displayed in the animation is merely moved with no change in size. However, it is also possible to display an animation containing a triangle which is changed in size between key frames by the aforementioned unit and program. In this case, the plotting quantity as well as the times necessary for plotting intermediate frames are varied due to the change of the area of the triangle, as compared with the aforementioned case of the triangle having the unchanged size. Therefore, apparent operations are different from those of the aforementioned example, although the unit and the program are identical to the above.

Figure 43A:
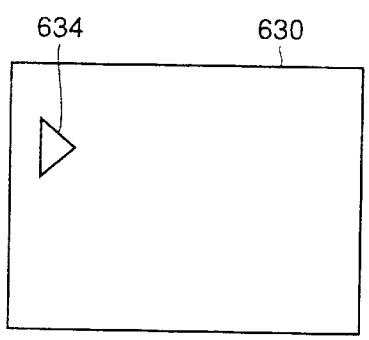
FIGS. 43A to 43C show key frames for an animation containing graphics having changing plotting quantities.
Figure 43B:
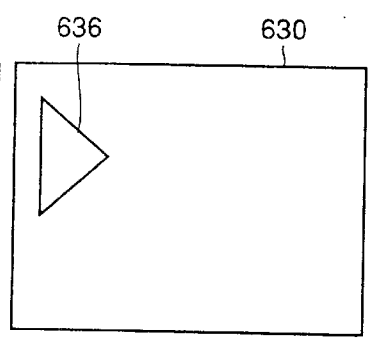
Figure 43C:
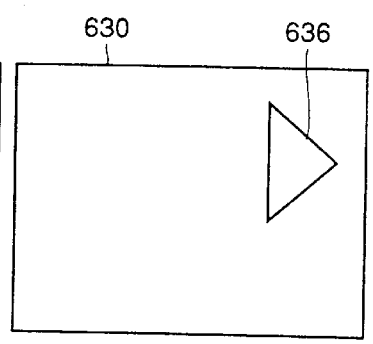

FIGS. 43A to 43C show three key frames for this animation. As shown in FIG. 43A, a triangle 634 is plotted on a left upper portion of a screen 630 in the first key frame. Referring to FIG. 43B, the triangle 634 plotted in the first key frame is enlarged (doubled) and displayed as a triangle 636 in the second key frame. Referring to FIG. 43C, the triangle 636 is moved from the upper left portion to an upper right portion on the screen 630 in the third key frame.

FIG. 44 illustrates key frame data 662, 664 and 666 corresponding to the three key frames shown in FIGS. 43A to 43C respectively. Referring to FIG. 44, the key frame information 662 for the first key frame includes an elapsed time (=0 sec.) and first graphic information 674 indicating the triangle 634. The graphic is a closed polygon having three points, i.e., a triangle. The three apices of this triangle have coordinates (1, 2), (2, 3) and (1, 4) respectively. A pointer 676 of the first graphic information 674 points to the head of an area of first graphic information 694 included in the key frame information 664 of the second key frame.

The key frame information 664 for the second key frame includes an elapsed time (=1 sec.) and the graphic information 694 corresponding to the triangle 636 in the second key frame. According to the graphic information 694, the graphic is a closed polygon having three points, i.e., a triangle. The coordinates of the three apices of the triangle are (1, 1), (3, 3) and (1, 5) respectively. A pointer 696 points to the head of an area of first graphic information 714 of the key frame information 666 for the third key frame.

The key frame information 666 for the third key frame includes a scheduled elapsed time (=2.5 sec.) and the first graphic information 714. According to the first graphic information 714, the graphic is a closed polygon having three apices, i.e., a triangle. The coordinates of the three apices of this triangle are (8, 1), (10, 3) and (8, 5) respectively. A pointer 716 of the first graphic information 714 indicates that this graphic forms the termination in the third key frame.

Referring again to FIGS. 43A and 43B, such an animation that the triangle 634 is gradually enlarged into the triangle 636 is generated during this time. Assuming that only the outline of the triangle is plotted in this example and the size of the graphic to be plotted is increased by a, the processing time for plotting the graphic is assumed to be also increased by a. The graphics to be plotted are only the triangles 634 and 636 in FIGS. 43A and 43B, and hence the processing time for plotting the second key frame shown in FIG. 43B is assumed to be substantially a times that for plotting the first key frame shown in FIG. 43A. In this example, a=2 and hence the processing time for the second key frame is substantially twice that for the first key frame. However, the second key frame is not plotted in practice, as hereinabove described.

While only the outline of the triangle is plotted in the aforementioned example, the area is increased by $a^2$ if the scale is increased by a in case of painting the interior of a triangle with a specific color, and hence the rate of increase of the plotting quantity is larger than that in the case of plotting only the outline shown in FIGS. 43A and 43B.

Referring to FIGS. 43B and 43C, the enlarged triangle 636 is translated from the position in the second key frame to that in the third key frame. In this case, the plotting quantity necessary per frame remains unchanged and hence the plotting time per frame also remains unchanged, and a processing time similar to that for the second frame is necessary for each frame.

Figure 45:
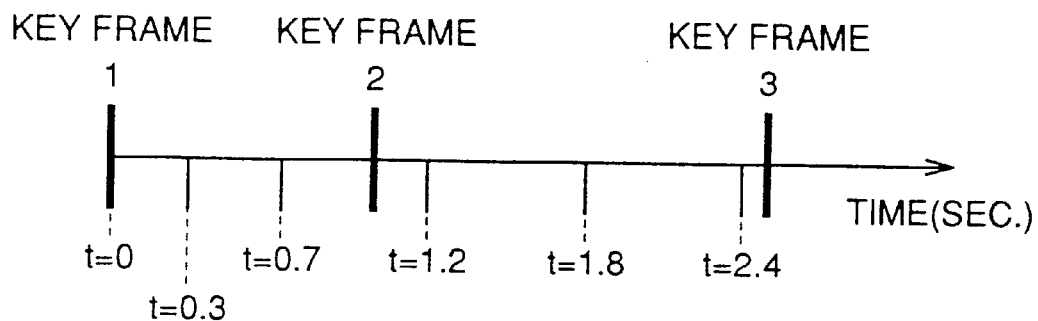
FIG. 45 typically shows timings for starting plotting of respective frames in the animation regenerated from the key frames shown in FIGS. 43A to 43C.

Namely, in case of generating intermediate frames of the animation from the key frames and regenerating the animation as shown in FIGS. 43A to 43C, the times for starting plotting of the frames are as shown in FIG. 45. First, plotting of the first key frame is started (t=0). Assuming that the plotting of the first key frame requires 0.3 sec. similarly to the case of the first example, plotting of the second key frame is started at the time t =0.3.

According to the graphic information 674 and 694 shown in FIG. 44, the size of the triangle 636 in the second key frame (corresponding to t=1) is twice that of the triangle 634 in the first key frame. Assuming that the triangle 634 is linearly enlarged, it is necessary to plot a triangle in a size 1.3 times that of the triangle 634 at the time t=0.3. In this case, a processing time of 0.3×1.3=0.39 (sec.), i.e., about 0.4 sec. is necessary. The processing of the intermediate frame started at the time t=0.3 is ended at a time t=0.7.

Further, the size of a triangle to be plotted at a time corresponding to t=0.7 is 1.7 times that of the triangle 634 shown in FIG. 43A. The time required for this plotting is 0.3×1.7=0.51 (sec.), i.e., about 0.5 sec. Therefore, the plotting of this intermediate frame is ended at a time t=1.2 sec., and plotting of the next frame is started. At the time t=1.2 sec., the size of the triangle to be plotted is already identical to that of the triangle 636 shown in FIG. 43B, and thereafter remains unchanged. Therefore, the time necessary for subsequent plotting is constant. This plotting requires 0.3×2=0.6 sec.

FIG. 45 shows the times for starting the plotting of the respective intermediate frames. Thus, six frames started from the times corresponding to t=0, 0.3, 0.7, 1.2, 1.8 and 2.4 respectively are plotted and expressed as a continuous animation.

While the processing time for plotting each frame is constant in the example shown in FIG. 41, the time is not constant in the example shown in FIG. 45. In either case, however, it is understood that the animation is regenerated along the scheduled elapsed time information held in each key frame and the overall regeneration time is substantially 2.5 sec. In other words, it is understood that change of the plotting quantity per frame exerts no influence on the progress of the display of the overall animation.

Figure 46:
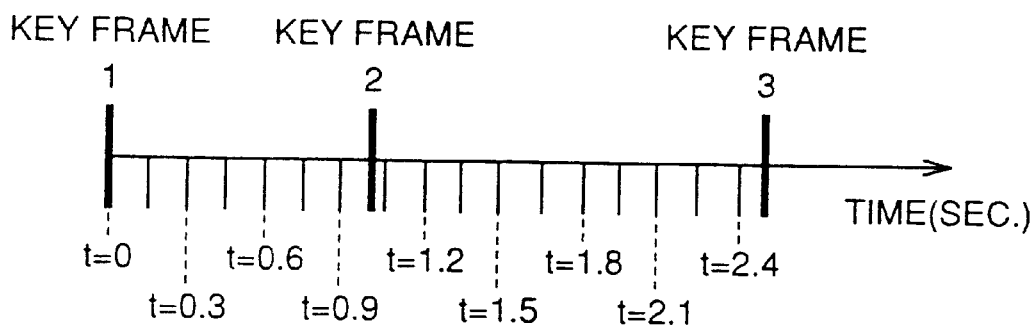
FIG. 46 typically shows timings for starting plotting of the respective frames in case of processing the animation shown in FIG. 36 with a CPU having high throughput.
Figure 47:
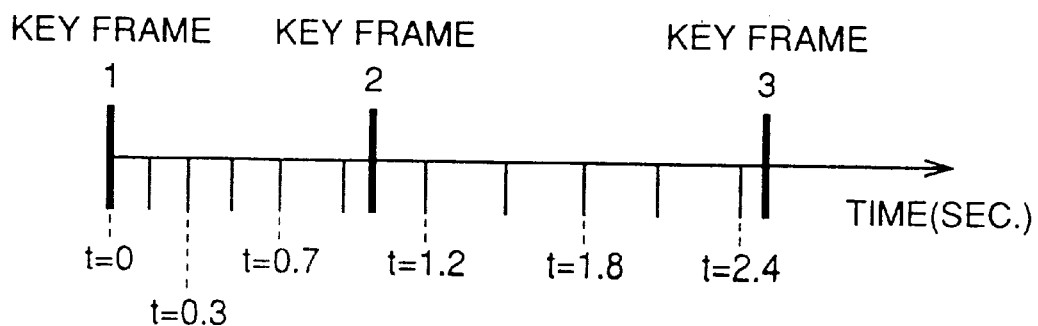
FIG. 47 is a model diagram showing timings for starting plotting of the respective frames in case of processing the animation shown in FIGS. 43A to 43C with a CPU having high throughput.

Consider that the throughput of the CPU is doubled, for example. In the case of the example shown in FIG. 41, plotting of each frame is started every 0.15 sec. as shown in FIG. 46 if the throughput of the CPU is doubled, and 17 frames are regenerated in total. In case of regenerating the example shown in FIGS. 43A to 43C similarly by the CPU having the double throughput, plotting of each frame is started as shown in FIG. 47. In this case, the time required for plotting each intermediate frame is gradually increased between the first and second frames, while the animation can be regenerated with ten frames as a whole. Comparing FIGS. 41 and 46 with each other, it is understood that the same animation is regenerated along the same time passage. In this case, further, the number of frames generated during this time is substantially doubled, whereby a smoother animation can be obtained. This also applies to comparison of FIGS. 45 and 47. Whatever throughput is assumed for the CPU in creation of the animation and whatever throughput is provided in the CPU regenerating this animation in practice, it comes to that the animation is regenerated along the same time passage with smoothness responsive to the throughput of the CPU, so far as the animation is regenerated by this method.

While the above description has been made with reference to the case where the coordinates of feature points of the graphic are changed, it is possible to specify colors and degrees of transparency of graphics, thicknesses of lines forming graphics, ratios of solid line parts to blank parts of broken lines forming graphics, sizes of fonts of character graphics and coordinates of reference points of a graphic group consisting of a plurality of graphics, scale percentage of this graphic group on display and the like for every key frame and obtain intermediate frames by interpolative calculation between corresponding pieces of information of the key frames through the computer and the program in the aforementioned embodiment 6, by changing the contents of data and performing different graphic plotting in response to the contents of the data in case of plotting graphics through a similar method.

For example, FIG. 48A shows the data structure of graphic information 722 conceivable in case of a graphic classified as a polygon. FIG. 48B shows an exemplary data structure of graphic information 724 in case of a graphic classified as a text consisting of a group of characters. FIG. 48C shows an exemplary data structure of graphic information 726 in case of graphics classified as a graphic group.

Referring to FIG. 48A, data indicating the number of points, coordinates in a number responsive to the number of the points, a color for painting the interior of the graphic, the degree of transparency, the thickness of lines forming the graphic, the line type thereof, and the ratio of solid line parts to blank parts in broken lines forming the line type are stored when the graphic is classified as a polygon. For example, colors can be expressed in numerical values of red (R), green (G) and blue (B), i.e., the three primary colors of light. When (R, G, B) is specified as attribute information of the graphic in continuous two key frames, (R, G, B) specifying the color for painting graphics of intermediate frames can be calculated by performing interpolative calculation between corresponding data. This also applies to the degree of transparency, the thickness of the lines, the ratio of the solid line parts to the blank parts in the broken lines.

Referring to FIG. 48B, the coordinates (coordinates of the reference position of the text in this case) for plotting the text, the contents of the text, the type of a font for displaying the text, a font point number showing the size of the font for displaying the text, information specifying the color of text display, the style (standard, italic, bold etc.) of the displayed font, information indicating character spacing, line spacing and justification as to the respective rows and the like are stored for the character classified as a text. If there is a point font number as attribute information of the text in continuous two key frames particularly in case of characters, the size of characters of the text to be displayed in intermediate frames can be decided by performing interpolative calculation with respect to the value. In this case, no problem arises if characters can be displayed in the size along the point number even if the point number is a fraction, while characters of a point number most approximate to the point number obtained by interpolation may be displayed if only characters of a specific point number can be displayed.

Referring to FIG. 48C, the number of graphics included in the graphic group, pointers corresponding to the number of the graphics to graphic information corresponding to the respective graphics, coordinates of reference points for displaying the overall graphic group, scale percentage on display for displaying the graphic group and the like are stored in the graphic information 726 for the graphic group. In this case, the pointers are those to individual pieces of graphic information stored in key frames storing the graphic information 726 for the graphic group as different pieces of graphic information. In the case of the example shown in FIG. 48C, the coordinates of the reference points, the scale percentage on display and the like can be obtained by interpolative calculation between adjacent two key frames.

SEVENTH EMBODIMENT

A unit for implementing an animation display method according to a seventh embodiment of the present invention is now described with reference to FIG. 49. The sixth embodiment is adapted to generate corresponding feature data of graphic information of intermediate frames by linear interpolative calculation between corresponding feature data of corresponding graphic information between adjacent two frames. The method according to the seventh embodiment is characterized in that feature data obtained by such interpolative calculation are further converted by a prescribed method for providing change unobtainable by linear calculation to the motion of each graphic on the time base.

Figures 49, 50:
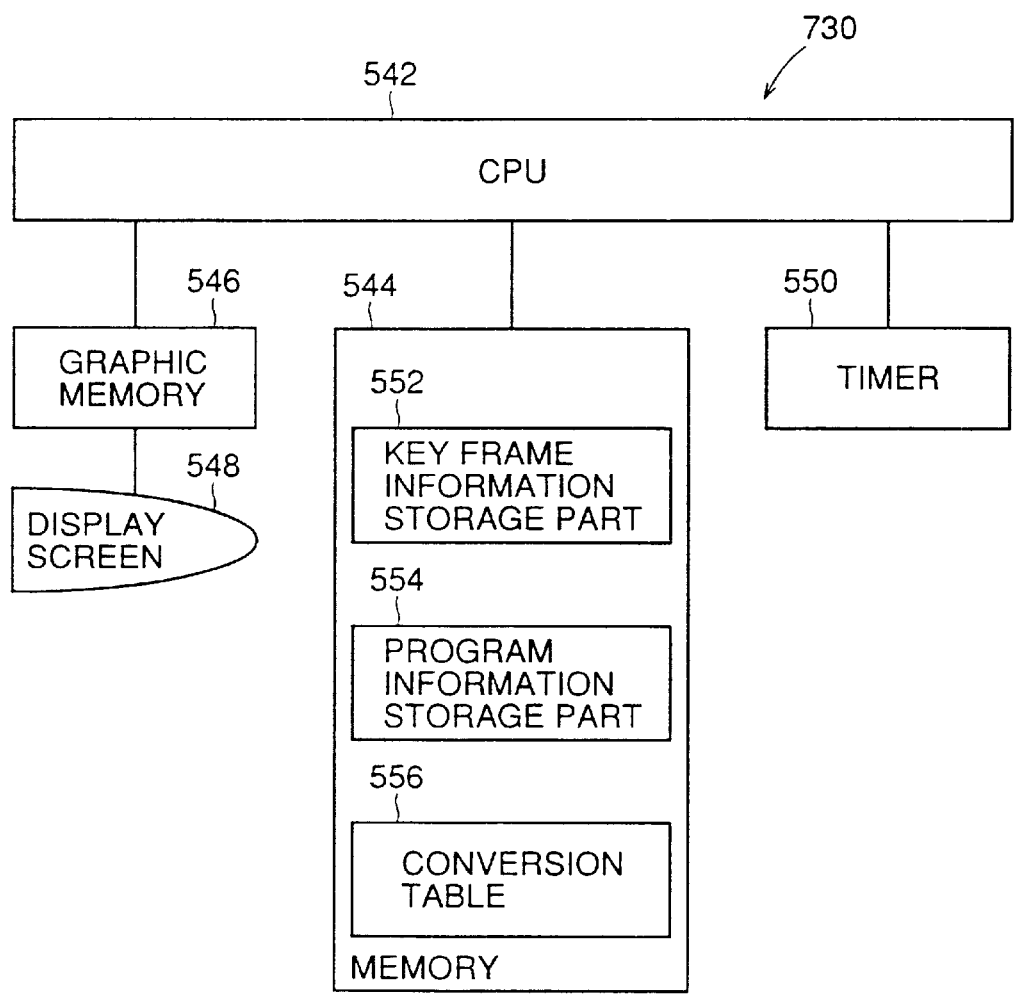
FIG. 49 is a block diagram of a computer for implementing a seventh embodiment of the present invention.
FIG. 50 typically shows a conversion table.

FIG. 49 is a block diagram showing a computer 730 for implementing the method according to the seventh embodiment. This computer 730 is different from the computer 540 for implementing the method according to the sixth embodiment shown in FIG. 34 in a point that a memory 544 includes a program information storage part 554 storing a program which is different from that for the sixth embodiment and a conversion table 556 employed for further converting feature data of graphics temporarily obtained by linear interpolative calculation. The remaining points of the computer 730 shown in FIG. 49 are similar to those of the computer 540 shown in FIG. 34. The same components are denoted by the same reference numerals and names, and have the same functions. Hence, redundant description is omitted.

Referring to FIG. 50, the conversion table 556 is obtained by previously calculating each value h indicating "positioning of an intermediate frame to be plotted next", previously determining each value k to be taken as an actual change quantity at the point of time for each value h, and previously preparing each pair of the values h and k as a table. In the conversion table 556 shown in FIG. 50, a relation $k=h^2$ is assumed for each value h. While the conversion table 556 may be prepared on the assumption of the above functional relation between the values k and h, each value k is not necessarily based on such a functional relation but can be decided by an arbitrary intention of the animation creator in case of employing a conversion table, so that specific motions unobtainable by simple functions can be implemented.

Figure 51:
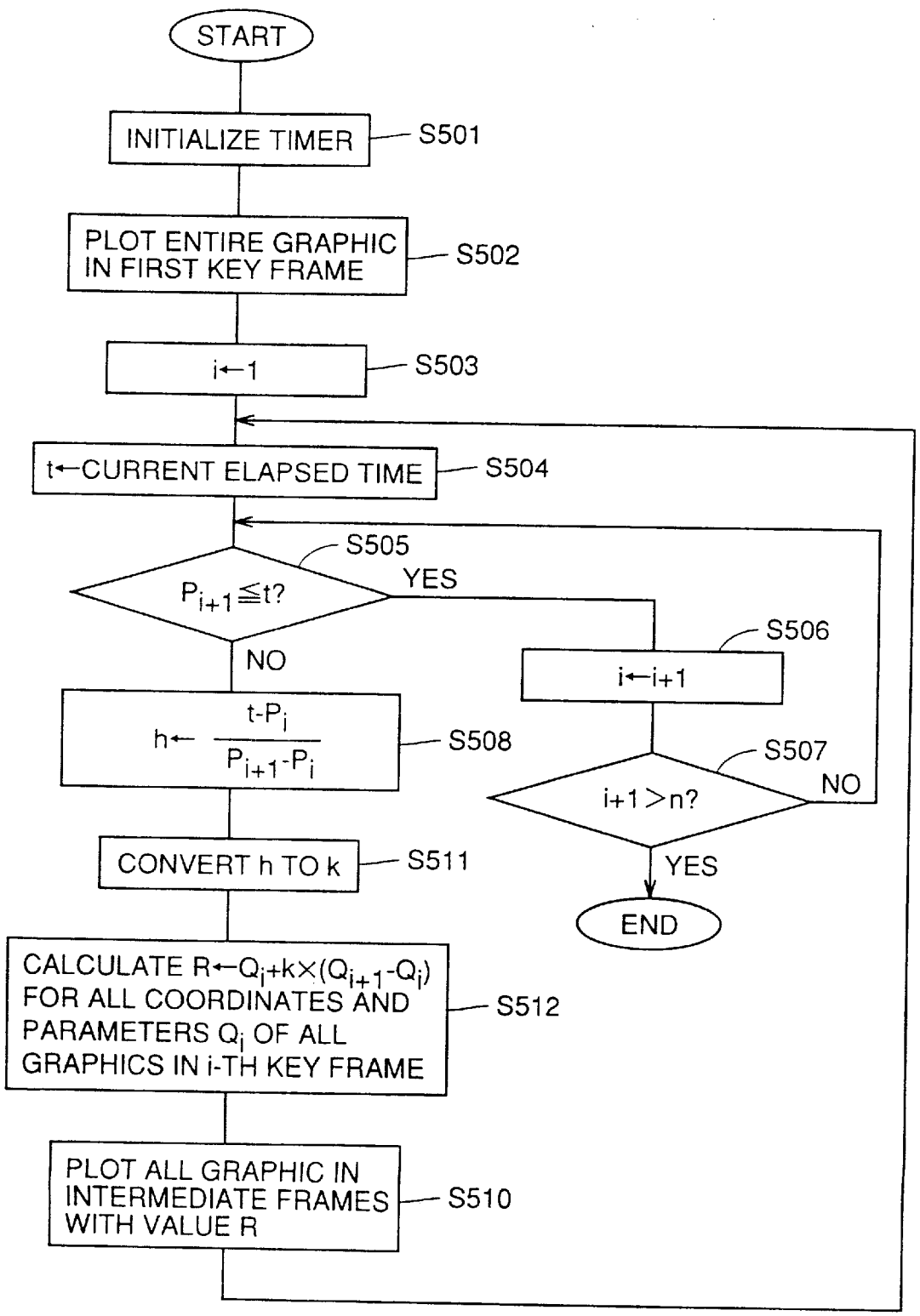
FIG. 51 is a flow chart of a program for implementing the method according to the seventh embodiment.

FIG. 51 shows the flow of control of the program stored in the program information storage part 554 shown in FIG. 49. The flow chart shown in FIG. 51 is different from the flow chart for the program according to the sixth embodiment shown in FIG. 39 in a point that a step S511 for converting a value h obtained at a step S508 to a value k with reference to the conversion table 556 is included after the step S508, and a step S512 for performing processing similar to that at a step S509 with the value k in place of the value h in the step S509 shown in FIG. 39 is inserted. The remaining points of the flow chart shown in FIG. 51 are absolutely similar to those of the flow chart shown in FIG. 39.

Thus, each value h obtained by linear interpolative calculation is converted to the value k through the conversion table 556, for calculating corresponding parameters of intermediate frames through the value k and generating graphics. When such processing is applied to coordinate points of graphics, for example, motions which are nonlinear with respect to progress of time such as that of graphics with acceleration, for example, can be expressed. The contents of the table 556 can be freely set as already described, whereby arbitrary motions can be advantageously set with respect to time. If this processing is applied to colors of graphics, a specific effect of changing the colors on the time base can be attained.

In order to temporarily calculate the value h and thereafter convert this value h to another value k, the value h may be substituted as a variable of a certain function with no table conversion, so that the current value of the function is assumed to be the value k. For example, the value k may be obtained by performing calculation of $k=h5$. of course this is a mere example, and any other function is employable. In this case, the aforementioned conversion by a function may be performed at the step S511 shown in FIG. 51. In this case, the quantity of data to be held is further advantageously reduced as compared with the case of table conversion.

According to this embodiment, as hereinabove described, it is possible to make the overall regenerating time constant without depending on the CPU speed or a plotting quantity necessary per frame in a computer animation of the key frame interpolation system for creating intermediate frames by performing interpolation between corresponding parameters of corresponding graphics of adjacent key frames. Thus, images can be readily regenerated in synchronization with sounds. Further, the animation can be regenerated with an intermediate frame number increased in response to the throughput of a CPU with no idle time of the CPU, whereby the animation can be further smoothly regenerated without correcting data created in the past in response to the increased throughput of the CPU.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An animation processing method for processing an animation containing at least a first object having a changeable state, the animation processing method comprising:
    a time information output step for outputting time information for presenting a key frame in the animation to a predetermined medium for every key frame; and
    a state information output step for outputting state information of the first object appearing in a key frame based on the output time information, and
    a link information output step for outputting, for every key frame, link information linking the first object appearing in the key frame to a second object appearing in another key frame, wherein the link information specifies an offset from the first object to the second object, within all objects of a same type of the first object.

2. The method in accordance with claim 1, further comprising:
    wherein the link information is output based on the state information of the two objects, such that the presence or absence of the first object in a certain key frame is based on whether or not the first object is linked with the second object in a related key frame.

3. The animation processing method in accordance with claim 2, wherein the predetermined medium is a storage medium.

4. The animation processing method in accordance with claim 2, wherein the predetermined medium is a communication medium.

5. The method according to claim 2, wherein said second object in said related key frame is not adjacent to said first object in said key frame.

6. The method according to claim 2, wherein a frame rate is automatically adjusted to obtain a desired reproduced animation, without operator intervention.

7. The animation processing method in accordance with claim 1, wherein the predetermined medium is a storage medium.

8. The animation processing method in accordance with claim 1, wherein the predetermined medium is a communication medium.

9. The method in accordance with claim 1, wherein delimiters and information indicative of absence of objects in a key frame are not output as state information to the predetermined medium in said state information output step for objects not appearing in a key frame, so that no unnecessary data is output as state information to reduce the quantity of output data, thereby providing high-speed data transmission while preserving memory capacity.

10. An animation processing method for processing an animation containing at least a first object having a changeable state, the animation processing method comprising:

a time information output step for outputting time information for presenting a key frame in the animation to a predetermined medium for every key frame;

a state information output step for outputting state information of the first object appearing in a key frame based on the output time information; and a link information output step for outputting link information linking the first object appearing in the key frame to a second object appearing in another key frame, for every key frame, wherein said link information output step determines a position of the second object in a data format to be outputted by specifying an offset from the first object to the second object in the data format, within all objects of a same type of the first object, and outputs the link information that specifies the position of the second object.

11. The method according to claim 10, wherein said second object in said related key frame is not adjacent to said first object in said key frame.

12. The method according to claim 10, wherein a frame is automatically adjusted to obtain a desired reproduced animation, without operator intervention.

13. The method according to claim 10, wherein the another key frame is a specific number of key frames ahead of the key frame containing the first object, in the data format to be outputted.

14. The method according to claim 10, wherein the link information is output based on the state information of the two objects, such that the presence or absence of the first object in a certain key frame is based on whether or not the first object is linked with the second object in a related key frame.

* * * * *

UNITED STATES PATENT AND TRADEMARK OFFICE
CERTIFICATE OF CORRECTION

PATENT NO.    : 6,414,685 B1
DATED         : July 2, 2002
INVENTOR(S)   : Masaki Takakura and Minoru Nishihata It is certified that error appears in the above-identified patent and that said Letters Patent is hereby corrected as shown below:

<u>Column 32,</u>
Between lines 28 and 29, after "as follows:" please insert the following equation:
-- $h = (t-P_1)/(P_{i+1} - P_i)$ --
Line 52, replace the equation with the following:
-- $R = O_1 + h \times (Q_{i+1} - Q_i)$ --

Signed and Sealed this

Twenty-sixth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,414,685 B1
DATED        : July 2, 2002
INVENTOR(S)  : Masaki Takakura and Minoru Nishihata It is certified that error appears in the above-identified patent and that said Letters Patent is hereby corrected as shown below:

<u>Column 32,</u>
Between lines 28 and 29, after "as follows:" please insert the following equation:
-- $h = (t-P_i)/(P_{i+1} - P_i)$ --
Line 52, replace the equation with the following:
-- $R = Q_i + h \times (Q_{i+1} - Q_i)$ --

Signed and Sealed this

Fourth Day of January, 2005

JON W. DUDAS
*Director of the United States Patent and Trademark Office*